United States Patent
Fan et al.

(10) Patent No.: US 11,983,593 B2
(45) Date of Patent: May 14, 2024

(54) DATA TRANSMISSION METHOD, MULTI-FUNCTION CARD, AND ELECTRONIC DEVICE

(71) Applicant: HUAWEI TECHNOLOGIES CO., LTD., Guangdong (CN)

(72) Inventors: Shunan Fan, Beijing (CN); Lei Wang, Shenzhen (CN); Yuchuan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

(21) Appl. No.: 18/003,470

(22) PCT Filed: Jul. 2, 2021

(86) PCT No.: PCT/CN2021/104202
§ 371 (c)(1),
(2) Date: Dec. 27, 2022

(87) PCT Pub. No.: WO2022/002236
PCT Pub. Date: Jan. 6, 2022

(65) Prior Publication Data
US 2023/0237303 A1    Jul. 27, 2023

(30) Foreign Application Priority Data
Jul. 2, 2020   (CN) .......................... 202010625058.0

(51) Int. Cl.
*G06K 19/06* (2006.01)
*G06K 19/077* (2006.01)
*G06K 19/08* (2006.01)
*H04B 1/3816* (2015.01)
*H04W 8/18* (2009.01)
(Continued)

(52) U.S. Cl.
CPC ..... *G06K 19/07732* (2013.01); *G06K 19/083* (2013.01); *H04B 1/3816* (2013.01); *H04W 8/183* (2013.01); *H04W 8/205* (2013.01); *G06K 7/0013* (2013.01)

(58) Field of Classification Search
CPC ........... G06K 19/07732; G06K 19/083; G06K 7/0013; H04B 1/3816; H04W 8/183; H04W 8/205
See application file for complete search history.

(56) References Cited

U.S. PATENT DOCUMENTS

2017/0142159 A1* 5/2017 Li ........................ H04W 12/082

* cited by examiner

*Primary Examiner* — Jamara A Franklin
(74) *Attorney, Agent, or Firm* — HUAWEI TECHNOLOGIES CO., LTD.

(57) ABSTRACT

Embodiments of this application provide a data transmission method, a multi-function card, and an electronic device. The multi-function card may work as a SIM card or a memory card by using electrical contacts through time division multiplexing. Data is transmitted between the multi-function card and a processor in the electronic device, so that a function of subscriber identity identification can be implemented, and a storage capacity of the electronic device can be expanded. Storage space expanded in the electronic device may be used to store a picture, audio, a video, and an application program. The data transmission method and the multi-function card provided in embodiments of this application may be used to save physical space in the electronic device. This is conducive to lightening and thinning of the electronic device.

18 Claims, 17 Drawing Sheets

(51) Int. Cl.
*H04W 8/20* (2009.01)
*G06K 7/00* (2006.01)

DATA TRANSMISSION METHOD, MULTI-FUNCTION CARD, AND ELECTRONIC DEVICE

CROSS-REFERENCE TO RELATED APPLICATIONS

This application is a National Stage of International Application No. PCT/CN2021/104202, filed on Jul. 2, 2021, which claims priority to Chinese Patent Application No. 202010625058.0, filed on Jul. 2, 2020, both of which are hereby incorporated by reference in their entireties.

TECHNICAL FIELD

This application relates to the field of terminal technologies, and in particular, to a data transmission method, a multi-function card, and an electronic device.

BACKGROUND

With development of terminal technologies, an electronic device tends to be light and thin. This causes increasingly valuable physical space in the electronic device.

Currently, a subscriber identification module (subscriber identification module, SIM) card and a memory card in the electronic device are important hardware modules in the electronic device. The SIM card and the memory card occupy large physical space in the electronic device.

Therefore, how to reduce the physical space occupied by the SIM card and the memory card in the electronic device is a problem that needs to be urgently resolved currently.

SUMMARY

An objective of this application is to provide a data transmission method, a multi-function card, and an electronic device. The multi-function card may be inserted into the electronic device, and exchanges data with a processor in the electronic device based on the data transmission method, to implement subscriber identity identification and expand storage space of the electronic device. The electronic device may implement, by mounting a multi-function card, a function that is of subscriber identity identification and storage expansion and that currently can be only implemented by using a SIM card and a memory card, to reduce physical space occupied by the SIM card and the memory card in the electronic device. This is conducive to lightening and thinning of the electronic device.

The foregoing objective and another objective are achieved based on features in the independent claims. Further implementations are provided in the dependent claims, the specification, and the accompanying drawings.

According to a first aspect, an embodiment of this application provides a multi-function card, where the multi-function card includes a universal integrated circuit card UICC, a memory card, a routing module, and an interface. The routing module is separately connected to the UICC, the memory card, and the interface.

The interface includes a plurality of electrical contacts, and the plurality of electrical contacts may be used by the UICC and the memory card through time division multiplexing.

The UICC may be configured to: send first data to a processor by using the plurality of electrical contacts in a first time period, and receive second data from the processor, where the first data and the second data are used to perform subscriber identity identification.

The memory card may be configured to: receive third data from the processor by using the plurality of electrical contacts in a second time period, and store the third data, and may be further configured to send fourth data to the processor by using the plurality of electrical contacts in a third time period, where the fourth data is data stored in the memory card.

The second data may carry a first identifier, and the third data may carry a second identifier.

The routing module may be configured to send the second data to the UICC based on the first identifier, and may be further configured to send the third data to the memory card based on the second identifier.

In this application, a dimension of the multi-function card may be the same as a dimension of a nano-SIM card, for example, 12.3 millimeters*8.8 millimeters*0.7 millimeter. Alternatively, a dimension of the multi-function card may be the same as a dimension of a micro-SIM card, for example, 15 millimeters*12 millimeters*0.8 millimeter. Alternatively, a dimension of the multi-function card may be the same as a dimension of a mini-SIM card, for example, 25 millimeters*15 millimeters*0.8 millimeter.

In this application, the interface in the multi-function card may include eight electrical contacts: a first electrical contact, a second electrical contact, a third electrical contact, a fourth electrical contact, a fifth electrical contact, a sixth electrical contact, a seventh electrical contact, and an eighth electrical contact. The UICC and the memory card in the multi-function card may use the eight electrical contacts through time division multiplexing, to exchange data with the processor in the electronic device. The UICC may exchange data with the processor by using the first electrical contact to the sixth electrical contact, to implement subscriber identity identification. The memory card may exchange data with the processor by using the eight electrical contacts, to implement a function of storage expansion.

With reference to the first aspect, in some embodiments, the multi-function card may work as a SIM card, and the UICC in the multi-function card may exchange data with the processor by using the first electrical contact to the sixth electrical contact.

The first electrical contact may be configured to: connect to a power supply, and supply power to the multi-function card;

the second electrical contact may be configured to transmit a ground signal;

the third electrical contact may be configured to transmit a reset signal;

the fourth electrical contact may be configured to transmit a voltage programming power VPP signal;

the fifth electrical contact may be configured to transmit a first clock signal; and the sixth electrical contact may be configured to transmit the first data, and may be further configured to transmit the second data, where the first clock signal may be a clock signal existing when the nano-SIM card, the micro-SIM card, or the mini-SIM card works.

With reference to the first aspect, in some embodiments, the multi-function card may work as a memory card, for example, a UFS memory card or a PCIe memory card, and the memory card in the multi-function card may exchange data with the processor by using the eight electrical contacts.

The first electrical contact may be configured to: connect to the power supply, and supply power to the multi-function card;

the second electrical contact may be configured to transmit the ground signal;

the third electrical contact may be configured to transmit the third data, and may be further configured to transmit the fourth data;

the fourth electrical contact may be configured to: connect to the power supply, and supply power to the multi-function card;

the fifth electrical contact may be configured to transmit the third data, and may be further configured to transmit the fourth data;

the sixth electrical contact may be configured to transmit the third data, and may be further configured to transmit the fourth data;

the seventh electrical contact may be configured to transmit a second clock signal; and the eighth electrical contact may be configured to transmit the third data, and may be further configured to transmit the fourth data, where the second clock signal may be a clock signal existing when the UFS memory card or the PCIe memory card works.

With reference to the first aspect, in some embodiments, the multi-function card may work as a memory card, for example, a micro SD card or a nano memory card (which is referred to as an NM card for short), and the memory card in the multi-function card may exchange data with the processor by using the eight electrical contacts.

The first electrical contact may be configured to: connect to the power supply, and supply power to the multi-function card;

the second electrical contact may be configured to transmit the ground signal;

the third electrical contact may be configured to transmit the third data, and may be further configured to transmit the fourth data;

the fourth electrical contact may be configured to transmit a control signal;

the fifth electrical contact may be configured to transmit a third clock signal;

the sixth electrical contact may be configured to transmit the third data, and may be further configured to transmit the fourth data;

the seventh electrical contact may be configured to transmit the third data, and may be further configured to transmit the fourth data; and the eighth electrical contact may be configured to transmit the third data, and may be further configured to transmit the fourth data, where the third clock signal is a clock signal existing when the micro SD card or the NM card works.

With reference to the first aspect, in some embodiments, the fourth electrical contact in the multi-function card may be further configured to connect to a near field communication NFC chip, to output an authentication result to the NFC chip, where the authentication result may be determined by the UICC, and may be used for a payment transaction such as bus card swiping.

With reference to the first aspect, in a possible implementation, locations of the eight electrical contacts of the multi-function card on a card body may correspond to locations of eight electrical contacts of the NM card on a card body.

A location of the first electrical contact on the card body of the multi-function card may correspond to a location of an electrical contact VCC of the NM card on the card body of the NM card. A location of the second electrical contact on the card body of the multi-function card may correspond to a location of an electrical contact GND of the NM card on the card body of the NM card. A location of the third electrical contact on the card body of the multi-function card may correspond to a location of an electrical contact D0 of the NM card on the card body of the NM card. A location of the fourth electrical contact on the card body of the multi-function card may correspond to a location of an electrical contact CMD of the NM card on the card body of the NM card. A location of the fifth electrical contact on the card body of the multi-function card may correspond to a location of an electrical contact CLK of the NM card on the card body of the NM card. A location of the sixth electrical contact on the card body of the multi-function card may correspond to a location of an electrical contact D1 of the NM card on the card body of the NM card. A location of the seventh electrical contact on the card body of the multi-function card may correspond to a location of an electrical contact D2 of the NM card on the card body of the NM card. A location of the eighth electrical contact on the card body of the multi-function card may correspond to a location of an electrical contact D3 of the NM card on the card body of the NM card.

With reference to the first aspect, in a possible implementation, the multi-function card may be inserted and removed. The multi-function card may be inserted into a card holder of the electronic device.

With reference to the first aspect, in another possible implementation, the multi-function card may be embedded into the electronic device as an embedded card, and is used as a non-removable component in the electronic device. In other words, the multi-function card may be equivalent to a two-in-one card that includes an eSIM card and a memory card.

The multi-function card may work as a SIM card, or may work as a memory card. The electronic device may implement, by mounting a multi-function card, a function that is of subscriber identity identification and storage expansion and that currently can be only implemented by using a SIM card and a memory card. This may reduce physical space occupied by the SIM card and the memory card in the electronic device, and is conducive to lightening and thinning of the electronic device.

In addition, for some electronic devices that require both networked communication and storage, for example, Internet of Things devices (a video surveillance device, an unmanned aerial vehicle, a water meter, a meter, and the like), the electronic devices may perform networked communication and storage by using a multi-function card instead of disposing an internal memory.

According to a second aspect, an embodiment of this application provides a data transmission method. The method is applied to an electronic device, the electronic device includes a multi-function card and a processor, the multi-function card includes a universal integrated circuit card UICC, a memory card, a routing module, and an interface, and the routing module may be separately connected to the UICC, the memory card, and the interface. The method includes:

The electronic device receives a first subscriber operation; in response to the first subscriber operation, the processor in the electronic device may send, to the UICC, a first command used to request subscriber identity information, where the subscriber identity information may be used by the electronic device to access a mobile communication network; and in response to the first command, the UICC in the electronic device may send the subscriber identity information to the processor.

The electronic device receives a second subscriber operation; and in response to the second subscriber operation, the processor in the electronic device may store data into the memory card, or read data from the memory card.

With reference to the second aspect, in this application, the processor in the electronic device may include a communication module and a storage module. Electrical connectors on a card holder of the electronic device may be electrically connected to the interface of the multi-function card, to exchange data between the processor and the multi-function card.

In response to the first subscriber operation, the communication module in the processor may send the first command to the UICC. In response to the first command, the UICC may send the subscriber identity information to the communication module in the processor.

In response to the second subscriber operation, the storage module in the processor may store data into the memory card, or read data from the memory card.

In some embodiments, the communication module in the processor may add a first identifier into the first command. When receiving, by using the interface of the multi-function card, the first command that includes the first identifier, the routing module in the multi-function card may send the first command to the UICC based on the first identifier.

In some embodiments, the storage module in the processor may add a second identifier into the data sent to the memory card. When receiving, by using the interface of the multi-function card, the data that includes the second identifier, the routing module in the multi-function card may send the data to the memory card based on the second identifier.

With reference to the second aspect, in some embodiments, the first subscriber operation may be a subscriber operation of powering on the electronic device.

When the electronic device is in a power-off state, in response to a power-on subscriber operation such as a long-press operation performed on a power-on/power-off button of the electronic device, the communication module in the processor may send the first command to the UICC in the multi-function card, and receive the subscriber identity information from the UICC. Further, the electronic device may request to access the mobile communication network from a network device based on the subscriber identity information. When authentication performed by the network device succeeds, the electronic device can access the mobile communication network, to answer and make a call, and send/receive an SMS message.

With reference to the second aspect, in some embodiments, the first subscriber operation may be a subscriber operation of enabling a mobile data function of the electronic device.

When the mobile data function of the electronic device is in a disabling state, in response to the subscriber operation of enabling the mobile data function, the communication module in the processor may send the first command to the UICC in the multi-function card, and receive the subscriber identity information from the UICC. The electronic device may access the mobile communication network based on the subscriber identity information, to implement a function of using a mobile data service, for example, browsing a web page and downloading a video from a web site.

With reference to the second aspect, in some embodiments, the first subscriber operation may be a subscriber operation of inserting the multi-function card into the electronic device.

With reference to the second aspect, in some embodiments, when switching a cellular cell in a movement process, the electronic device needs to replace a network device that provides network access, to perform subscriber identity identification again.

For example, the electronic device moves from a cellular cell in which a first network device is located to a cellular cell in which a second network device is located. The communication module in the processor may send the first command to the UICC in the multi-function card, and receive the subscriber identity information from the UICC. Further, the electronic device may request to access the mobile communication network from the second network device based on the subscriber identity information. When authentication performed by the second network device succeeds, the electronic device may access the mobile communication network.

With reference to the second aspect, in some embodiments, the electronic device receives a third subscriber operation; and in response to the third subscriber operation, the communication module in the processor may store contact data into the UICC in the multi-function card, or read contact data from the UICC, where the contact data includes one or more of the following: a telephone number, an SMS message, and a call record.

With reference to the second aspect, in some embodiments, before the electronic device receives the second subscriber operation, the data transmission method further includes: The electronic device may display a first interface, where the first interface includes a first control, the first control may be used by the processor in the electronic device to store data into the memory card or read data from the memory card, and the second subscriber operation may be a subscriber operation performed on the first control.

With reference to the second aspect, in some embodiments, when performing subscriber identity identification, the electronic device detects a subscriber operation of storing data into the memory card in the multi-function card. The processor in the electronic device may store the data after completing subscriber identity identification. After subscriber identity identification is completed, the storage module in the processor may send, to the memory card by using the electrical connectors electrically connected to the interface of the multi-function card, the data that needs to be stored.

With reference to the second aspect, in some embodiments, when the electronic device stores data into the memory card in the multi-function card, due to movement, the electronic device switches a cellular cell, and needs to perform subscriber identity identification. The electronic device may pause an operation of storing data into the memory card in the multi-function card. The communication module in the processor may exchange data with the UICC module by using the electrical connectors electrically connected to the interface of the multi-function card, to obtain the subscriber identity information from the UICC. The electronic device may access the mobile communication network based on the subscriber identity information. After the electronic device completes subscriber identity identification, the storage module in the processor may continue to store the data into the memory card in the multi-function card. When pausing the operation of storing data into the memory card in the multi-function card, the electronic device may mark, at a pause location, the data that needs to be stored. When continuing to store the data into the memory card in the multi-function card, the electronic device may continue, at the marked location, to store the data into the memory card in the multi-function card.

Generally, a time required for performing subscriber identity identification by the electronic device is shorter than a time required for storing data into the memory card. Therefore, when the electronic device needs to perform subscriber identity identification and store data into the memory card simultaneously, the electronic device may preferably perform subscriber identity identification. In this way, storing data into the memory card is basically not affected, and it is ensured that the electronic device can access the mobile communication network in a timely manner, so that good experience can be brought to a subscriber.

According to a third aspect, an embodiment of this application provides an electronic device. The electronic device includes a memory, a processor, and a multi-function card. The multi-function card includes a universal integrated circuit card UICC, a memory card, a routing module, and an interface. The routing module is separately connected to the UICC, the memory card, and the interface. The memory may be configured to store one or more programs. The processor may be configured to execute the one or more programs, so that the electronic device performs the method described in any one of the second aspect or the possible implementations of the second aspect.

According to a fourth aspect, an embodiment of this application provides a computer program product that includes instructions, where when the computer program product is run on an electronic device, the electronic device is enabled to perform the method described in any one of the second aspect or the possible implementations of the second aspect.

According to a fifth aspect, an embodiment of this application provides a computer-readable storage medium, including instructions, where when the instructions are run on an electronic device, the electronic device is enabled to perform the method described in any one of the second aspect or the possible implementations of the second aspect.

It may be understood that the electronic device provided in the third aspect, the computer program product provided in the fourth aspect, and the computer storage medium provided in the fifth aspect are all used to perform the method provided in embodiments of this application. Therefore, for beneficial effects that can be achieved, refer to beneficial effects in a corresponding method. Details are not described herein again.

DESCRIPTION OF EMBODIMENTS

Figure 1:
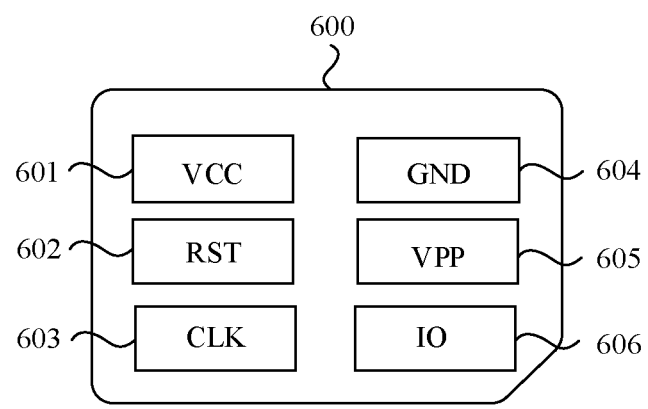
FIG. 1 is a schematic diagram of a structure of a SIM card according to an embodiment of this application.

Terms used in the following embodiments of this application are merely for the purpose of describing specific embodiments, but are not intended to limit this application. The singular expressions "one", "one type of", "the", "the foregoing", and "this" used in this specification and the appended claims of this application are also intended to include plural forms, unless otherwise specified in the context clearly. It should also be understood that, the term "and/or" used in this application indicates and includes any one or all of possible combinations of one or more listed items.

First, a SIM card and a memory card in embodiments of this application are described.

1. SIM Card

The SIM card may be used for subscriber identity identification in a global system for mobile communications (global system for mobile communications, GSM) network. One SIM card may identify one subscriber, and one SIM card may be inserted into a card holder that is of an electronic device and that is configured to insert a SIM card, and may be used by the electronic device to perform subscriber identity identification.

The SIM card may include a central processing unit (central processing unit, CPU), a read-only memory (read-only memory, ROM), a random access memory (random access memory, RAM), an electrically erasable programmable read-only memory (electrically erasable programmable read-only memory, EEPROM), and a serial communication unit. These modules may be integrated into one integrated circuit.

The ROM, the RAM, and the EEPROM in the SIM card each are used as a memory of the SIM card. The memory may be configured to store an international mobile subscriber identity (international mobile subscriber identification number, IMSI), an authentication key and an encryption algorithm, a personal identification number (personal identification number, PIN), a personal identification number unlocking key (personal identification number unlocking key, PUK) of the SIM card, an SMS message, a telephone number, and a call record. The memory may be further configured to store an instruction for performing subscriber identity identification by the SIM card. Compared with a storage capacity of a memory card, a storage capacity of the SIM card is smaller. Currently, the storage capacity of the SIM card ranges from tens of KB to hundreds of KB.

The CPU in the SIM card may be configured to run, based on the IMSI and the authentication key, the instruction for performing subscriber identity identification, to obtain data that may indicate subscriber identity information corresponding to the SIM card. A network device may allow, based on the data indicating the subscriber identity information, the electronic device to access a network. The network device may be a device that performs authentication on an electronic device including a SIM card, for example, a base station. When authentication performed by the network device succeeds, the electronic device may access the network.

That the electronic device accesses the network may mean that the electronic device accesses a GSM network, a 3rd generation mobile communication technology 3G network, a 4th generation mobile communication technology 4G network, a 5th generation mobile communication technology 5G network, and a private 5G network. For example, that the electronic device accesses the GSM network represents that the electronic device may be used to answer and make a call, and send/receive an SMS message. That the electronic device accesses the 4G network may represent that the electronic device uses a mobile data service, for example, browses a web page and downloads a video from a web site.

The network accessed by the electronic device is not limited in embodiments of this application.

The serial communication unit in the SIM card may be configured to transmit data between modules inside the SIM card, and may be further configured to transmit data between the SIM card and another module in the electronic device, for example, transmit data between the SIM card and a processor in the electronic device.

The serial communication unit may include a plurality of electrical contacts, and the SIM card may transmit data to another module in the electronic device by using these electrical contacts. The following describes each electrical contact of the SIM card. FIG. 1 is an example schematic diagram of a structure of a SIM card 600.

As shown in FIG. 1, the SIM card 600 includes electrical contacts 601 to 608. The electrical contact is a contact that is on a card and that has a specific contact area and has a conductive function. When the SIM card is inserted into a card holder of an electronic device, the SIM card may exchange, by using these electrical contacts, data with a module that is in the electronic device and that is configured to perform mobile communication. The following describes each electrical contact.

The electrical contact 601 is an electrical contact connected to a power supply (volt current condenser, VCC), and may be configured to supply power to each module in the SIM card.

The electrical contact 601 may be referred to as "VCC".

The electrical contact 602 is an electrical contact configured to transmit a reset (reset, RST) signal. The electrical contact 602 may be referred to as "RST".

The electrical contact 603 is an electrical contact configured to transmit a clock (clock, CLK) signal. The electrical contact 603 may be referred to as "CLK".

The electrical contact 604 is an electrical contact configured to be grounded (ground, GND). The electrical contact 604 may be referred to as "GND".

The electrical contact 605 is an electrical contact configured to connect to the power supply to provide a voltage programming power or configured to exchange data (programming voltage/input signal, VPP) by the SIM card with another chip. The electrical contact 605 may be referred to as "VPP". The electrical contact 605 is connected to the power supply to provide the voltage programming power that may be used by the SIM card 600 to implement an erase function of an EEPROM inside the SIM card 600. However, with development of a chip design technology, currently, VCC connected to the electrical contact 601 may be used inside the SIM card to provide the voltage programming power required by the EEPROM. In this case, the electrical contact 605 may be suspended or connected to another chip.

For example, the SIM card 600 may be connected to a near field communication (near field communication, NFC) chip in the electronic device by using the electrical contact VPP (namely, the electrical contact 605), to output an authentication result to the NFC chip. The authentication result may be used for a payment transaction in a bus card swiping scenario. The SIM card 600 may further include a security module. The security module may include an account number of a bus card account and a balance of the bus card account, and may be configured to provide a secure execution environment for storing sensitive information and performing a transaction in the bus card swiping process. The following describes a principle of implementing the payment transaction by using the electrical contact VPP in the bus card swiping scenario.

Specifically, in the bus card swiping scenario, a mobile phone including an NFC chip is close to a bus card reader. In this case, the NFC chip may sense a contactless radio frequency field, and the NFC chip may receive a first instruction that is from the bus card reader and that is used to obtain an account number of a bus card account. The NFC chip may transmit the first instruction to the SIM card 600 by using the electrical contact 605. The security module in the SIM card 600 may process the first instruction, and a process of processing the first instruction is, for example, obtaining the account number of the bus card account, and transmitting the account number of the bus card account of a subscriber to the NFC chip by using the electrical contact 605. Further, the NFC chip may transmit the account number of the bus card account to the bus card reader. After performing fee deduction on the bus card account, the bus card reader may transmit, to the NFC chip, an instruction indicating that fee deduction succeeds. The NFC chip may send, to the SIM card 600, the instruction indicating that fee deduction succeeds. The security module in the SIM card 600 may perform corresponding fee deduction processing on a balance of the bus card account. In this way, the electronic device may implement a bus card swiping function by using a connection between the NFC chip and the SIM card.

In embodiments of this application, a process of interaction between the NFC chip and the SIM card is not limited in the bus card swiping scenario.

The NFC chip imposes no limitation, and the SIM card may be connected to another chip by using the electrical contact VPP.

The electrical contact 606 is an electrical contact configured to input/output (input output, IO) data, namely, a data input/output interface. The electrical contact 606 may be referred to as "TO".

Currently, the SIM card has three specifications: a mini-SIM card, a micro-SIM card, and a nano-SIM card. A dimension (length*width*thickness) of the mini-SIM card is 25 millimeters*15 millimeters*0.8 millimeter. A dimension of the micro-SIM card is 15 millimeters*12 millimeters*0.8 millimeter. A dimension of the nano-SIM card is 12.3 millimeters*8.8 millimeters*0.7 millimeter. The nano-SIM card has a smallest dimension in the three cards.

2. Memory Card

The memory card may be configured to expand a storage capacity of an electronic device. A storage capacity of the memory card may be 64 GB, 128 GB, 256 GB, or a larger capacity. Because a memory of the electronic device is limited, when the electronic device is not replaced, the electronic device may expand the storage capacity by using an external memory card.

The memory card may include a storage unit, a control unit, and a memory card interface (the foregoing electrical contact).

The control unit may be configured to control data to be read from and written into the memory card.

The storage unit is specifically configured to store data such as a picture, audio, a video, or a program. A storage medium in the storage unit may be a non-volatile memory such as a flash memory (flash memory).

The memory card interface may be configured to transmit data between the memory card and the electronic device.

Based on different used data transmission protocols, the memory card may mainly fall into four types: a micro SD card, a universal flash storage (universal flash storage, UFS) memory card, a peripheral component interconnect express (peripheral component interconnect express, PCIe) memory card, and a nano memory (nano memory, NM) card. The micro SD card is a memory card that uses a secure digital (secure digital, SD) protocol. The UFS memory card is a memory card that uses a UFS protocol. The PCIe memory card is a memory card that uses a PCIe protocol. The NM card is a memory card that uses an embedded multimedia card (embedded multimedia card, eMMC) protocol.

The following describes memory card interfaces of the foregoing four memory cards.

(1) Micro SD Card

A dimension of the micro SD card is 15 millimeters*11 millimeters*1 millimeter.

Figure 2:
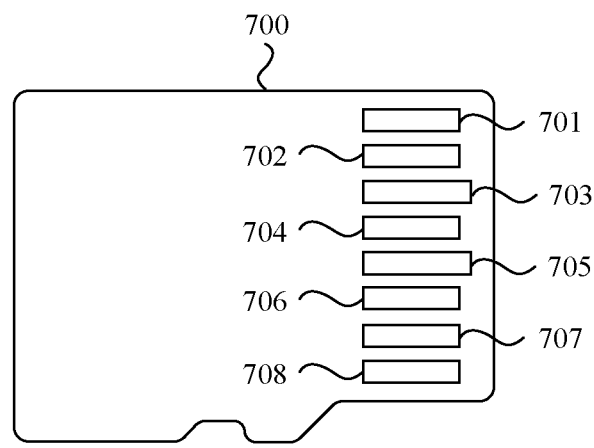
FIG. 2 is a schematic diagram of a structure of a memory card according to an embodiment of this application.

FIG. 2 is an example schematic diagram of a structure of a micro SD card 700. As shown in FIG. 2, the micro SD card 700 may include eight electrical contacts 701 to 708.

The electrical contact 701, the electrical contact 702, the electrical contact 707, and the electrical contact 708 are electrical contacts configured to transmit data, and may be respectively referred to as "D1", "D0", "D3", and "D2".

The electrical contact 703 is an electrical contact configured to be grounded, and may be referred to as GND.

The electrical contact 704 is an electrical contact configured to transmit clock information, and may be referred to as "CLK".

The electrical contact 705 is an electrical contact configured to connect to a power supply, and may supply power to the micro SD card 700. The electrical contact 703 may be referred to as "VCC".

The electrical contact 706 is an electrical contact configured to transmit a control instruction (command, CMD). The control instruction may include an instruction for instructing the micro SD card 700 to store data and an instruction for instructing to read data from the micro SD card 700. The electrical contact 706 may be referred to as "CMD".

(2) UFS Memory Card

The UFS memory card may include nine electrical contacts: VCC, two output stage logic power voltages (output stage logic power voltage, VCCQ) that are respectively VCCQ1 and VCCQ2, GND, CLK, a data input interface (including RX+ and RX−), and a data output interface (including TX+ and TX−).

For functions of GND and CLK, refer to the foregoing descriptions of the electrical contacts of the micro SD card.

VCC, VCCQ1, and VCCQ2 are three electrical contacts connected to a power supply, and may supply power to different modules in the UFS memory card. Specifically, VCC may be configured to supply power to a storage medium such as a flash memory in the UFS memory card. VCCQ1 may be configured to supply power to a control unit in the UFS memory card. VCCQ2 may be configured to supply power to a memory card interface in the UFS memory card.

RX+ and RX− are electrical contacts configured to receive data from another chip. In other words, RX+ and RX− are data input interfaces of the UFS memory card. Signals transmitted by RX+ and RX− are two signals with opposite phases, and data indicated by the two signals is the same. When receiving the two signals transmitted by RX+ and RX−, the UFS memory card may compare a voltage difference between the two signals to determine the received data.

TX+ and TX− are electrical contacts that are used by the UFS memory card to send data to another chip. In other words, TX+ and TX− are data output interfaces of the UFS memory card. Signals transmitted by TX+ and TX− are two signals with opposite phases, and data indicated by the two signals is the same. When receiving the two signals transmitted by TX+ and TX−, the another chip may compare a voltage difference between the two signals to determine the received data.

(3) PCIe Memory Card

The PCIe memory card may include 14 electrical contacts: three physical pins (respectively referred to as VDD1, VDD2, and VDD3 for short) connected to a power supply, three ground terminals (respectively referred to as VSS1, VSS2, and VSS3 for short), two physical pins (respectively referred to as REFCLK+ and REFCLK−) configured to transmit a clock signal, a physical pin (referred to CLKREF # for short) configured to transmit a request clock signal, a physical pin (referred to PERST # for short) configured to transmit a reset signal, a data input interface (including RX+ and RX−), and a data output interface (including TX+ and TX−).

VDD1, VDD2, and VDD3 may be configured to supply power to different modules in the PCIe memory card. For a function of the data input interface in the PCIe memory card, refer to the descriptions of the data input interface in the UFS memory card. For a function of the data output interface in the PCIe memory card, refer to the descriptions of the data output interface in the UFS memory card. Details are not described herein again.

(4) NM Card

A dimension of the NM card may be the same as or similar to the dimension of the nano-SIM card, for example, 12.3 millimeters*8.8 millimeters*0.7 millimeter.

The NM card may include eight electrical contacts: VCC, GND, CLK, an electrical contact CMD configured to transmit a control instruction, and four electrical contacts D0, D1, D2, and D3 configured to transmit input data and output data.

For functions of the eight electrical contacts of the NM card, refer to the foregoing descriptions of the eight electrical contacts of the micro SD card. Details are not described herein again.

It should be noted that the functions of the eight electrical contacts of the NM card are basically the same as the functions of the eight electrical contacts of the micro SD card. However, protocols used by the NM card and the micro SD card are different. A format of data transmitted by using the electrical contact of the NM card is different from a format of data transmitted by using the electrical contact of the micro SD card. For example, quantities of bytes of signals transmitted each time by using the electrical contact are different, or same data represents signals having different meanings. For the format of the data transmitted by using the electrical contact, refer to specifications in an eMMC protocol and an SD protocol in a conventional technology. This is not limited in embodiments of this application.

In the UFS memory card and the PCIe memory card, the data input interface and the data output interface are separated. Both the UFS memory card and the PCIe memory card may work in a full-duplex working mode, that is, may read and write data simultaneously. In the micro SD card and the NM card, the data input interface and the data output interface are shared. The micro SD card and the NM card may work in a half-duplex working mode, that is, cannot read and write data simultaneously. It may be learned that the UFS memory card and the PCIe memory card transmit data faster than the micro SD card. The UFS memory card and the PCIe memory card transmit data faster than the NM card.

Currently, an electronic device may include a card holder. The card holder may be configured to insert a SIM card. The card holder may be further configured to insert a memory card, to expand a storage capacity of the electronic device. The SIM card and the memory card may be placed on a card tray and inserted into the card holder of the electronic device. The card holder may include electrical connectors and a card slot. Inserting the SIM card and the memory card into the card holder may be specifically inserting the card into the card slot. Locations of the electrical connectors on the card holder may match locations of electrical contacts of the SIM card or the memory card. That the locations of the electrical connectors match the locations of the electrical contacts may represent that one electrical connector is electrically connected to one electrical contact. In this way, the SIM card and the memory card may exchange data with another chip in the electronic device by using the electrical contacts.

Figure 3:
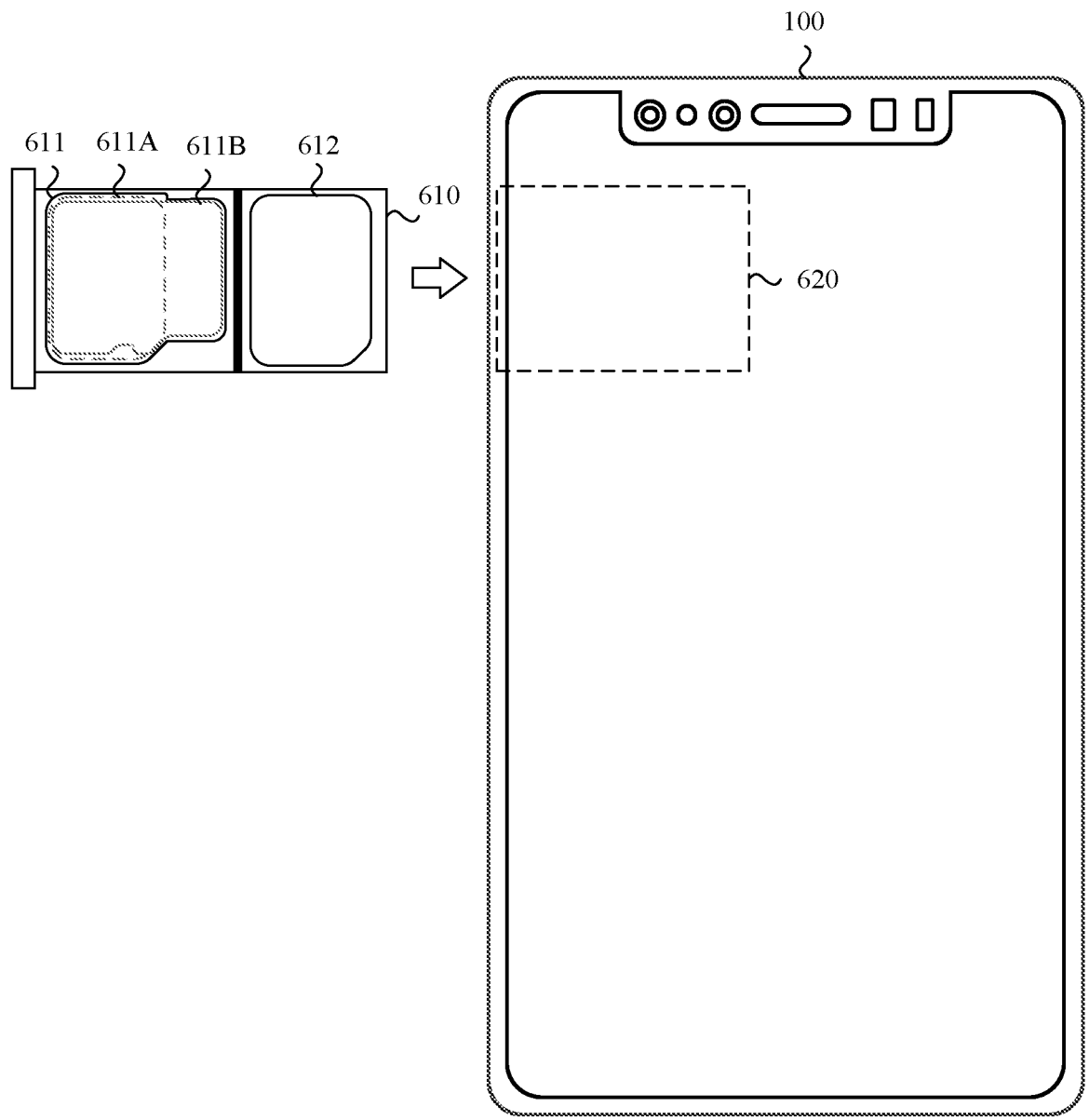
FIG. 3 is a schematic diagram in which a SIM card or a memory card is placed on a card tray and inserted into an electronic device according to an embodiment of this application.

FIG. 3 is an example schematic diagram in which a SIM card or a memory card is placed on a card tray and inserted into an electronic device.

As shown in FIG. 3, a card tray 610 may include a region 611 and a region 612. The region 611 may be used to place a nano-SIM card 611A or a micro SD card 611B. The region 612 may be used to place a nano-SIM card. In other words, the card tray 610 may be configured to place a nano-SIM card, or place a micro SD card, or place two nano-SIM cards, or place a nano-SIM card and a micro SD card. The card tray 610 may be inserted into a region 620 inside the electronic device 100. The region 620 is a region in which a card holder is located. The region 620 may include two card holders. A dimension of a card slot of one card holder may match a dimension of the nano-SIM card. A dimension of a card slot of the other card holder matches the dimension of the nano-SIM card, and also matches a dimension of the micro SD card. That the dimension of the card slot matches the dimension of the nano-SIM card and/or the dimension of the micro SD card may represent that, after the nano-SIM card or the micro SD card is inserted into the card slot, electrical contacts thereof may be correspondingly electrically connected to electrical connectors on the card holder.

The nano-SIM card and/or the micro SD card may be inserted into the card holder of the electronic device 100 by using the card tray 610, so that the electronic device 100 can implement a dual-card dual-standby function, or can implement a function of subscriber identity identification and storage expansion. However, when one or two nano-SIM cards are placed on the card tray 610, a region in the card holder of the electronic device 100 shown in FIG. 3 is not used. For example, the region 611 is not used. Alternatively, when the nano-SIM card 611A is placed in the region 611, a partial region in which the micro SD card 611B may be placed in the region 611 is not used. This increases physical space occupied by the SIM card and the memory card in the electronic device 100, and is not conducive to lightening and thinning of the device.

A location of the region 620 in the electronic device 100 is not limited in this embodiment of this application.

The electronic device 100 is not limited in this embodiment of this application. The electronic device 100 may be a handheld device having a communication function, a vehicle-mounted device, a wearable device, a home intelligent device, a computing device, another processing device connected to a wireless modem, or the like, for example, a mobile phone, a tablet computer, a smartwatch, a vehicle-mounted computer, an unmanned aerial vehicle, a virtual reality device, a video surveillance device, a water meter, and a meter.

Currently, when the SIM card and the memory card share one card body, physical space occupied by the SIM card and the memory card in the electronic device can be reduced. Specifically, as shown in FIG. 1 and FIG. 2, the SIM card has six electrical contacts, and the micro SD card has eight electrical contacts. A lower part of the electrical contacts of the micro SD card can be used to dispose the six electrical contacts of the SIM card. In this case, the SIM card and the micro SD card may share one card body. In other words, this card is equivalent to a two-in-one card that includes a SIM card and a micro SD card. A dimension of this card is the same as or similar to a dimension of the micro SD card, for example, 15 millimeters*11 millimeters*1 millimeter.

Embodiments of this application provide a multi-function card. The multi-function card may be configured to perform subscriber identity identification, and may be also configured to expand a storage capacity of an electronic device. Storage space expanded in the electronic device may be used to store a picture, audio, a video, and an application program. In other words, the multi-function card is equivalent to a two-in-one card that includes a SIM card and a memory card. A module that is in the multi-function card and that is configured to implement a function of the SIM card and a module that is in the multi-function card and that is configured to implement a function of the memory card may share electrical contacts through time division multiplexing, to exchange data with another chip in the electronic device.

A dimension of the multi-function card may be the same as or similar to a dimension of a nano-SIM card, for example, 12.3 millimeters*8.8 millimeters*0.7 millimeter.

The electronic device can implement a function of subscriber identity identification and storage expansion by using a multi-function card. In this way, physical space occupied by the SIM card and the memory card in the electronic device may be reduced in the electronic device, and more physical space is reserved for a module such as a large-capacity battery and a multi-camera. In addition, compared with the foregoing two-in-one card whose dimension is the same or similar to the dimension of the micro SD card, the multi-function card in embodiments of this application has a smaller dimension. This may better save physical space in the electronic device, and is conducive to lightening and thinning of the electronic device.

In embodiments of this application, that the dimension of the multi-function card is the same as or similar to the dimension of the nano-SIM card may specifically represent that a card holder that is in the electronic device and that may be configured to insert the nano-SIM card may also be configured to insert the multi-function card.

The following describes a schematic diagram of a structure of a multi-function card. The multi-function card may implement a function of a SIM card, and may further implement a function of a UFS memory card.

Figure 4:
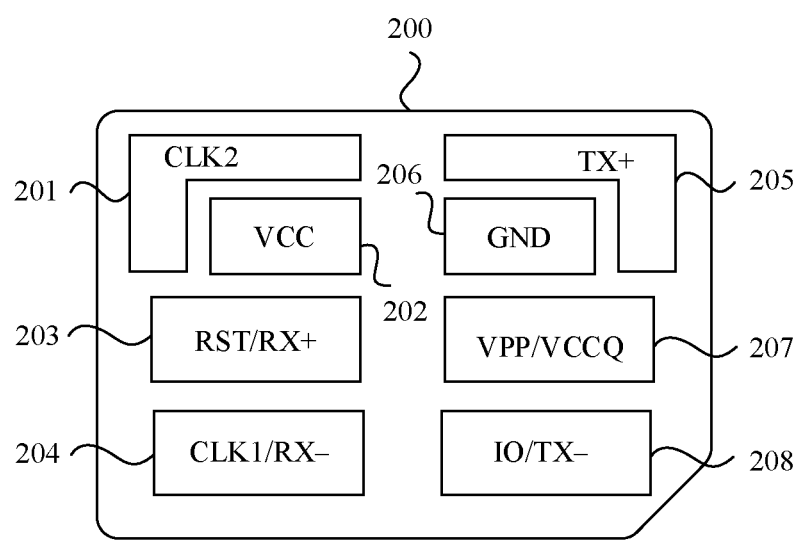
FIG. 4 is a schematic diagram of a structure of a multi-function card according to an embodiment of this application.

FIG. 4 shows an example of distribution of electrical contacts of a multi-function card 200. The multi-function card 200 may be electrically connected to another chip in an electronic device by using these electrical contacts, to transmit data. A dimension of the multi-function card 200 is the same as or similar to a dimension of a nano-SIM card. The multi-function card 200 may be equivalent to a two-in-one card that includes a nano-SIM card and a UFS memory card.

As shown in FIG. 4, the multi-function card 200 may include eight electrical contacts 201 to 208. The eight electrical contacts are all electrical contacts used when the multi-function cards 200 works as the UFS memory card. Six electrical contacts such as the electrical contacts 202 to 204 and the electrical contacts 206 to 208 are electrical contacts used when the multi-function card 200 works as the nano-SIM card. In other words, the six electrical contacts such as the electrical contacts 202 to 204 and the electrical contacts 206 to 208 may be shared by the nano-SIM card and the UFS memory card through time division multiplexing.

It should be noted that the UFS memory card generally has nine electrical contacts that include two output stage logic power voltages that are respectively VCCQ1 and VCCQ2. The multi-function card 200 may include only eight electrical contacts, and the multi-function card 200 may implement functions of the electrical contact VCCQ1 and the electrical contact VCCQ2 of the UFS memory card by using one electrical contact VCCQ. In other words, the multi-function card 200 may supply, by using one electrical contact VCCQ, power to a control unit and an interface that are in the multi-function card 200 and that are configured to implement a function of the UFS memory card. In this way, the multi-function card 200 may work as the UFS memory card by using the eight electrical contacts.

The multi-function card 200 includes a module configured to implement a function of the nano-SIM card and a module configured to implement a function of the UFS memory card. That the multi-function card 200 works as the nano-SIM card may be specifically that the module that is in the multi-function card 200 and that is configured to implement the function of the nano-SIM card transmits data by using the electrical contacts 202 to 204 and the electrical contacts 206 to 208. That the multi-function card 200 works as the UFS memory card may be specifically that the module that is in the multi-function card 200 and that is configured to implement the function of the UFS memory card transmits data by using the electrical contacts 201 to 208. In subsequent embodiments, the module that is in the multi-function card 200 and that is configured to implement the function of the nano-SIM card and a module that is in the multi-function card 200 and that is configured to implement the function of the UFS memory card are specifically described.

The following separately describes functions of the electrical contacts when the multi-function card 200 works as the nano-SIM card and the UFS memory card.

The multi-function card 200 works as the nano-SIM card.

When the multi-function card 200 works as the nano-SIM card, the electrical contacts 202 to 204 and the electrical contacts 206 to 208 are used.

The electrical contacts 202 to 204 and the electrical contacts 206 to 208 are respectively VCC, RST, CLK, GND, VPP, and IO in the electrical contacts of the SIM card shown in FIG. 1. For functions of the six electrical contacts, refer to the descriptions of the electrical contacts of the SIM card shown in FIG. 1. Details are not described herein again.

It should be noted that a power domain of the nano-SIM card is 1.62 V to 3.3 V. For example, the electrical contact 202 may be connected to a 3.3 V power input. In addition, a maximum withstand voltage of the electrical contact 202 may be 5 V. When the electrical contact 202 is connected to a 5 V power input, a circuit in the multi-function card 200 is not burnt. In addition, to be distinguished from a clock signal referenced when the multi-function card 200 works as the UFS memory card, an electrical contact for transmitting a clock signal referenced when the multi-function card 200 works as the nano-SIM card may be referred to as "CLK1". A frequency of the clock signal referenced when the nano-SIM card works may be 1 MHz to 5 MHz. In this embodiment of this application, the frequency of the clock signal referenced by the nano-SIM card is not limited.

When the electronic device needs to perform subscriber identity identification, a module that is in the electronic device and that is configured to perform mobile communication may exchange data with the multi-function card 200 by using the six electrical contacts, to obtain data indicating subscriber identity information corresponding to the multi-function card 200. A scenario in which the electronic device needs to perform subscriber identity identification may include: a scenario in which the electronic device is powered on to initially access a network, a scenario in which the multi-function card 200 is inserted, a scenario in which a mobile data function of the electronic device is enabled, and a scenario in which the electronic device replaces, due to movement, a network device that provides network access for the electronic device.

In these application scenarios, a power management module in the electronic device supplies power to the multi-function card 200 by using the electrical contact 202. The module that is in the electronic device and that is configured to perform mobile communication may provide, for the multi-function card 200 by using the electrical contact 204, the clock signal referenced when the nano-SIM card works, and transmit, to the multi-function card 200 by using the electrical contact 208, data used to obtain the subscriber identity information. The module that is in the multi-function card 200 and that is configured to implement the function of the nano-SIM card may include an IMSI and an authentication key. The multi-function card 200 may transmit, by using the electrical contact 208, the data indicating the subscriber identity information to the module that is in the electronic device and that is configured to perform mobile communication. Then, the electronic device communicates with the network device by using the data indicating the subscriber identity information, to complete subscriber identity identification, and access the network and complete related service charging after authentication succeeds.

The multi-function card 200 works as the UFS memory card.

When the multi-function card 200 works as the UFS memory card, the electrical contacts 201 to 208 are used.

The electrical contacts 201 to 206 and 208 are respectively CLK, VCC, RX+, RX−, TX+, GND, and TX− in the electrical contacts of the UFS memory card. The electrical contact 207 may be connected to a power supply, supplies power to the module that is in the multi-function card 200 and that is configured to implement the function of the UFS memory card, and may be equivalent to VCCQ1 and VCCQ2 in the electrical contacts of the UFS memory card. A voltage of the power supply connected to the electrical contact 207 is not limited in this embodiment of this application, for example, the electrical contact 207 may be connected to a 1.8 V power supply.

A power domain of the UFS memory card may be 1.62 V to 3.3 V. For example, the electrical contact 202 may be connected to a 3.3 V power input. An electrical contact for transmitting a clock signal referenced when the multi-function card 200 works as the UFS memory card may be referred to as "CLK2". Specifically, a frequency of the clock signal may be 0 MHz to 25 MHz. Because the clock signals referenced by the UFS memory card and the nano-SIM card are different, the multi-function card 200 may provide, by using an electrical contact different from "CLK1", the clock signal that needs to be referenced when the multi-function card 200 works as the UFS memory card. The clock signal referenced when the UFS memory card works is not limited in this embodiment of this application. For functions of the electrical contacts when the multi-function card 200 works as the UFS memory card, refer to the descriptions of the electrical contacts of the UFS memory card. Details are not described herein again.

It should be noted that, when the multi-function card 200 works as the UFS memory card, the electrical contact 203 and the electrical contact 204 are not merely configured to receive data, and the electrical contact 205 and the electrical contact 208 are not merely configured to send data. The multi-function card 200 may send data by using the electrical contact 203 and the electrical contact 204, and the multi-function card 200 may receive data by using the electrical contact 205 and the electrical contact 208.

The module that is in the multi-function card 200 and that is configured to implement the function of the UFS memory card may be configured to store a picture, audio, a video, and an application program. When the multi-function card 200 is inserted, the electronic device may store data into the module that is in the multi-function card 200 and that is configured to implement the function of the UFS memory card. The data may be transmitted, by using the electrical contact 203 and the electrical contact 204, to the module that is in the multi-function card 200 and that is configured to implement the function of the UFS memory card. Alternatively, the electronic device may read data from the module that is in the multi-function card 200 and that is configured to implement the function of the UFS memory card. The data may be transmitted, by using the electrical contact 205 and the electrical contact 208, to a module that is in the electronic device and that is configured to read the data.

It may be learned that, when the multi-function card 200 works as the nano-SIM card and works as the UFS memory card, the electrical contact 202 is VCC and the electrical contact 206 is GND. In other words, functions of the two electrical contacts may be fixed. A voltage of the power input connected to the electrical contact 202 may be unchanged. Alternatively, a voltage of the power input connected to the electrical contact 202 may vary based on whether the multi-function card 200 works as the nano-SIM card or works as the UFS memory card. For example, when the multi-function card 200 works as the nano-SIM card, the electrical contact 202 may be connected to a 3.3 V or 1.8 V power output. When the multi-function card 200 works as the UFS memory card, the electrical contact 202 may be connected to a 1.8 V, 3.3 V, or 1.2 V power input.

The electrical contact 201 and the electrical contact 205 may be electrical contacts that are separately used when the multi-function card 200 works as the UFS memory card.

The multi-function card 200 may implement the function of the nano-SIM card and the function of the UFS memory card by using the electrical contacts 201 to 208 through time division multiplexing. In other words, in a time period, the eight electrical contacts may be used as an interface of the nano-SIM card (the electrical contact 201 and the electrical contact 205 may be in an idle state, or may be respectively configured to connect to the power input and configured to be grounded), or may be used as an interface of the UFS memory card. That the electrical contact is in an idle state may represent that no data is transmitted by using the electrical contact.

A manner in which the electrical contacts of the multi-function card 200 are used through time division multiplexing is not limited in this embodiment of this application. Electrical contacts used when the multi-function card 200 works as the SIM card may be a combination of any six electrical contacts in the eight electrical contacts of the multi-function card 200. The electrical contacts of the SIM card and the memory card may share the electrical contacts in another combination manner.

In a possible implementation, locations of the eight electrical contacts of the multi-function card 200 shown in FIG. 4 on a card body may correspond to locations of eight electrical contacts of an NM card on a card body. Specifically, a location of the electrical contact 201 on the card body of the multi-function card 200 may correspond to a location of an electrical contact D2 of the NM card on the card body of the NM card. A location of the electrical contact 202 on the multi-function card 200 may correspond to a location of an electrical contact VCC of the NM card on the card body of the NM card. A location of the electrical contact 203 on the multi-function card 200 may correspond to a location of an electrical contact D0 of the NM card on the card body of the NM card. A location of the electrical contact 204 on the multi-function card 200 may correspond to a location of an electrical contact CLK of the NM card on the card body of the NM card. A location of the electrical contact 205 on the multi-function card 200 may correspond to a location of an electrical contact D3 of the NM card on the card body of the NM card. A location of the electrical contact 206 on the multi-function card 200 may correspond to a location of an electrical contact GND of the NM card on the card body of the NM card. A location of the electrical contact 207 on the multi-function card 200 may correspond to a location of an electrical contact CMD of the NM card on the card body of the NM card. A location of the electrical contact 208 on the multi-function card 200 may correspond to a location of an electrical contact D1 of the NM card on the card body of the NM card.

In this embodiment of this application, a location of each electrical contact of the multi-function card 200 on the card body and a size of each electrical contact are not limited.

The eight electrical contacts impose no limitation, and the multi-function card 200 may further include more or fewer electrical contacts, for example, nine electrical contacts. The nine electrical contacts may be all electrical contacts used when the multi-function card 200 is used as the UFS memory card. Functions of the nine electrical contacts may be the same as functions of the nine electrical contacts of the UFS memory card. Any six electrical contacts in the nine electrical contacts may be electrical contacts used when the multi-function card 200 works as the SIM card. The electrical contacts of the SIM card and the memory card may share the nine electrical contacts in any combination manner. For example, the multi-function card 200 may determine a location at any one of the electrical contact 203, the electrical contact 204, the electrical contact 207, and the electrical contact 208 as a location of a ninth electrical contact of the multi-function card 200. The ninth electrical contact may be, for example, VCCQ1 of the UFS memory card, and may be configured to supply power to the multi-function card. The dimension of the multi-function card 200 is not limited in this embodiment of this application. In addition to being the same or similar to the dimension of the nano-SIM card, the dimension of the multi-function card 200 may be another dimension.

The dimension of the multi-function card 200 shown in FIG. 4 may be the same as or similar to the dimension of the nano-SIM card. One surface of the multi-function card 200 may include eight electrical contacts. The multi-function card 200 may implement the function of the nano-SIM card and the function of the UFS memory card by using the electrical contacts through time division multiplexing. In other words, the multi-function card 200 may be equivalent to a two-in-one card that includes a nano-SIM card and a UFS memory card. In this way, compared with an independent nano-SIM card and an independent UFS memory card, the multi-function card in this embodiment of this application can reduce physical space occupied by the SIM card and the memory card in the electronic device, and is conducive to lightening and thinning of the electronic device.

In some embodiments, the electronic device 100 may include a card holder configured to insert the nano-SIM card or the multi-function card 200.

Figure 5:
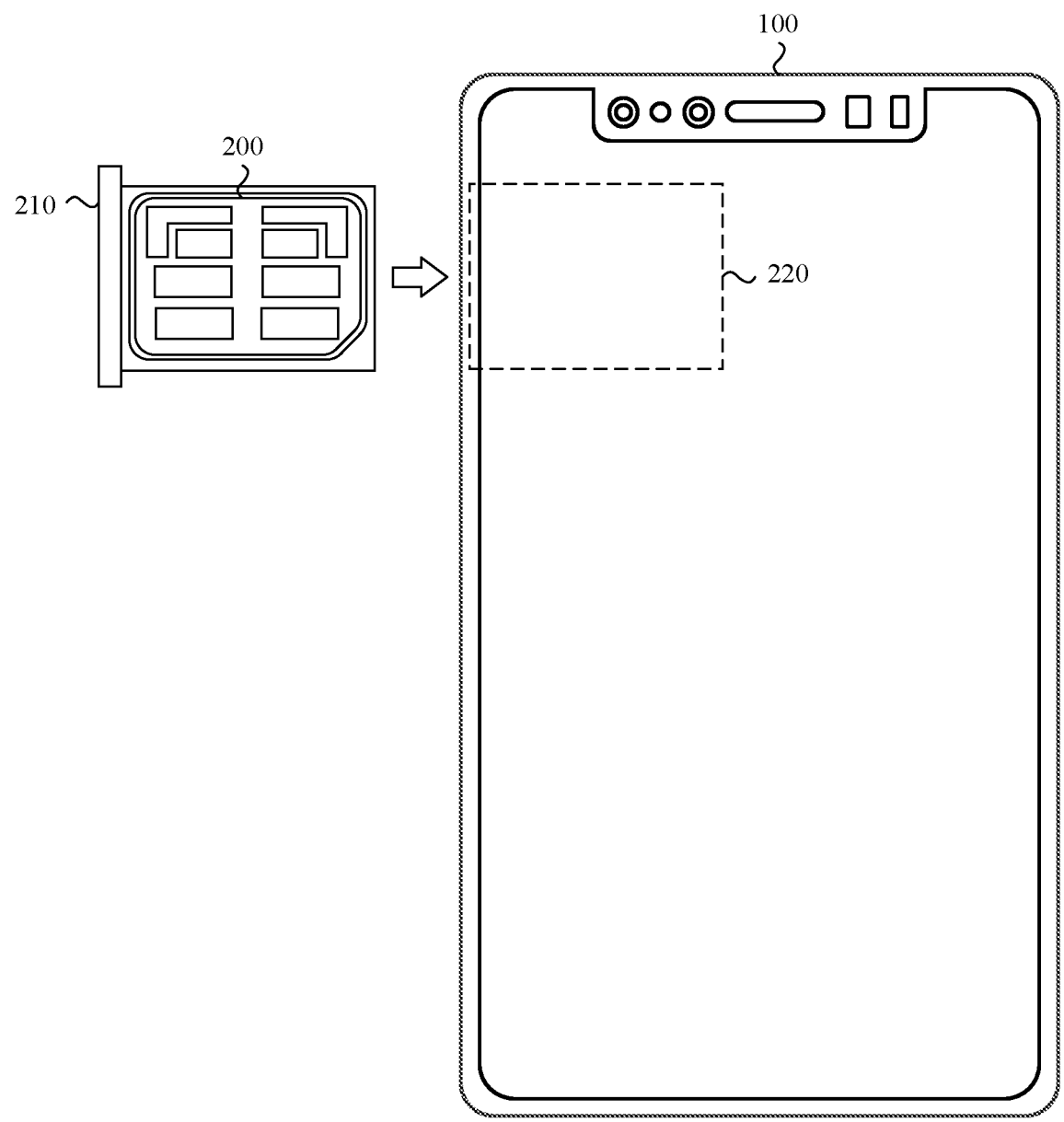
FIG. 5 is a schematic diagram in which a multi-function card is placed on a card tray and inserted into an electronic device according to an embodiment of this application.

FIG. 5 is an example schematic diagram in which a multi-function card 200 is placed on a card tray and inserted into an electronic device 100.

As shown in FIG. 5, a card tray 210 may be configured to place a nano-SIM card or the multi-function card 200. A region 220 in the electronic device 100 may include a card holder. The card holder may be configured to insert a nano-SIM card or the multi-function card 200. When the multi-function card 200 is inserted into the card holder of the electronic device 100 by using the card tray 210, the electrical contacts of the multi-function card 200 may be electrically connected to electrical connectors on the card holder. In this way, the multi-function card 200 may exchange data with another chip in the electronic device 100, to implement the function of the nano-SIM card and the function of the memory card.

In the foregoing embodiment, the electronic device 100 includes a card holder, and may implement the function of the nano-SIM card and the function of the memory card by using the multi-function card 200. This reduces physical space occupied by the SIM card and the memory card in the electronic device, and is conducive to lightening and thinning of the electronic device.

A location of the region 220 in the electronic device 100 is not limited in this embodiment of this application.

Based on the multi-function card 200 shown in FIG. 4, the following describes a schematic diagram of a connection relationship of the multi-function card 200 in the electronic device 100.

Figure 6:
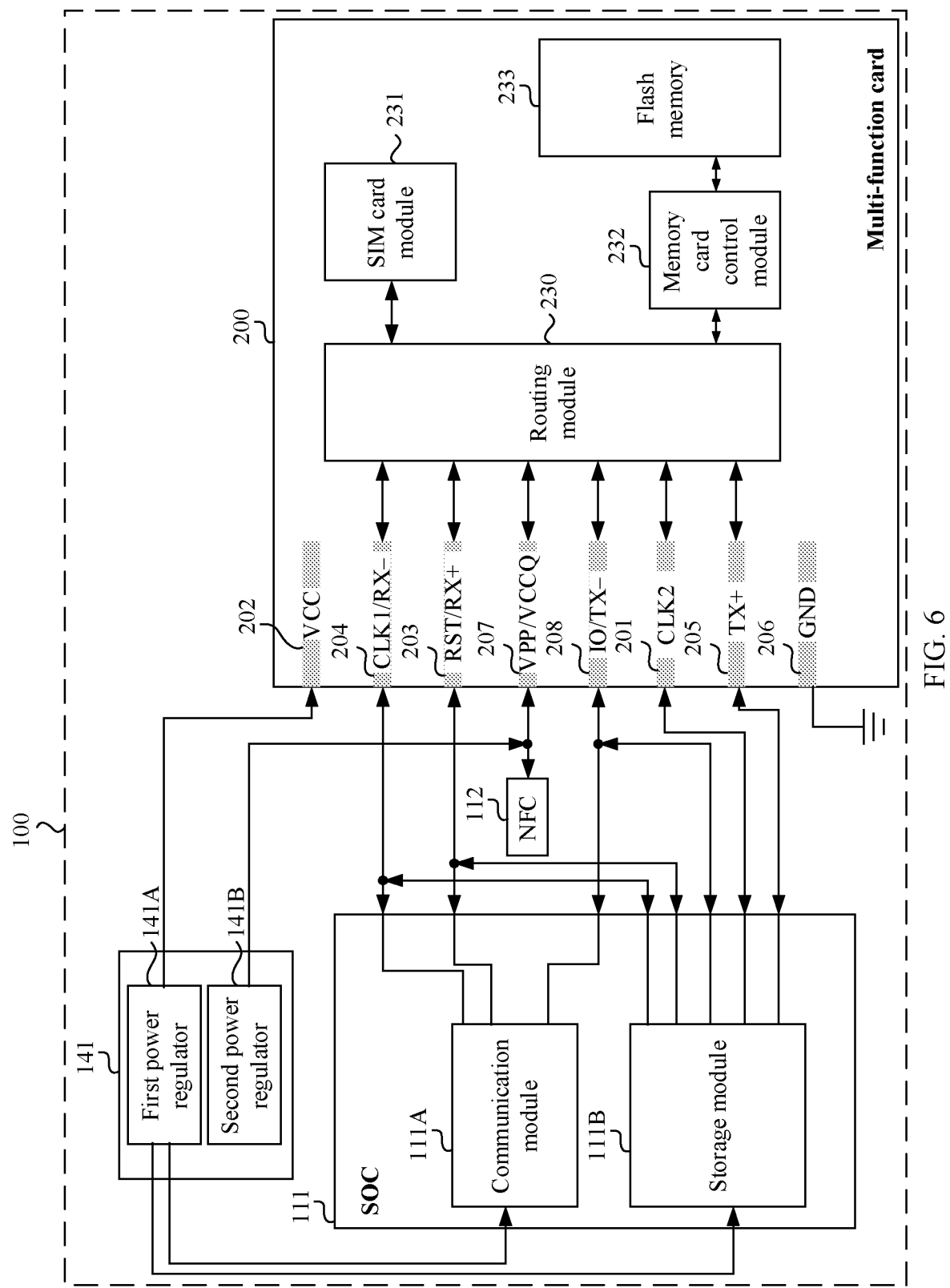
FIG. 6 is a schematic diagram of a connection relationship of a multi-function card in an electronic device according to an embodiment of this application.

FIG. 6 is an example schematic diagram of a connection relationship of a multi-function card 200 in an electronic device 100. Specifically, electrical contacts of the multi-function card 200 may be electrically connected to electrical connectors on a card holder of the electronic device 100, to transmit data between the multi-function card 200 and another chip in the electronic device 100.

As shown in FIG. 6, the multi-function card 200 may be placed on the card holder and inserted into the electronic device 100, and is used as a component in the electronic device 100. The multi-function card 200 may include eight electrical contacts 201 to 208, a routing module 230, a SIM card module 231, a memory card control module 232, and a flash memory 233. The SIM card module 231 is the foregoing module that is in the multi-function card 200 and that is configured to implement the function of the nano-SIM card. The memory card control module 232 and the flash memory 233 each are the foregoing module that is in the multi-function card 200 and that is configured to implement the function of the UFS memory card. The electronic device 100 may further include a system on chip (system on chip, SOC) 111, an NFC chip 112, a power management module 141, and a plurality of electrical connectors (the electrical connectors are not shown in the figure). Specifically:

(1) Eight Electrical Contacts 201 to 208

For locations of the eight electrical contacts 201 to 208 on the multi-function card 200 and functions thereof, refer to the descriptions of the multi-function card 200 shown in FIG. 4. Details are not described herein again.

(2) Routing Module 230

The routing module 230 may be configured to: forward, to the SIM card module 231 or the memory card control module 232, data sent by the SOC 111 in the electronic device 100 to the multi-function card 200, and forward, to the SOC 111 by using the electrical contacts of the multi-function card 200, data sent by the SIM card module 231 to the SOC 111. When sending data to the multi-function card 200, the SOC 111 may add a data identifier into the data. The data identifier is used to indicate whether a module that receives the data is the SIM card module 231 or the memory card control module 232. The routing module 230 may identify the data identifier, and forward the data to the SIM card module 231 or the memory card control module 232 based on the data identifier. Data sent by the SOC 111 to the multi-function card 200 by using any one of the electrical contact 201, the electrical contact 203, the electrical contact 204, the electrical contact 205, the electrical contact 207, and the electrical contact 208 may include a data identifier. The data identifier may be a group of specific codes at the beginning of to-be-sent data. For example, when the SOC 111 sends data to the SIM card module 231 in the multi-function card 200, the SOC 111 may add a specific code 0101 at the beginning of to-be-sent data. When the SOC 111 sends data to the memory card control module 232 in the multi-function card 200, the electronic device 100 may add a specific code 1010 at the beginning of to-be-sent data. When the routing module 230 receives data from the SOC 111 and identifies 0101 at the beginning of the data, the routing module 230 may send the received data to the SIM card module 231. When the routing module 230 receives data from the electronic device 100 and identifies 1010 at the beginning of the data, the routing module 230 may send the received data to the memory card control module 232.

Content of the data identifier is not limited in this embodiment of this application.

It should be noted that, because VCC (namely, the electrical contact 202) is connected to the power management module 141 and is configured to supply power to the multi-function card 200, a signal of the electrical contact does not need to be forwarded by the routing module 230. Because GND (namely, the electrical contact 206) is configured to implement a ground connection of the multi-function card 200, a signal of the electrical contact does not need to be forwarded by the routing module 230 either. In this case, the routing module 230 may be connected to the electrical contact 201, the electrical contact 203, the electrical contact 204, the electrical contact 205, the electrical contact 207, and the electrical contact 208, to receive and forward data transmitted by using the six electrical contacts, or send, to the SOC 111 by using the six electrical contacts, data sent by the SIM card module 231 and the memory card control module 232. (3) SIM Card Module 231

The SIM card module 231 may be configured to implement a function of the multi-function card 200 as the nano-SIM card, for example, performing subscriber identity identification, and storing an SMS message, a telephone number, and a call record. Data stored in the SIM card module 231 may include an IMSI, an authentication key and an encryption algorithm, a PIN, and a PUK.

When receiving an instruction used to instruct to perform subscriber identity identification, the SIM card module 231 may perform an operation by using data such as the IMSI and the authentication key, to obtain data used to indicate a subscriber identity corresponding to the multi-function card 200, and send, to the SOC 111, the data used to indicate the subscriber identity corresponding to the multi-function card 200. When receiving an instruction used to store data (such as an SMS message, a telephone number, and a call record) and data that needs to be stored, the SIM card module 231 may store the data that needs to be stored. When receiving an instruction used to read data (such as an SMS message, a telephone number, and a call record), the SIM card module 231 may forward, to the SOC 111 by using the routing module 230, data that needs to be read. The SIM card module 231 has a small storage capacity, and may be configured to store a small amount of data (such as an SMS message, a telephone number, and a call record).

(4) Memory Card Control Module 232 and Flash Memory 233

The memory card control module 232 and the flash memory 233 may be configured to implement a function of the multi-function card 200 as the UFS memory card, that is, expand a storage capacity of the electronic device 100. The flash memory 233 is a storage medium specifically configured to store data. The flash memory 233 may be configured to store data such as a picture, audio, a video, or a program. The memory card control module 232 may be configured to be controlled to read data from or write data into the flash memory 233. Specifically, when receiving an instruction used to read data and data indicating a location at which the data that needs to be read is stored, the memory card control module 232 may read, from the flash memory 233, the data that needs to be read, and send the data to the SOC 111. When receiving an instruction used to store data and data that needs to be stored, the memory card control module 232 may write, into the flash memory 233, the data that needs to be stored.

In some embodiments, the memory card control module 232 and the routing module 230 may be integrated into one module. This is not limited in this embodiment of this application.

A protocol used when the multi-function card 200 implements a function of storage expansion may be a UFS protocol. In the UFS protocol, a data input interface and a data output interface are separated. The multi-function card 200 may simultaneously read and write data when implementing the function of storage expansion. Specifically, data sent by the SOC 111 to the memory card control module 232 in the multi-function card 200 may be transmitted by using RX+(namely, the electrical contact 203) and RX− (namely, the electrical contact 204), and data sent by the memory card control module 232 in the multi-function card 200 to the electronic device 100 may be transmitted by using TX+ (namely, the electrical contact 205) and TX− (namely, the electrical contact 208).

In this embodiment of this application, a storage medium that is in the multi-function card 200 and that is configured to implement the function of the UFS memory card is not limited. In addition to a flash memory, the storage medium may be another non-volatile memory and the like.

(5) SOC 111

The SOC 111 may include a communication module 111A and a storage module 111B. The communication module 111A may be the foregoing module that is in the electronic device and that is configured to perform mobile communication. The communication module 111A may be configured to indicate the multi-function card 200 to perform subscriber identity identification, and may be further configured to store small-capacity data (such as an SMS message, a telephone number, and a call record) into the SIM card module 231 in the multi-function card 200. The storage module 111B may be the foregoing module that is in the electronic device and that is configured to manage external storage. The storage module 111B may be configured to indicate the multi-function card 200 to store data into the flash memory 233 in the multi-function card 200, for example, a picture, audio, a video, and an application program. The storage module 111B may be further configured to read data from the flash memory 233 in the multi-function card 200, to display, on the electronic device 100, data stored in the flash memory 233.

The communication module 111A and the storage module 111B each may exchange data with the multi-function card 200 by using the electrical connector electrically connected to the electrical contact.

The SOC 111 may further include a module such as a microprocessor (not shown in the figure). The SOC 111 may control, by using the microprocessor, the communication module 111A and the storage module 111B to be connected to or disconnected from an electrical connector. The microprocessor may be connected to the electrical connector, and may be connected to or disconnected from the communication module 111A and the storage module 111B. For example, the microprocessor may be a logic circuit, a software switch, or a hardware switch, and may be configured to control the communication module 111A to be connected or disconnected from the electrical connector. The electrical connector may be at least one of the electrical connectors electrically connected to the electrical contacts 201 to 208. The microprocessor may be further configured to control the storage module 111B to be connected to or disconnected from an electrical connector. The electrical connector may be at least one of the electrical connectors electrically connected to the electrical contacts 201 to 208. For example, the SOC 111 controls, by using the microprocessor, the communication module 111A to be connected to the electrical connector, and the multi-function card 200 may transmit data to the communication module 111A by using at least one of the electrical contacts 201 to 208. The SOC 111 controls, by using the microprocessor, the storage module 111B to be connected to the electrical connector, and the multi-function card 200 may transmit data to the storage module 111B by using at least one of the electrical contacts 201 to 208.

Specifically, that the microprocessor is connected to or disconnected from the communication module 111A may represent that the electrical connector is connected to or disconnected from the communication module 111A. That the microprocessor is connected to or disconnected from the storage module 111B may represent that the electrical connector is connected to or disconnected from the communication module 111A. In this way, the electrical connector may be configured to transmit, in a time period, data exchanged between the communication module 111A and the SIM card module 231, or data exchanged between the storage module 111B and the memory card control module 232. In addition, the SOC 111 may transmit data from the multi-function card 200 to a correct module (the communication module 111A or the storage module 111B).

That the communication module 111A is connected to the electrical connector may represent that the communication module 111A may send data to the multi-function card 200 by using the electrical connector, and may receive data sent by the multi-function card 200 to the electronic device 100 by using the electrical connector. That the communication module 111A is disconnected from the electrical connector may represent that the communication module 111A cannot exchange data with the multi-function card 200. For meanings represented when the storage module 111B is connected to and disconnected from the electrical connector, refer to the foregoing meanings represented when the communication module 111A is connected to and disconnected from the electrical connector.

For example, when the multi-function card 200 works as the nano-SIM card, for example, when the electronic device is powered on to initially access a network, the SOC 111 may connect the communication module 111A to the electrical connector and disconnect the storage module 111B from the electrical connector by using the microprocessor. The communication module 111A may send, to the multi-function card 200 by using the electrical connector, an instruction used to instruct to perform subscriber identity identification. The instruction used to instruct to perform subscriber identity identification includes a data identifier. The data identifier may indicate that a receiver of the data is the SIM card module 231. Further, the routing module 230 may send, to the SIM card module 231, the instruction used to instruct to perform subscriber identity identification. The SIM card module 231 may send, to the SOC 111 by using the routing module 230, data indicating subscriber identity information. Because the communication module 111A is connected to the electrical connector, the communication module 111A may receive the data indicating the subscriber identity information. Therefore, the electronic device 100 may communicate with a network device to complete subscriber identity identification. In addition, after sending the data indicating the subscriber identity information, the SIM card module 231 may send an instruction indicating that data sending is completed. When the communication module 111A receives the instruction indicating that data sending is completed, the SOC 111 may disconnect the communication module 111A from the electrical connector by using the microprocessor.

When the multi-function card 200 works as the UFS memory card, for example, when the electronic device stores a video into the multi-function card 200, the SOC 111 may connect the storage module 111B to the electrical connector and disconnect the communication module 111A from the electrical connector by using the microprocessor. The storage module 111B may send, to the multi-function card 200 by using the electrical connector, video data that needs to be stored. The video data that needs to be stored includes a data identifier. The data identifier may indicate that a receiver of the data is the memory card control module 232. Further, the routing module 230 may send, to the memory card control module 232, the video data that needs to be stored. The memory card control module 232 may store the data into the flash memory 233. After completing data storage, the memory card control module 232 may send an instruction indicating that data storage is completed. When the storage module 111B receives the instruction indicating that data storage is completed, the SOC 111 may disconnect the storage module 111B from the electrical connector by using the microprocessor.

In some embodiments, the SOC 111 may control, by using the microprocessor, the communication module 111A to be in a working mode or a sleep mode, and may further control, by using the microprocessor, the storage module 111B to be in a working mode or a sleep mode. The working mode may represent that the communication module 111A and the storage module 111B may process data received from the multi-function card 200 by using the electrical connector. The sleep mode or a power saving mode may represent that the communication module 111A and the storage module 111B do not process the data received from the multi-function card 200 by using the electrical connector. In this way, when the communication module 111A in the SOC 111 exchanges data with the SIM card module 231 in the multi-function card 200, the SOC 111 may control, by using the microprocessor, the communication module 111A to be in a working mode and the storage module 111B to be in a sleep mode. Data from the SIM card module 231 may be received and processed by the communication module 111A. Alternatively, when the storage module 111B in the SOC 111 exchanges data with the memory card control module 232 in the multi-function card 200, the SOC 111 may control, by using the microprocessor, the storage module 111B to be in a working mode and the communication module 111A to be in a sleep mode. Data from the memory card control module 232 may be received and processed by the storage module 111B.

In this embodiment of this application, the multi-function card 200 implements the function of the nano-SIM card and the function of the UFS memory card by using the electrical contacts through time division multiplexing. In other words, in a time period, only one of the communication module 111A and the storage module 111B is connected to the electrical connector, and the other is disconnected from the electrical connector.

A manner in which the SOC 111 controls the communication module 111A and the storage module 111B to be connected to or disconnected from the electrical connector is not limited in this embodiment of this application.

A module included in the SOC 111 is not limited in this embodiment of this application. In addition to the communication module 111A, the storage module 111B, and the microprocessor, the SOC 111 may include more modules.

(6) Power Management Module 141

The power management module 141 may be configured to supply power to the SOC 111 and the multi-function card 200. The power management module 141 may include one or more power regulators. The power regulator may specifically assign a voltage of a battery in the electronic device 100 to each module. For example, the power management module 141 may include two power regulators: a first power regulator 141A and a second power regulator 141B.

The first power regulator 141A may be electrically connected to the electrical contact 202 by using the electrical connector, to provide a 3.3 V working voltage for the multi-function card 200. The first power regulator 141A may further supply power to the communication module 111A and the storage module 111B.

The second power regulator 141B may be electrically connected to the electrical contact 207 by using the electrical connector. When the multi-function card 200 works as the nano-SIM card, and the multi-function card 200 is configured to perform subscriber identity identification or store small-capacity data into the SIM card module 231, VPP (namely, the electrical contact 207) may be in an idle state, and the second power regulator 141B may provide a 3.3 V voltage. When the multi-function card 200 works as the UFS memory card, the second power regulator 141B may supply power to the UFS memory card control module 232 in the multi-function card 200 by using VCCQ (namely, the electrical contact 207).

In some embodiments, the first power regulator 141A and the second power regulator 141B may first provide a same 1.8 V working voltage for the electrical contact 202 and the electrical contact 207 respectively. Then, based on whether the multi-function card 200 works as the nano-SIM card or the UFS memory card, the first power regulator 141A and the second power regulator 141B may regulate a value of the voltage. For example, when the communication module 111A in the SOC 111 exchanges data with the SIM card module 231 in the multi-function card 200 by using the electrical connector, the multi-function card 200 works as the nano-SIM card. The first power regulator 141A may provide a 1.8 V or 3.3 V working voltage. When the storage module 111B in the SOC 111 exchanges data with the memory card control module 232 in the multi-function card 200 by using the electrical connector, the multi-function card 200 works as the UFS memory card. The first power regulator 141A and the second power regulator 141B may provide a 1.2 V, 1.8 V, or 3.3 V working voltage.

(7) NFC Chip 112

The NFC chip 112 may be configured to perform near field communication by the electronic device. The NFC chip 112 may exchange data with the SIM card module 231 in the multi-function card 200 by using an electrical contact electrically connected to VPP (namely, the electrical contact 207), to implement a bus card swiping function. For an implementation in which the NFC chip is connected to the multi-function card 200 by using VPP, to implement the bus card swiping function, refer to the descriptions of the electrical contact 605 of the SIM card shown in FIG. 1. Details are not described herein again.

In this embodiment of this application, a function implemented by the NFC chip 112 by connecting to the multi-function card 200 by using VPP is not limited. In addition to the bus card swiping function, another function may be implemented.

The multi-function card 200 is not merely connected to the NFC chip 112, and the multi-function card 200 may be connected to another chip in the electronic device 100 by using VPP.

In some embodiments, the communication module 111A and the storage module 111B may be connected to the electrical connector by using the routing module, and a signal sent by the multi-function card 200 to the electronic device 100 also includes a data identifier. In this way, the SOC 111 may not need to control, by using the microprocessor, the communication module 111A and the storage module 111B to be connected to or disconnected from the electrical connector. Signals sent by the communication module 111A and the storage module 111B to the multi-function card 200 may be forwarded by the routing module. When receiving a signal from the multi-function card 200, the routing module may forward the signal to a correct module, namely, the communication module 111A or the storage module 111B, based on a data identifier in the signal.

When sending data to the SIM card module 231 in the multi-function card 200, the communication module 111A may add a data identifier into the data. When sending data to the memory card control module 232 in the multi-function card 200, the storage module 111B may add a data identifier into the data. Alternatively, the routing module configured to connect the communication module 111A to the electrical connector and connect the storage module 111B to the electrical connector may add, based on whether received data is from the communication module 111A or the storage module 111B, a data identifier into the data, and send the data to the multi-function card. When sending data to the communication module 111A in the SOC 111, the SIM card module 231 may add a data identifier into the data. When sending data to the storage module 111B in the SOC 111, the memory card control module 232 may add a data identifier into the data. Alternatively, the routing module 230 may add, based on whether received data is from the SIM card module 231 or the memory card control module 232, a data identifier into the data, and send the data to the SOC 111.

In this embodiment of this application, in a process of exchanging data between the communication module 111A and the SIM card module 231, clock signals referenced when the communication module 111A and the SIM card module 231 receive and send data are the same. The clock signal may be provided by the communication module 111A or provided by the multi-function card 200. In addition, in a process of exchanging data between the storage module 111B and the memory card control module 232, clock signals referenced when the storage module 111B and the memory card control module 232 receive and send data are the same. The clock signal may be provided by the storage module 111B or provided by the multi-function card 200. A module that provides the clock signal is not limited in this embodiment of this application.

It should be noted that, when the multi-function card 200 is inserted into the electronic device 100, the electronic device 100 may perform card identification. Specifically, the electronic device 100 may first detect whether the card can implement a function of subscriber identification, that is, identify whether the card is a SIM card. Then, the electronic device 100 may detect whether the card can implement a function of storage expansion, that is, identify whether the card is a memory card. If the card can implement the function of subscriber identification, the card may be a SIM card or the multi-function card 200. If the card can implement the function of storage expansion, the card may be a memory card or the multi-function card 200. If the card can implement both the function of subscriber identification and the function of storage expansion, the card may be the multi-function card 200.

For an implementation in which the electronic device 100 identifies whether a card mounted in the electronic device is a SIM card and whether the card is a memory card, refer to a conventional-technology implementation of identifying the SIM card and the memory card. This is not limited in this embodiment of this application.

A sequence in which the electronic device identifies whether the card mounted in the electronic device is a SIM card and whether the card is a memory card is not limited in this embodiment of this application.

In some embodiments, the multi-function card 200 may be used only as a memory card. For example, when the SIM card module 231 in the multi-function card 200 stores no information such as subscriber information (such as an IMSI) and an authentication key, or the multi-function card 200 that may work as the SIM card is unsubscribed, the multi-function card 200 cannot identify a subscriber, cannot be used or is no longer used for subscriber identity identification, and is no longer used for authentication to enable the electronic device to access the network. However, the memory card control module 232 and the flash memory 233 in the multi-function card 200 may be still configured to store data.

The following describes an implementation in which the multi-function card 200 works as the SIM card and works as the memory card.

When the multi-function card 200 is inserted into the electronic device 100, the electronic device 100 may implement subscriber identity identification by using the multi-function card 200, and then access the network by using the network device. When the electronic device 100 accesses the network, the electronic device 100 may be used to answer and make a call, send/receive an SMS message, or use a mobile data service (for example, send/receive a message by using a WeChat application, browse a web page, and download a video from a website). The electronic device 100 may further implement storage expansion by using the multi-function card 200, to store more data, for example, a picture, audio, a video, and an application program. The multi-function card 200 may be configured to implement a function of the SIM card and a function of the memory card by using the electrical contacts through time division multiplexing. In other words, in a time period, the multi-function card 200 may work as the SIM card or works as the memory card.

Figure 7:
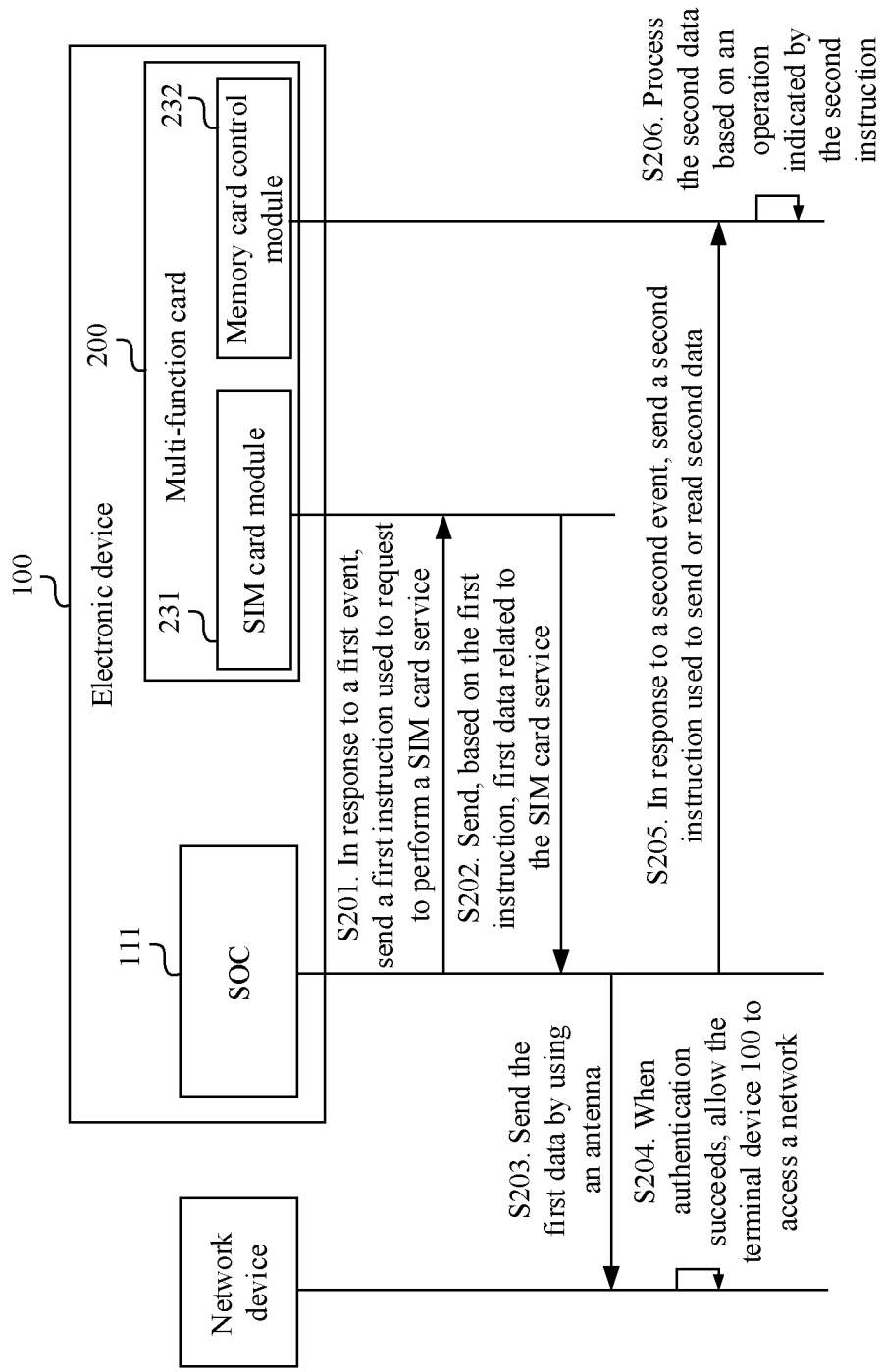
FIG. 7 is a flowchart of a method for transmitting data by a multi-function card according to an embodiment of this application.

FIG. 7 is an example flowchart of a method in which a multi-function card 200 works as a SIM card and works as a memory card. As shown in FIG. 7, step S201 to step S204 are a process in which the multi-function card 200 works as the SIM card, and step S205 and step S206 are a process in which the multi-function card 200 works as the memory card.

S201. In response to a first event, the SOC 111 sends, to the SIM card module 231 in the multi-function card 200, a first instruction used to request to perform a SIM card service.

The first event may be an event indicating the electronic device 100 to request to access a network, for example, a subscriber operation of powering on the electronic device, a subscriber operation of inserting the multi-function card 200 into the electronic device, a subscriber operation of enabling a mobile data function, and the electronic device needs to switch, in a movement process, a network device that provides network access. The first event is not limited in this embodiment of this application.

In response to the first event, the SOC 111 may control, by using the microprocessor, the communication module 111A to be connected to the electrical connector and the storage module 111B to be disconnected from the electrical connector. The communication module 111A may send, to the SIM card module 231 in the multi-function card 200 by using the electrical connector electrically connected to the electrical contact of the multi-function card 200, the first instruction used to request to perform the SIM card service. The SIM card service may be an operation in which the SIM card module 231 performs an operation to obtain data that can be used by the electronic device 100 to access the network.

It should be noted that, when sending the first instruction, the communication module 111A may add a data identifier into the first instruction. The data identifier may indicate that a receiver of the first instruction is the SIM card module 231 in the multi-function card 200. The routing module 230 in the multi-function card 200 may send the first instruction to the SIM card module 231 based on the data identifier in the first instruction.

S202. The multi-function card 200 sends, to the SOC 111 based on the first instruction, first data related to the SIM card service.

The SIM card module 231 stores an authentication key. When receiving the first instruction, the SIM card module 231 in the multi-function card 200 may perform a corresponding operation by using the authentication key and an encryption algorithm, to obtain the first data related to the SIM card service, for example, mobile network subscription data. The first data may be used by the electronic device 100 to access the network. The SIM card module 231 may send the first data to the routing module 230. The routing module 230 may send the first data to the SOC 111 by using the electrical contact. The communication module 111A in the SOC 111 is connected to the electrical connector, and may receive the first data. Optionally, the routing module 230 may add a data identifier into the first data. In this way, the microprocessor controller controls the communication module 111A to be connected to the electrical connector, so that the communication module 111A can receive the first data.

In some embodiments, both the communication module 111A and the storage module 111B may be connected to the electrical connector. In response to the first event, the communication module 111A may send the first instruction to the routing module 230 in the multi-function card 200 by using the electrical connector electrically connected to the electrical contact. The routing module 230 may determine that the first instruction is sent by the communication module 111A, then send the first instruction to the SIM card module 231, and send, to the SOC 111, the first data received from the SIM card module 231. Both the communication module 111A and the storage module 111B in the SOC 111 may receive the first data. However, the storage module 111B cannot identify the first data. After receiving the first data, the storage module 111B may directly discard the first data. The SIM card module 231 or the routing module 230 may perform encryption processing on the first data. In this way, after the SOC 111 receives the first data, only the communication module 111A can identify and process the encrypted first data, to ensure security when the SIM card module 231 performs the SIM card service and the electronic device 100 accesses the network.

Optionally, the first data from the SIM card module 231 may include a data identifier. The data identifier may be added by the SIM card module 231 or the routing module 230. The data identifier may indicate that a receiver of the first data is the communication module 111A. In other words, the communication module 111A may identify the data identifier, and then process the first data. Both the communication module 111A and the storage module 111B may be connected to the electrical connector. When the routing module 230 sends the first data to the SOC 111 by using the electrical contact, both the communication module 111A and the storage module 111B may receive the first data. However, the storage module 111B cannot identify the data identifier in the first data, and the storage module 111B may directly discard the first data.

An operation manner in which the SIM card module 231 obtains the first data by performing an operation by using the authentication key and the encryption algorithm is not limited in this embodiment of this application.

Specific content of the first data is not limited in this embodiment of this application.

S203. The SOC 111 sends the first data to the network device by using an antenna.

S204. When authentication performed by the network device succeeds, the network device allows the electronic device 100 to access the network.

The network device may perform subscriber identity authentication based on the first data. For example, the network device may be a network device such as a base station, a home gateway, a private network access point, a core network authentication gateway, and a satellite communication access point.

If authentication performed by the network device succeeds, the network device may allow the electronic device 100 to access the network. After accessing the network, the electronic device 100 may implement, for example, a function of answering and making a call, sending/receiving an SMS message, and using a mobile data service.

If authentication performed by the network device does not succeed, the network device cannot provide network access for the electronic device 100.

A specific manner in which the network device performs authentication is not limited in this embodiment of this application.

S205. In response to a second event, the SOC 111 sends, to the memory card control module 232 in the multi-function card 200, a second instruction used to send or read second data.

The second event may be an event indicating the SOC 111 in the electronic device 100 to send data to an external memory card or read data from an external memory card. The event of sending the data to the external memory card may be an event of storing the data into the external memory card or an event of sending the data to the external memory card for encryption processing. The event of reading data from the external memory card may be an event of reading data stored in the external memory card or an event of reading data on which the external memory card performs encryption processing.

The second event is not limited in this embodiment of this application. The second event may be another event indicating the SOC 111 in the electronic device 100 to exchange data with the memory card control module 232.

The second data may be a picture, audio, a video, and an application program. A type of the second data is not limited in this embodiment of this application.

In some embodiments, the second event is an event of storing the second data into the memory card control module 232 in the multi-function card 200. The SOC 111 may control, by using the microprocessor, the storage module 111B to be connected to the electrical connector and the communication module 111A to be disconnected from the electrical connector. The storage module 111B may send the second instruction to the multi-function card 200 by using the electrical connector electrically connected to the electrical contact of the multi-function card 200. The storage module 111B may further send, to the multi-function card 200, the second data that needs to be stored into the memory card control module 232. The second instruction may instruct the memory card control module 232 to store the second data into the flash memory 233.

It should be noted that, when sending the second instruction and the second data, the storage module 111B may add a data identifier into each of the second instruction and the second data. The data identifier may indicate that a receiver of the second instruction and the second data is the memory card control module 232 in the multi-function card 200. The routing module 230 in the multi-function card 200 may send the second instruction to the memory card control module 232 based on the data identifier in the second instruction. The routing module 230 further sends the second data to the memory card control module 232 based on the data identifier in the second data.

In some embodiments, the memory card control module 232 further includes an encryption module. The second event is an event of sending the second data to the memory card control module 232 for encryption processing. The SOC 111 may send the second instruction to the memory card control module 232, and send the second data to the memory card control module 232. The second instruction may be used to instruct the encryption module in the memory card control module 232 to perform encryption processing on the second data. The second data that needs to be encrypted may be voice data in a voice call process and video data in a video call process. Optionally, the memory card control module 232 and the encryption module may be two separate modules.

In some embodiments, the second event is an event of reading the second data stored in the flash memory 233 in the multi-function card 200. The SOC 111 may send the second instruction to the memory card control module 232. The second instruction may be used to instruct the memory card control module 232 to read the second data from the flash memory 233, and send the second data to the SOC 111.

In some embodiments, the second event is to read the second data on which the encryption module in the memory card control module 232 performs encryption processing. The SOC 111 may send the second instruction to the memory card control module 232. The second instruction may be used to instruct the encryption module in the memory card control module 232 to send, to the SOC 111, the second data on which encryption processing is performed. The second data on which encryption processing is performed may be voice data in a voice call process and video data in a video call process.

S206. The memory card control module 232 in the multi-function card 200 processes the second data based on an operation indicated by the second instruction.

The method for processing the second data based on the operation indicated by the second instruction includes at least one of the following:

When the second instruction instructs to store the second data, the memory card control module 232 may store the second data into the flash memory 233;

when the second instruction instructs to encrypt the second data, the encryption module in the memory card control module 232 may encrypt the second data;

when the second instruction instructs to read the second data stored in the flash memory 233, the memory card control module 232 may read the second data from the flash memory 233, and send the second data to the SOC 111; and when the second instruction instructs to read the second data on which the encryption module in the memory card control module 232 performs encryption processing, the encryption module in the memory card control module 232 may send, to the SOC 111, the second data on which encryption processing is performed.

In some embodiments, both the communication module 111A and the storage module 111B may be connected to the electrical connector. In response to the second event, the storage module 111B may send the second instruction to the routing module 230 in the multi-function card 200 by using the electrical connector electrically connected to the electrical contact. The routing module 230 may determine that the second instruction is sent by the storage module 111B, and then send the second instruction to the memory card control module 232. If the second instruction is an instruction that instructs the memory card control module 232 to read the second data, the routing module 230 may send the second data from the memory card control module 232 to the SOC 111. Both the communication module 111A and the storage module 111B in the SOC 111 may receive the second data. However, the communication module 111A cannot identify the second data. After receiving the second data, the communication module 111A may directly discard the second data.

When working as the SIM card, the multi-function card 200 may be used by the electronic device to perform subscriber identity authentication with the network device, and access and use the network. When working as the memory card, the multi-function card 200 may store data (such as a picture, audio, a video, and an application program) to expand a storage capacity of the electronic device. When working as the memory card, the multi-function card 200 may be further configured to perform encryption processing on the voice data in the voice call process and the video data in the video call process.

In addition, when working as the SIM card, the multi-function card 200 may be further configured to store small-capacity data such as an SMS message, a telephone number, and a call record. The data may be specifically stored into the SIM card module 231 in the multi-function card 200. The SOC 111 may read, based on a received subscriber operation of reading data stored in the SIM card module 231, the data stored in the SIM card module 231. When the multi-function card 200 works as the UFS memory card, the SOC 111 may read, based on a received subscriber operation of reading data stored in the flash memory 233, the data stored in the flash memory 233.

The multi-function card shown in FIG. 7 may be configured to implement functions of a plurality of different types of SIM cards, for example, a mini-SIM card, a micro-SIM card, a nano-SIM card, an electronic SIM card, an eSIM card, and an iSIM card. The multi-function card shown in FIG. 7 may be configured to implement functions of a plurality of different types of memory cards, for example, a UFS memory card, a PCIe memory card, an NM card, and a micro SD card. In other words, the multi-function card shown in FIG. 7 may be a multi-function card 300 shown in FIG. 12 and a multi-function card 400 shown in FIG. 14.

The following specifically describes, by using an example in which the first event is the subscriber operation of enabling the mobile data function and the second event is the subscriber operation of storing video data into the multi-function card 200, a method in which the multi-function card 200 works as the nano-SIM card and works as the UFS memory card.

Figure 8:
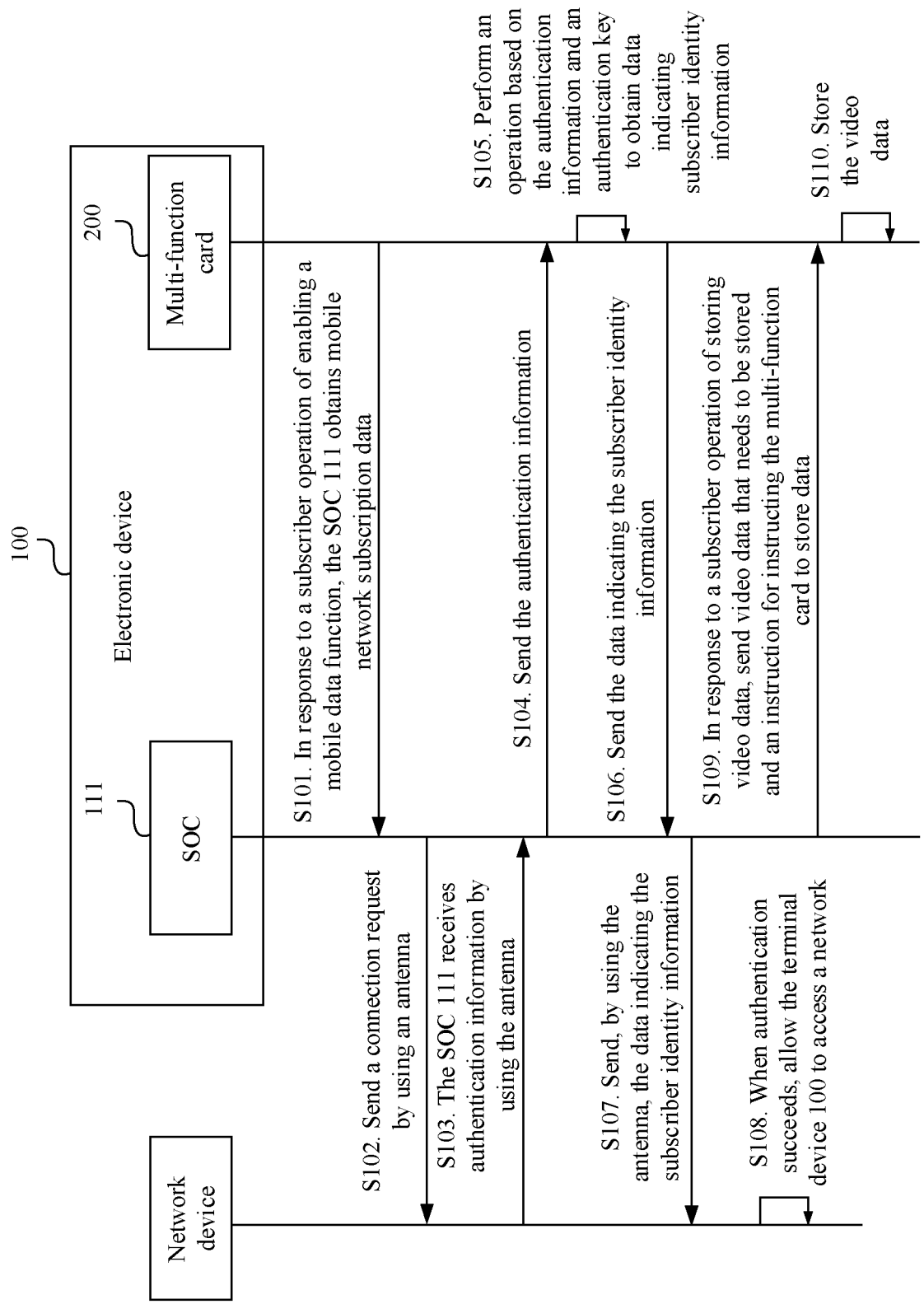
FIG. 8 is a flowchart of a method for transmitting data by a multi-function card according to an embodiment of this application.

FIG. 8 is an example flowchart of a method in which a multi-function card 200 works as a nano-SIM and works as a UFS memory card. As shown in FIG. 8, step S101 to step S108 are a process in which the multi-function card 200 works as the nano-SIM card, and step S109 and step S110 are a process in which the multi-function card works as the UFS memory card.

S101. In response to the subscriber operation of enabling the mobile data function, the SOC 111 obtains mobile network subscription data.

The mobile data function in the electronic device 100 is in a disabling state. In other words, the electronic device cannot use a mobile data service, for example, browse a web page and download a video from a website. In response to the subscriber operation of enabling the mobile data function, for example, a touch operation performed on the mobile data function in a disabling state, the SOC 111 in the electronic device 100 may send, to the multi-function card 200, an instruction used to obtain the mobile network subscription data. The SOC 111 may receive the mobile network subscription data from the multi-function card 200, for example, an IMSI and an authentication parameter. That the SOC 111 sends, to the multi-function card 200, the instruction used to obtain the mobile network subscription data is specifically that the communication module 111A in the SOC 111 sends the instruction used to obtain the mobile network subscription data. That the SOC 111 receives the mobile network subscription data from the multi-function card 200 is specifically that the communication module 111A in the SOC 111 receives the mobile network subscription data from the SIM card module 231 in the multi-function card 200.

Specifically, in response to the subscriber operation of enabling the mobile data function, the electronic device 100 may provide a working voltage for the multi-function card 200 by using the power management module 141. The first power regulator may be electrically connected to VCC (namely, the electrical contact 202) by using the electrical connector, to provide a 3.3 V working voltage for the multi-function card 200. The SOC 111 may connect the communication module 111A to the electrical connector and disconnect the storage module 111B from the electrical connector by using the microprocessor. The communication module 111A may send a clock signal to the multi-function card 200 by using an electrical connector electrically connected to CLK1 (namely, the electrical contact 204). The clock signal may be a clock signal referenced when the nano-SIM card works, for example, 5 MHz. The communication module 111A may further send, to the multi-function card 200 by using an electrical connector electrically connected to IO (namely, the electrical contact 208), the instruction used to obtain the IMSI. The clock signal and the instruction used to obtain the IMSI that are sent by the communication module 111A to the multi-function card 200 each may include a data identifier. The data identifier may indicate that a receiver of the data is the SIM card module 231 in the multi-function card 200. In this way, the routing module 230 in the multi-function card 200 may forward, to the SIM card module 231 based on the data identifier, the clock signal and the instruction used to obtain the IMSI.

When receiving the instruction used to obtain the mobile network subscription data, the SIM card module 231 in the multi-function card 200 may send the mobile network subscription data to the SOC 111 by using the routing module 230. The mobile network subscription data may be transmitted through IO. Because the communication module 111A is connected to the electrical connector, the mobile network subscription data may be transmitted to the communication module 111A by using the electrical connector electrically connected to IO.

The mobile network subscription data imposes no limitation. The SOC 111 may obtain other data from the multi-function card 200 to send a connection request to the network device.

S102. The SOC 111 sends the connection request to the network device by using the antenna.

When receiving the mobile network subscription data, the SOC 111 may send the connection request to the network device by using the antenna in the electronic device 100. The connection request may include the mobile network subscription data.

For example, the network device is a base station. The electronic device 100 is located within coverage in which the base station sends/receives a signal. The SOC 111 in the electronic device 100 may send the connection request to the base station by using the antenna. The base station may be used to perform subscriber identity authentication. When authentication performed by the base station succeeds, the electronic device may access the network.

S103. The SOC 111 receives authentication information from the network device by using the antenna.

Based on the connection request sent by the electronic device 100, the network device may send the authentication information to the electronic device 100. The SOC 111 may receive the authentication information by using the antenna in the electronic device 100. For a manner of generating the authentication information, refer to a conventional-technology implementation. This is not limited in this embodiment of this application.

S104. The SOC 111 sends the authentication information to the multi-function card 200.

When receiving the authentication information, the communication module 111A in the SOC 111 may send the authentication information to the multi-function card 200 by using the electrical connector electrically connected to IO. The authentication information may be the first instruction mentioned in the foregoing embodiment, and may be used to request subscriber identity information from the multi-function card.

When sending the authentication information, the communication module 111A may add a data identifier into the authentication information. In this way, when the multi-function card 200 receives the authentication information, the routing module 230 may forward the authentication information to the SIM card module 231 based on the data identifier.

S105. The multi-function card 200 performs an operation based on the authentication information and an authentication key to obtain data indicating the subscriber identity information.

The SIM card module 231 in the multi-function card 200 stores the authentication key. When receiving the authentication information, the SIM card module 231 may perform an operation based on the authentication information and the authentication key, and obtain the data (namely, the first data mentioned in the foregoing embodiment) indicating the subscriber identity information. The data indicating the subscriber identity information may be used by the network device to perform subscriber identity authentication. For a manner in which the SIM card module 231 performs an operation based on the authentication information and the authentication key, refer to a conventional-technology manner in which the SIM card performs an operation based on the authentication information and the authentication key. This is not limited in this embodiment of this application.

S106. The multi-function card 200 sends the data indicating the subscriber identity information.

The SIM card module in the multi-function card 200 may send, to the SOC 111 by using the routing module 230, the obtained data indicating the subscriber identity information. The data indicating the subscriber identity information may be transmitted to the SOC by using the electrical contact electrically connected to IO. Because the communication module 111A is connected to the electrical connector, the communication module 111A may receive the data indicating the subscriber identity information.

It should be noted that in the process of performing step S101 to step S106, the communication module 111A and the electrical connector may always be connected to the electrical connector, and the storage module 111B is disconnected from the electrical connector. In this way, the electronic device 100 may exchange data with the SIM card module 231 in the multi-function card 200 by using the communication module 111A in the SOC 111, to perform subscriber identity identification, and a process of performing subscriber identity identification is not interrupted.

In some embodiments, when completing transmission of the data indicating the subscriber identity information, the SIM card module 231 in the multi-function card 200 may send an instruction used to indicate that data sending is completed. The instruction used to indicate that data sending is completed may be transmitted through IO. When the communication module 111A receives the instruction used to indicate that data sending is completed, the SOC 111 may disconnect the communication module 111A from the electrical connector by using the microprocessor. In this way, the electrical contact of the multi-function card 200 may be configured to process other data such as data of the electronic device that needs to be stored into the flash memory 233 in the multi-function card 200.

S107. The SOC 111 sends, to the network device by using the antenna, the data indicating the subscriber identity information.

S108. When authentication succeeds, the network device allows the electronic device 100 to access the network.

When receiving the data indicating the subscriber identity information, the network device may perform subscriber identity authentication based on the data indicating the subscriber identity information. For a specific implementation in which the network device performs subscriber identity authentication, refer to a conventional-technology implementation. This is not limited in this embodiment of this application.

If authentication succeeds, the network device may allow the electronic device 100 to access the network. In other words, the electronic device may use the mobile data service, for example, browse a web page and download a video from a website.

If authentication does not succeed, the network device cannot provide network access for the electronic device 100. The network device may send an authentication failure instruction to the electronic device 100. When receiving the authentication failure instruction, the electronic device 100 may repeat the foregoing step S101 to step S107 to perform subscriber identity identification again. For an operation performed by the electronic device 100 when authentication fails, refer to a conventional-technology implementation. This is not limited in this embodiment of this application.

In addition, in a process in which the electronic device 100 performs subscriber identity identification by using the multi-function card 200, RST (namely, the electrical contact 203) and VPP (namely, the electrical contact 207) may be in an idle state. In other words, no data is transmitted by using the two electrical contacts. Alternatively, the second power regulator may be connected to VPP, and provide a 3.3 V voltage. The electrical contact 201 and the electrical contact 205 are electrical contacts that are separately used when the multi-function card 200 works as the UFS memory card. Therefore, in a process in which the electronic device 100 performs subscriber identity identification by using the multi-function card 200, the electrical contact 201 and the electrical contact 205 may also be in an idle state.

In a process in which the electronic device 100 performs subscriber identity identification by using the multi-function card 200, clock signals referenced when the communication module 111A and the SIM card module 231 receive and send a signal are the same. The clock signal may be provided by the communication module 111A or provided by the multi-function card 200. A module configured to provide the clock signal is not limited in this embodiment of this application.

In this embodiment of this application, the network device that performs subscriber identity authentication is not limited. In addition to a base station, the network device may be another network device that can perform subscriber identity authentication on the electronic device.

S109. In response to the subscriber operation of storing video data, the SOC 111 sends, to the multi-function card 200, video data that needs to be stored and an instruction for instructing the multi-function card 200 to store data.

When the communication module 111A is disconnected from the electrical connector, in response to the subscriber operation of storing the video data, the SOC 111 may connect the storage module 111B connect to the electrical connector by using the microprocessor. The subscriber operation of storing the video may be used to indicate the electronic device 100 to store the video data into the multi-function card 200. For example, the subscriber operation may be a touch operation performed on a download control 661 in a user interface 660 shown in FIG. 10A.

Specifically, in response to the subscriber operation of storing the video data, the electronic device 100 may provide a working voltage for the multi-function card 200 by using the power management module 141. The first power regulator may be electrically connected to VCC (namely, the electrical contact 202) by using the electrical connector, to provide a 3.3 V working voltage for the multi-function card 200. The second power regulator may be electrically connected to VCCQ (namely, the electrical contact 207) by using the electrical connector, to provide a working voltage for the multi-function card 200, where a value of the working voltage may be 1.8 V. When the multi-function card 200 works as the UFS memory card, a speed of reading and writing data is high, and data may be read and written simultaneously. Therefore, the working voltage required by the multi-function card 200 needs to be higher. In other words, when the multi-function card 200 works as the UFS memory card, the electrical contact 202 and the electrical contact 207 each are configured to provide a working voltage for the multi-function card 200. A value of the working voltage provided by the first power regulator and the second power regulator is not limited in this embodiment of this application.

The storage module 111B may send a clock signal to the multi-function card 200 by using an electrical connector electrically connected to CLK2 (namely, the electrical contact 201). The clock signal may be a clock signal referenced when the UFS memory card works, for example, 25 MHz.

The storage module 111B may further send, to the multi-function card 200 by using electrical connectors electrically connected to RX+(namely, the electrical contact 203) and RX− (namely, the electrical contact 204), the instruction (namely, the second instruction mentioned in the foregoing embodiment) used to store data and the video data (namely, the second data mentioned in the foregoing embodiment) that needs to be stored.

The storage module 111B may add a data identifier into each of the clock signal, the instruction used to store data, and the video data that needs to be stored. The data identifier may indicate that a receiver of the data is the memory card control module 232 in the multi-function card 200. When the multi-function card 200 receives the clock signal, the instruction used to store data, and the video data that needs to be stored, the routing module 230 may forward, to the memory card control module 232 based on the data identifier, the clock signal, the instruction used to store data, and the video data that needs to be stored.

S110. The multi-function card 200 stores the video data.

When receiving data transmitted by using RX+ and RX−, the memory card control module 232 in the multi-function card 200 may compare a voltage difference between the data from the two electrical contacts to obtain the video data that needs to be stored. Data transmitted by the two electrical contacts RX+ and RX− has opposite phases, but indicated data is the same.

Further, the memory card control module 232 may store, into the flash memory 233, the video data that needs to be stored.

In some embodiments, after completing storage of the data that needs to be stored into the flash memory 233, the memory card control module 232 may send an instruction used to indicate that data storage is completed. The instruction used to indicate that data storage is completed may be transmitted by using TX+(namely, the electrical contact 205) and TX− (namely, the electrical contact 208). Data transmitted by using TX+ and TX− has opposite phases, but indicated data is the same. The storage module 111B may compare a voltage difference between data from the two electrical contacts to obtain the instruction used to indicate that data storage is completed. Then, the SOC 111 may disconnect the storage module 111B from the electrical connector by using the microprocessor.

In this embodiment of this application, the electronic device 100 includes a module (namely, the communication module 111A) configured to perform mobile communication and a module (namely, the storage module 111B) configured to manage external storage. The multi-function card 200 includes a module (namely the SIM card module 231) configured to implement the function of the SIM card and a module (namely, the memory card control module 232 and the flash memory 233) configured to implement the function of the memory card. The communication module 111A and the SIM card module 231 may exchange data by using the electrical contact of the multi-function card 200, to implement a function of subscriber identity identification. The storage module 111B and the memory card control module 232 may exchange data by using the electrical contact of the multi-function card 200, to expand a storage capacity of the electronic device. In other words, the multi-function card 200 may implement the function of the SIM card and the function of the memory card by using the electrical contacts through time division multiplexing. In this way, the multi-function card 200 may reduce physical space occupied by the SIM card and the memory card in the electronic device, and is conducive to lightening and thinning of the electronic device.

The following describes some other application scenarios in which the multi-function card 200 works as the nano-SIM card and works as the UFS memory card.

Scenario 1: During power-on, the electronic device 100 performs subscriber identity identification by using the multi-function card 200.

In some embodiments, the SOC 111 in the electronic device 100 may perform subscriber identity identification in response to a power-on subscriber operation. For example, the electronic device 100 is in a power-off state. In response to the power-on subscriber operation such as a long-press operation performed on a power-on/power-off button of the electronic device 100, the SOC 111 may obtain mobile network subscription data from the multi-function card 200. Further, the SOC 111, the multi-function card 200, and the network device may perform subscriber identity identification based on step S102 to step S108. If authentication performed by the network device succeeds, the network device may allow the electronic device 100 to access the network. In this way, the electronic device 100 may answer and make a call, and send/receive an SMS message.

Scenario 2: The electronic device 100 switches the network device in a movement process, and therefore performs subscriber identity identification again by using the multi-function card 200.

In some embodiments, the electronic device 100 is in a mobile state. For example, the electronic device 100 moves from coverage in which a first base station sends/receives a signal to coverage in which a second base station sends/receives a signal. The electronic device 100 may switch a base station that provides network access. Herein, that the network device is the first base station and the second base station is used as an example for description.

When moving to the coverage in which the second base station sends/receives a signal, the electronic device 100 needs to send a connection request to the second base station, to access the network again. In other words, when the electronic device needs to switch the base station due to movement, the SOC 111 may obtain mobile network subscription data from the multi-function card 200. Further, the SOC 111, the multi-function card 200, and the second base station may perform subscriber identity identification based on step S102 to step S108. For a specific implementation in which the base station that provides network access for the electronic device is switched from the first base station to the second base station, refer to a conventional-technology implementation. This is not limited in this embodiment of this application.

Scenario 3: The electronic device 100 stores an SMS message, a telephone number, and a call record into the multi-function card 200.

In some embodiments, the electronic device 100 may store small-capacity data such as an SMS message, a telephone number, and a call record into the SIM card module 231 in the multi-function card 200. In the foregoing data storage process, the communication module 111A in the SOC 111 may exchange data with the SIM card module 231 by using the electrical contact of the multi-function card 200.

Figure 9A:
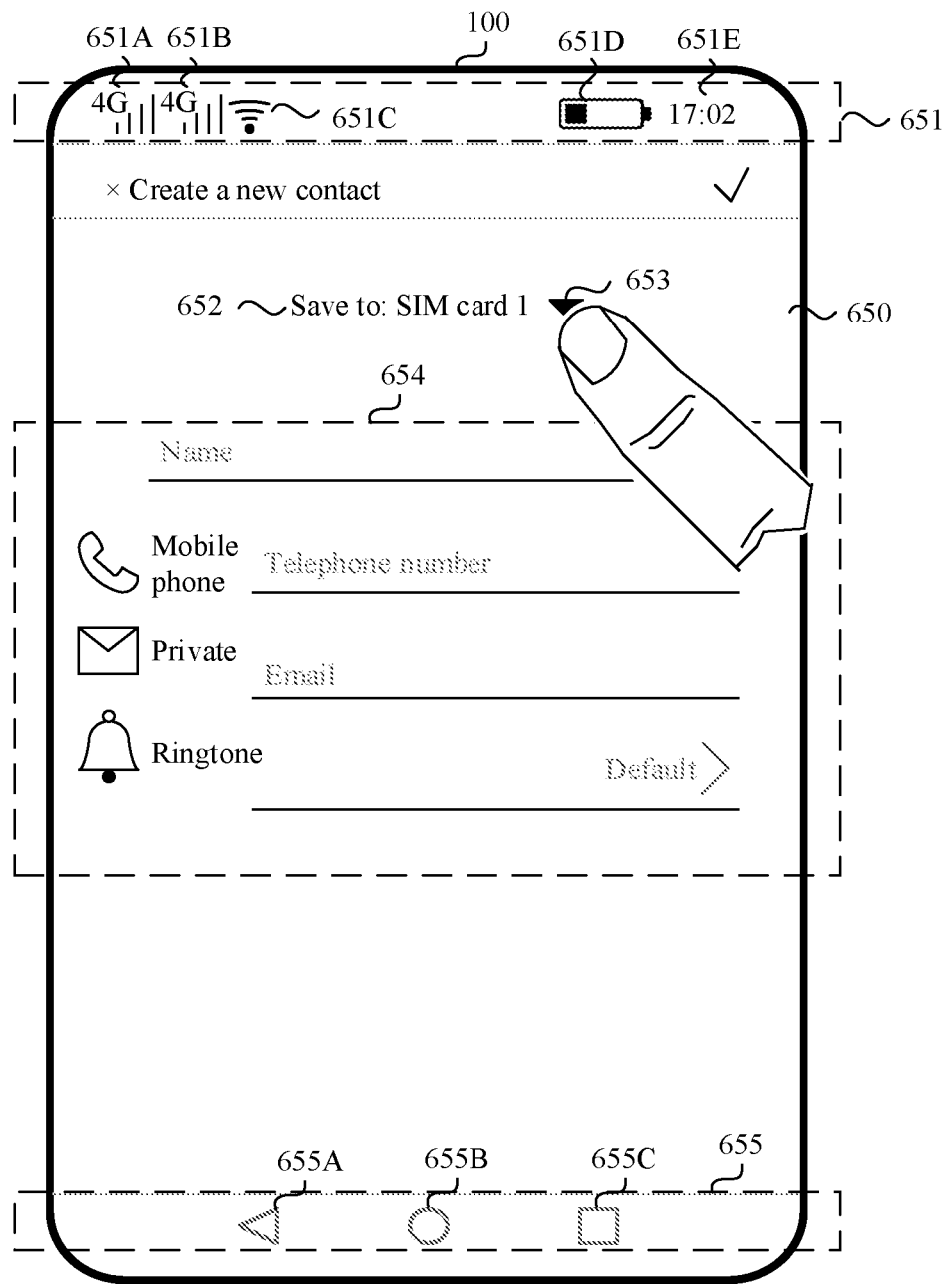
FIG. 9A, FIG. 9B, FIG. 10A, and FIG. 10B are schematic diagrams of some application scenarios in which a multi-function card transmits data according to an embodiment of this application.
Figure 9B:
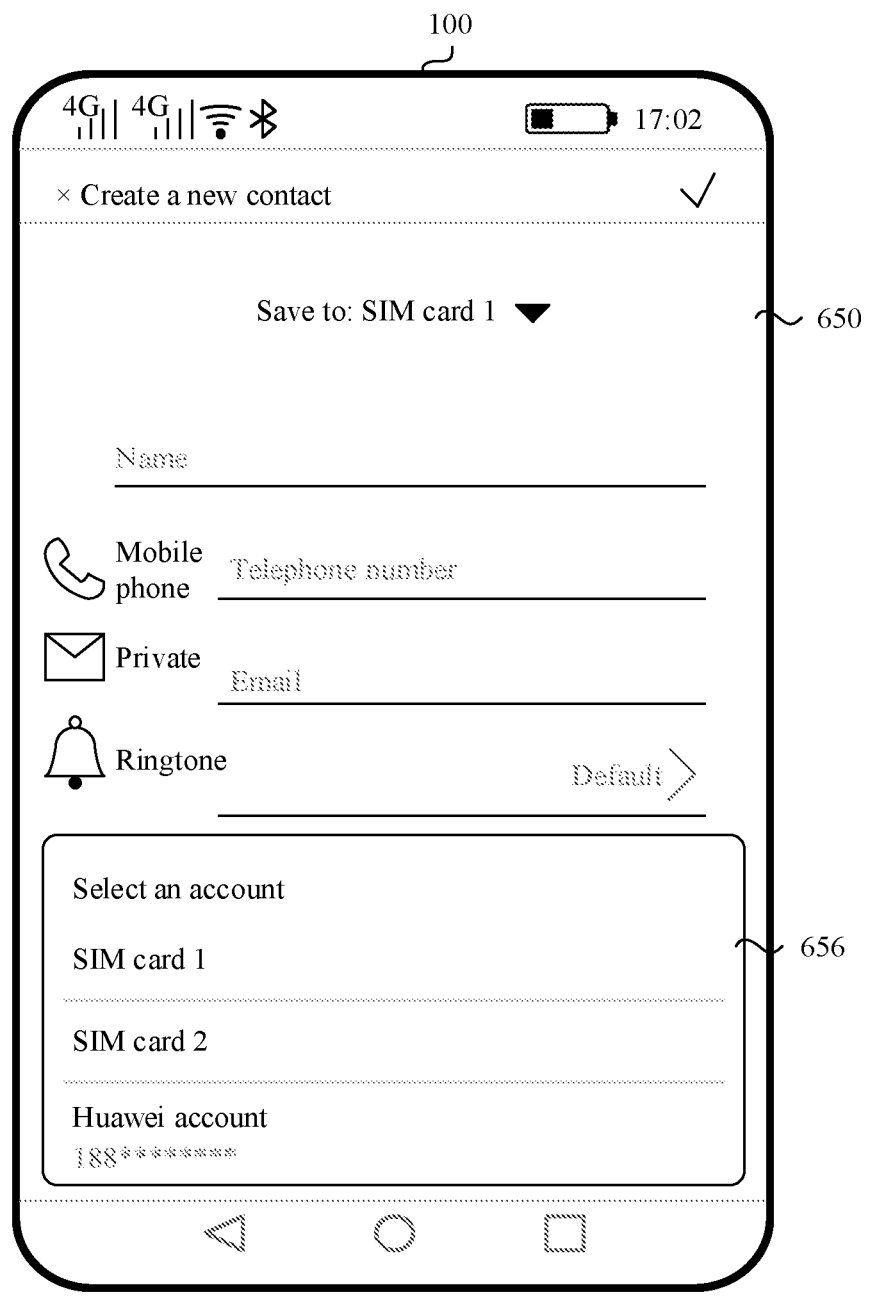

FIG. 9A and FIG. 9B show examples of a user interface in which an electronic device 100 stores a telephone number into a SIM card module 231 in a multi-function card 200. As shown in FIG. 9A, in response to a subscriber operation of creating a new contact in an address book, the electronic device 100 may display a user interface 650. The user interface 650 may include a status bar 651, a storage location prompt 652, a storage location option control 653, storage content 654, and a navigation bar 655. The address book may be an application program that is in the electronic device 100 and that is used to store a telephone number.

The status bar 651 may include one or more signal strength indicators of a mobile communication signal. For example, when a multi-function card 200 and a SIM card are inserted into the electronic device 100, the status bar 651 includes two signal strength indicators: a first signal strength indicator 651A and a second signal strength indicator 651B. The first signal strength indicator 651A may be used to indicate signal strength at which the electronic device 100 performs communication by using the SIM card module 231 in the multi-function card 200. The second signal strength indicator 651B may be used to indicate signal strength at which the electronic device 100 performs communication by using the SIM card. The status bar 651 may further include one or more signal strength indicators 651C of a wireless fidelity (wireless fidelity, Wi-Fi) signal, a battery status indicator 651D, and a time indicator 651E.

The storage location prompt 652 may be used to prompt for a storage location of contact information of a contact. For example, the contact information of the contact is stored into a SIM card 1. The SIM card 1 may be the SIM card module 231 in the multi-function card 200 in this embodiment of this application.

The storage location option control 653 may be used to select a storage location of contact information of a contact. In response to a subscriber operation such as a touch operation performed on the storage location option control 653, the electronic device 100 may display a user interface 650 shown in FIG. 9B. The user interface 650 in FIG. 9B includes a storage location option 656. The storage location option 656 may include one or more options: the SIM card 1, a SIM card 2, and a Huawei account. In response to a subscriber operation performed on any one of the storage location options 656, the location for which the storage location prompt 652 is prompted may be the foregoing selected option. In other words, the electronic device 100 may store the contact information of the contact to a location indicated by the foregoing selected option. The SIM card 2 may be a SIM card inserted into the electronic device 100. The Huawei account may indicate cloud storage space corresponding to the account.

The storage content 654 may be used by a subscriber to input contact information of a contact that needs to be stored, for example, a name, a telephone number, an email of the contact, and a prompt ring tone that is used by the electronic device 100 when a call is received from the contact.

The navigation bar 655 may include a return button 655A, a home screen (home screen) button 655B, and an outgoing task history button 655C. When detecting a subscriber operation performed on the return button 655A, the electronic device 100 may display a previous page of a current page. When detecting a subscriber operation performed on the home screen button 655B, the electronic device 100 may display a home screen. When detecting a subscriber operation performed on the outgoing task history button 655C, the electronic device 100 may display a task recently opened by the subscriber. Names of the navigation buttons may alternatively be other names. This is not limited in this application. In addition to a virtual button, each navigation button in the navigation bar 655 may be further implemented as a physical button.

In response to a subscriber operation of storing the contact information of the contact into the SIM card module 231 in the multi-function card 200, the SOC 111 may connect the communication module 111A to the electrical connector by using the microprocessor. The communication module 111A may send, to the multi-function card 200 by using an electrical connector electrically connected to IO (namely, the electrical contact 208), data indicating the contact information of the contact that needs to be stored. The routing module 230 may forward, to the SIM card module 231, the data indicating the contact information of the contact that needs to be stored. In this way, the SIM card module 231 may store the contact information of the contact that needs to be stored.

Scenario 4: The electronic device 100 reads a telephone number, an SMS message, and a call record from the multi-function card 200.

In some embodiments, the electronic device 100 may read an SMS message, a telephone number, and a call record that are stored in the SIM card module 231 in the multi-function card 200. In the foregoing data reading process, the communication module 111A in the SOC 111 may exchange data with the SIM card module 231 by using the electrical contact of the multi-function card 200.

For example, in response to a subscriber operation of opening an address book and viewing a telephone number stored in the SIM card module 231, the SOC 111 may connect the communication module 111A to the electrical connector by using the microprocessor. The communication module 111A may send, to the multi-function card 200 by using an electrical connector electrically connected to IO (namely, the electrical contact 208), an instruction used to obtain the telephone number that needs to be viewed. The routing module 230 may forward, to the SIM card module 231, the instruction used to obtain the telephone number that needs to be viewed. Further, the SIM card module 231 may send, to the SOC by using the routing module 230 through IO, data indicating the telephone number that needs to be viewed. When receiving the data indicating the telephone number that needs to be viewed, the SOC 111 may send the data to the address book application program. In this way, the electronic device 100 may display, in a user interface, the telephone number that a subscriber needs to view.

Alternatively, when the multi-function card 200 is inserted into the electronic device 100, the SOC 111 may read in advance the telephone number, the SMS message, and the call record that are stored in the SIM card module 231 in the multi-function card 200, and store the data in a cache of the electronic device 100. For an implementation in which the SOC 111 reads in advance the telephone number, the SMS message, and the call record in the SIM card module 231, refer to the descriptions in the foregoing embodiment. Details are not described herein again. In response to a subscriber operation of opening an address book and viewing a telephone number stored in the SIM card module 231, the SOC 111 may read, from the cache, data indicating the telephone number that needs to be viewed, and send the data to the address book application program. In this way, the electronic device 100 may display, in a user interface, the telephone number that a subscriber needs to view. In addition, when detecting that the multi-function card 200 is removed from the electronic device 100, the electronic device 100 may delete the telephone number, the SMS message, and the call record that are read in advance from the SIM card module 231 and that are stored in the cache. In the foregoing implementation, the SOC 111 may read, from the cache, the telephone number, the SMS message, and the call record that are stored in the SIM card module 231, and does not need to exchange, by using the electrical contact of the multi-function card 200, data with the SIM card module each time the subscriber operation of opening the address book and viewing the telephone number, the SMS message, and the call record that are stored in the SIM card module 231 is detected.

Scenario 5: The electronic device 100 reads a picture, audio, and a video from the multi-function card 200.

In some embodiments, in response to a subscriber operation of reading data (such as video data) stored in the flash memory 233 in the multi-function card 200, the storage module 111B in the SOC 111 may exchange data with the memory card control module 232 by using the electrical contact of the multi-function card 200.

For example, in response to the subscriber operation of reading the video data stored in the flash memory 233, the SOC 111 may connect the storage module 111B to the electrical connector by using the microprocessor. The storage module 111B may send, to the multi-function card 200 by using electrical connectors electrically connected to RX+(namely, the electrical contact 203) and RX− (namely, the electrical contact 204), an instruction used to obtain the video data that needs to be read. The routing module 230 may forward, to the memory card control module 232, the instruction used to obtain the video data that needs to be read. Further, the memory card control module 232 may read, from the flash memory 233, the video data that needs to be read, and send the data to the SOC 111 by using the routing module 230 through TX+(namely, the electrical contact 205) and TX− (namely, the electrical contact 208). In this way, the SOC 111 may send, to an application program that requires the video data, the video data that needs to be read, for example a video player, to complete a function of reading data from the flash memory 233 in the multi-function card 200. In the foregoing process of reading data from the flash memory 233 in the multi-function card 200, for data transmitted by using the electrical contact 201, the electrical contact 202, the electrical contact 206, and the electrical contact 207, refer to the descriptions that the SOC 111 stores data into the flash memory 233. Details are not described herein again.

The data read from the flash memory 233 in the multi-function card 200 is not limited to a picture, audio, and a video, and may be other data stored in the flash memory 233.

Scenario 6: When performing subscriber identity identification, the electronic device 100 detects a subscriber operation of storing picture data into the multi-function card 200.

In some embodiments, when the electronic device 100 is powered on and then performs subscriber identity identification by using the multi-function card 200, if a subscriber operation of storing picture data (for example, picture data obtained by a camera of the electronic device 100 through photographing) into the multi-function card 200 is detected, the SOC 111 may first exchange data with the SIM card 231 by using the electrical contact of the multi-function card 200, to complete subscriber identity identification. Then, the SOC 111 may exchange data with the memory card control module 232 by using the electrical contact of the multi-function card 200, to complete data storage.

Generally, a time required for performing subscriber identity identification by the electronic device 100 is about 1 second to 2 seconds. Therefore, after completing subscriber identity identification, the electronic device stores the picture data into the flash memory 233 in the multi-function card 200, so that storing data into the flash memory 233 in the multi-function card 200 by a subscriber is not affected.

For example, when the electronic device is powered on and then performs subscriber identity identification by using the multi-function card 200, the SOC 111 may connect the communication module 111A to the electrical connector and disconnect the storage module 111B from the electrical connector by using the microprocessor. In this way, the communication module 111A may exchange data with the SIM card module 231 in the multi-function card 200, to complete subscriber identity identification. Further, the subscriber operation of storing picture data into the multi-function card 200 is detected in a process of performing subscriber identity identification. Therefore, when subscriber identity identification is completed, the SOC 111 may connect the storage module 111B to the electrical connector and disconnect the communication module 111A from the electrical connector by using the microprocessor. In this way, the storage module 111B may exchange data with the memory card control module 232 in the multi-function card 200, and the memory card control module 232 may store the picture data into the flash memory 233. For a function of the electrical contact of the multi-function card 200 in the subscriber identity identification process and the data storage process, refer to the foregoing descriptions in the embodiment shown in FIG. 6. Details are not described herein again.

Scenario 7: In a process in which the electronic device 100 stores video data into the multi-function card 200, due to movement, the electronic device 100 needs to switch the network device to perform subscriber identity identification again.

In some other embodiments, in a process in which the electronic device 100 stores the video data into the multi-function card 200, if the electronic device 100 moves from the coverage in which the first base station sends/receives a signal to the coverage in which the second base station sends/receives a signal, the second base station needs to perform subscriber identity identification on the electronic device 100, to provide network access for the electronic device 100. In other words, the multi-function card 200 needs to work as the nano-SIM card to complete subscriber identity identification. Herein, that the network device is the first base station and the second base station is used as an example for description.

Specifically, the SOC in the electronic device 100 may first pause an operation of storing the video data into the multi-function card 200, and after completing subscriber identity identification, continue to store the video data. In this way, an instant messaging function of the electronic device can be ensured, to reduce the following case: Because the flash memory 233 in the multi-function card 200 occupies the electrical contact of the multi-function card 200 in the data storage process, the multi-function card 200 temporarily cannot work as the nano-SIM card, and the electronic device is disconnected from the network.

Figure 10A:
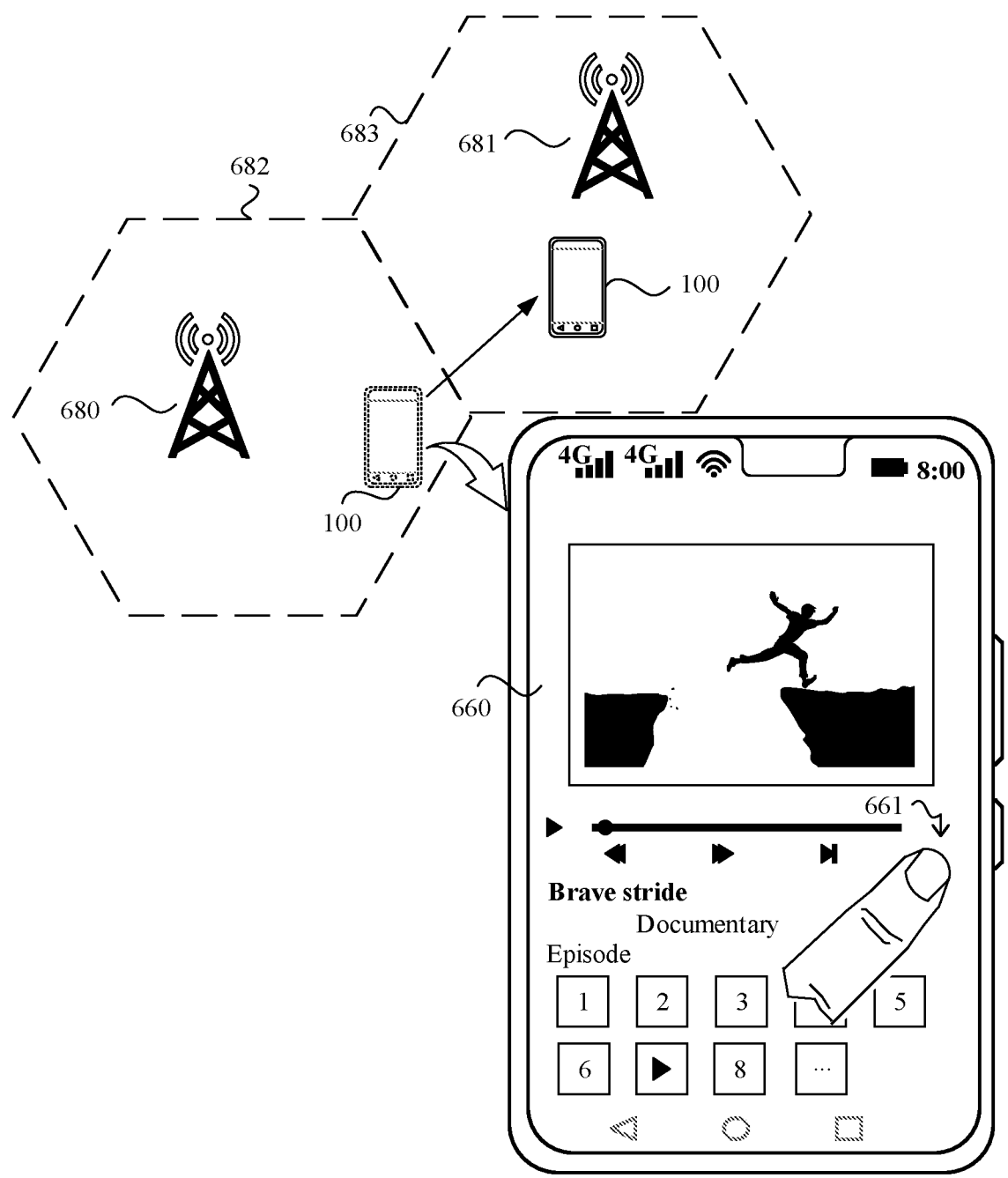
Figure 10B:
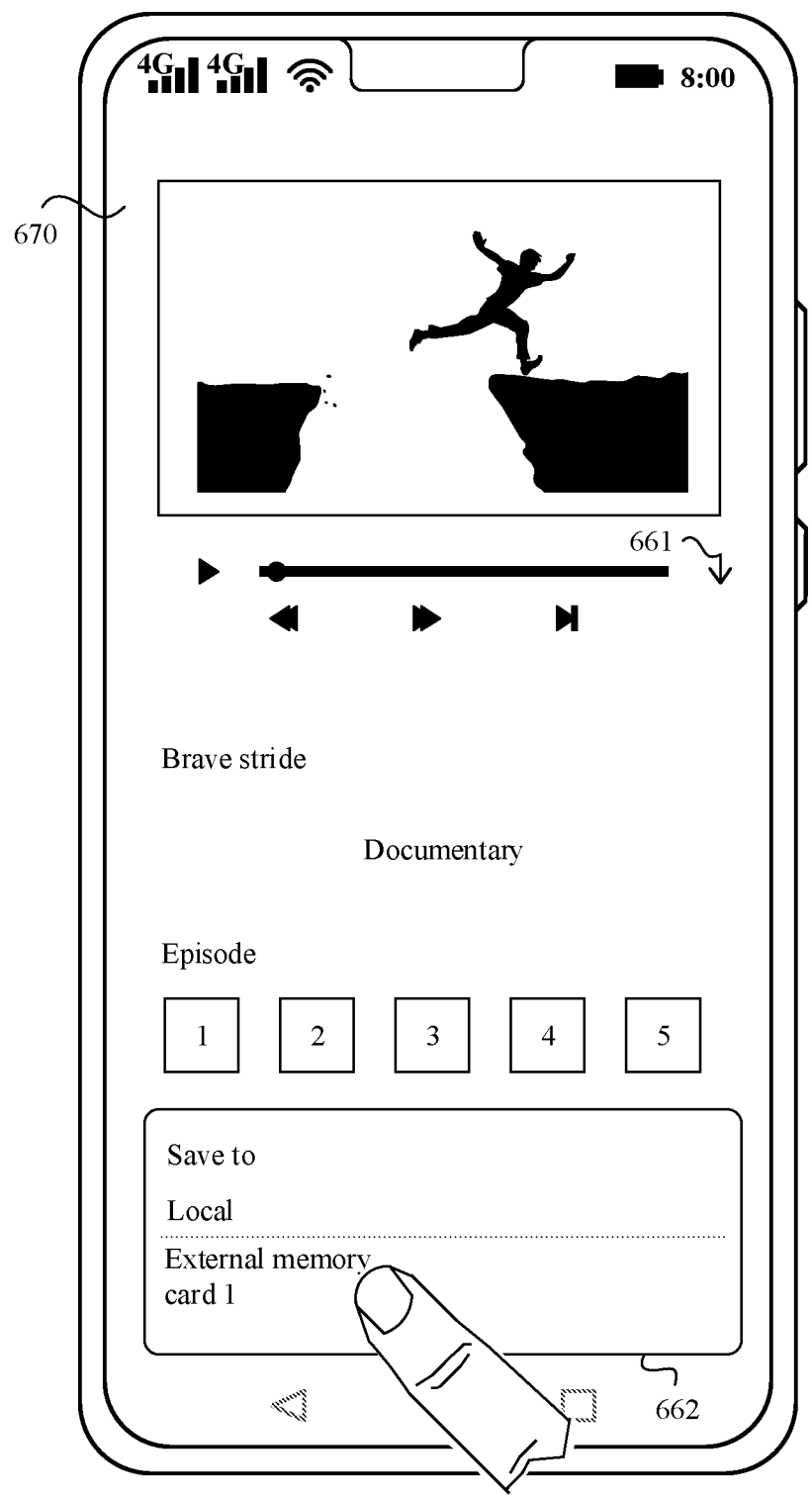

For example, FIG. 10A and FIG. 10B show an example of a scenario in a process in which the SOC 111 in the electronic device 100 stores the video data into the multi-function card 200, due to movement, the electronic device 100 needs to switch the base station to perform subscriber identity identification again. As shown in FIG. 10A, the coverage in which the first base station 680 sends/receives a signal may be a region 682. The coverage in which the second base station sends/receives a signal may be a region 683. The electronic device 100 moves from the coverage in which the first base station 680 sends/receives a signal to the coverage in which the second base station 681 sends/receives a signal. When the electronic device 100 is in the coverage in which the first base station 680 sends/receives a signal, the electronic device 100 may access the network by using the first base station, so that a function such as answering and making a call, sending/receiving an SMS message, browsing a web page, and downloading a video from a website can be implemented. The electronic device 100 is located in the coverage in which the first base station 680 sends/receives a signal, and the electronic device 100 displays a video play interface 660 shown in FIG. 10A. A video currently played in the video play interface 660 may be an episode 7 of a documentary "Brave stride". The video play interface 660 may include a download control 661. The download control 661 may be used to download the video currently played in the video play interface 660. In response to a subscriber operation such as a touch operation performed on the download control 661, the electronic device 100 may display a video play interface 670 shown in FIG. 10B. The video play interface 670 may include a storage location option 662. The storage location option 662 may include an option such as "local" and "external memory card 1". "Local" may indicate a subscriber to store the video into an internal memory of the electronic device 100. "External memory card 1" may indicate the subscriber to store the video into the multi-function card 200. The storage location option 662 may include more or fewer options. This is not limited in this embodiment of this application.

In response to a subscriber operation performed on "external memory card 1", the SOC 111 in the electronic device 100 may connect the storage module 111B to the electrical connector by using the microprocessor. It should be noted that, when the storage module 111B is connected to the electrical connector, the communication module 111A is disconnected from the electrical connector. In this way, the storage module 111B may send, to the multi-function card 200, the video data that needs to be stored. The multi-function card 200 may store, into the flash memory 233, the video data that needs to be stored. For an implementation in which the storage module 111B sends, to the multi-function card 200, the video data that needs to be stored and the multi-function card 200 stores the video data, refer to step S109 and step S110 shown in FIG. 8. Details are not described herein again.

In a process in which the storage module 111B sends, to the multi-function card 200, the video data that needs to be stored, the electronic device 100 moves from the coverage in which the first base station 680 sends/receives a signal to the coverage in which the second base station 681 sends/receives a signal. The electronic device 100 may access the network by using the second base station 681. Before the electronic device 100 accesses the network by using the second base station 681, the second base station needs to perform subscriber identity identification on the electronic device 100. After completing transmission of data of one frame of video picture that is being transmitted in the video data to be transmitted, SOC 111 in the electronic device 100 may disconnect the storage module 111B from the electrical connector and connect the communication module 111A to the electrical connector by using the microprocessor. The storage module 111B may mark progress of video data transmission when video data transmission is interrupted. In this way, when the storage module 111B is connected to the electrical connector again, the storage module 111B may continue, at a location at which video data transmission is previously interrupted, to transmit the video data. A method in which the storage module 111B marks the progress of video data transmission when video data transmission is interrupted is not limited in this embodiment of this application.

When the communication module 111A is connected to the electrical connector, the SOC 111, the multi-function card 200, and the second base station 681 may perform subscriber identity identification based on step S101 to S108 shown in FIG. 8. When authentication performed by the second base station 681 succeeds, the electronic device 100 may access the network by using the second base station 681.

When the subscriber identity identification process is completed, the SOC 111 may disconnect the communication module 111A from the electrical connector and connect the storage module 111B to the electrical connector by using the microprocessor, so that the multi-function card 200 can work as the UFS memory card to store the video data that needs to be stored.

In the foregoing application scenario, the video data imposes no limitation, and other data may be stored, for example, picture data, audio data, and application program data.

The foregoing application scenario imposes no limitation, and there may be another application scenario in which the multi-function card 200 works as the nano-SIM card and works as the UFS memory card.

The following describes a schematic diagram of another connection relationship of the multi-function card 200 in the electronic device 100.

Figure 11:
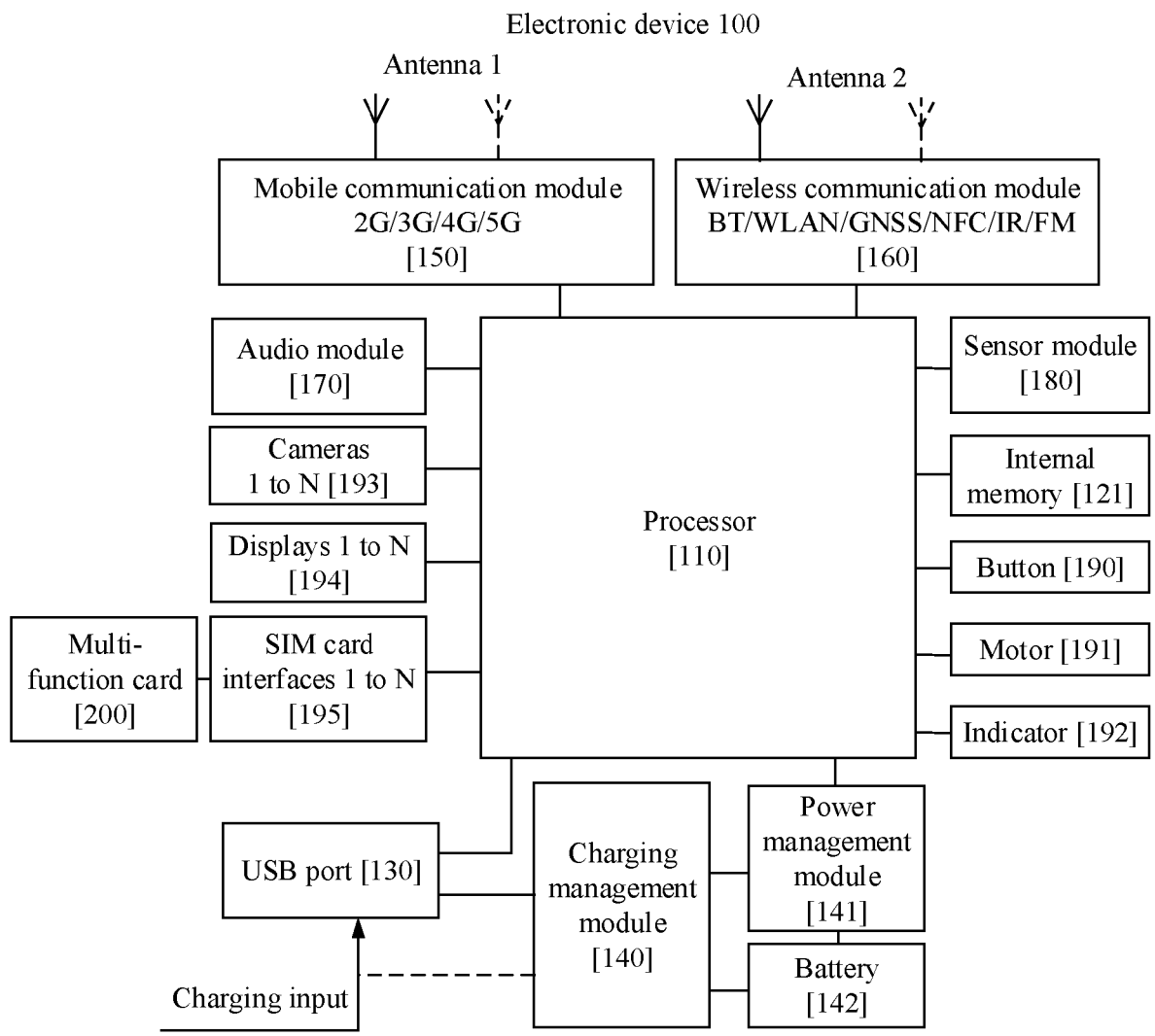
FIG. 11 is a schematic diagram of another connection relationship of a multi-function card in an electronic device according to an embodiment of this application.

FIG. 11 is an example schematic diagram of another connection relationship of a multi-function card 200 in an electronic device 100.

The electronic device 100 may include a processor 110, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a sensor module 180, a button 190, a motor 191, an indicator 192, a camera 193, a display 194, a SIM card interface 195, and the like. The electronic device 100 may be connected to the multi-function card 200 by using the SIM card interface 195. The SIM card interface 195 may represent the foregoing card holder.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include a system on chip (system on chip, SOC), an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

It should be noted that the processor in this embodiment of this application may be implemented by the SOC.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

The USB port 130 is a port that conforms to USB standard specifications, and may be specifically a mini USB port, a micro USB port, a USB Type-C interface, or the like. The USB port 130 may be configured to connect to the charger to charge the electronic device 100, or may be configured to transmit data between the electronic device 100 and a peripheral device, or may be configured to connect to a headset, to play audio through the headset. Alternatively, the port may be configured to connect to another electronic device, for example, an AR device.

It may be understood that an interface connection relationship between the modules that is shown in this embodiment of the present invention is merely an example for description, and does not constitute a limitation on the structure of the electronic device 100.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142 and the charging management module 140 to the processor 110. The power management module 141 may receive an input of the battery 142 and/or the charging management module 140, to supply power to the processor 110, the internal memory 121, the display 194, the camera 193, the wireless communication module 160, the multi-function card 200, and the like. The power management module 141 may include one or more power regulators. The power management module 141 may supply power to different modules in the electronic device 100 and the multi-function card 200 by using the one or more power regulators.

The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 can provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to a modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using the audio module 170, or displays an image or a video by using the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like and that is applied to the electronic device 100. The wireless communication module 160 may be one or more components integrating at least one communications processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function by using the camera 193, the video codec, the GPU, the display 194, the application processor, and the like.

The camera 193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more video codecs. In this way, the electronic device 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, speech recognition, and text understanding, may be implemented through the NPU.

The internal memory 121 may be configured to store computer-executable program code. The executable program code includes instructions. The processor 110 runs the instructions stored in the internal memory 121, to implement various function applications and data processing of the electronic device 100. The internal memory 121 may include a program storage area and a data storage area. The program storage area may store an operating system, an application required by at least one function (for example, a voice playing function or an image playing function), and the like. The data storage area may store data (for example, audio data and an address book) and the like created during used of the electronic device 100. In addition, the internal memory 121 may include a high-speed random access memory, and may further include a non-volatile memory, for example, at least one magnetic disk storage device, a flash memory device, or a universal flash storage (universal flash storage, UFS).

The electronic device 100 may implement an audio function by using the audio module 170, the application processor, and the like. The audio module 170 may include a loudspeaker, a receiver, a microphone, a headset interface, and the like.

The audio module 170 is configured to convert digital audio information into analog audio signal output, and is also configured to convert analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator, and may be configured to indicate a charging status and a power change, or may be configured to indicate a message, a missed call, a notification, and the like.

The SIM card interface 195 is configured to connect to a SIM card. The SIM card interface may be the foregoing card holder. The SIM card may be inserted into the SIM card interface 195 or removed from the SIM card interface 195, to implement contact with or separation from the electronic device 100. When the SIM card is inserted into the SIM card interface 195, electrical contacts of the SIM card may be electrically connected to electrical connectors of the SIM card interface 195. In this way, the electronic device can exchange data with the SIM card. The SIM card interface 195 may support a nano-SIM card, a micro-SIM card, a mini-SIM, and the like. The electronic device 100 may support one or N SIM card interfaces, where N is a positive integer greater than 1. The electronic device 100 interacts with a network by using the SIM card, to implement a function such as subscriber identity identification, a call, and data communication. In some embodiments, the electronic device 100 may use an embedded SIM (Embedded SIM, eSIM) card. The eSIM card may be embedded into the electronic device 100, and is used as a non-removable component in the electronic device 100.

The SIM card interface 195 may also be compatible with an external memory card, to expand a storage capacity of the electronic device 100, for example, a micro SD card and a UFS memory card. When an external memory card is inserted into the SIM card interface 195, the SIM card interface 195 may be equivalent to an external memory interface. The external memory card may communicate with the processor 110 by using the SIM card interface 195, to implement a data storage function, for example, storing a picture, audio, a video, a program, and the like into the external memory card.

The SIM card interface 195 may be further compatible with the multi-function card 200. A dimension of the multi-function card 200 may be the same as or similar to a dimension of the nano-SIM card. In other words, the SIM card interface 195 that may be compatible with the nano-SIM card may be compatible with the multi-function card 200. When the multi-function card 200 is inserted into the SIM card interface 195, the multi-function card 200 communicates with the processor 110 by using the SIM card interface 195, so that a function such as subscriber identity identification, a call, and data communication can be implemented, and a data storage function can also be implemented.

In some embodiments, the multi-function card 200 may be embedded into the electronic device 100 as an embedded card, and is used as a non-removable component in the electronic device 100. In other words, the multi-function card 200 may be equivalent to a two-in-one card that includes an eSIM card and a UFS memory card. Currently, the eSIM card may be embedded into the electronic device 100 by using a surface mounted device (surface mounted device, SMD) surface mount technology, to form a hardware part of the SIM card into a wafer and encapsulated into a dedicated security chip, that is, form the SIM card into a surface mounted card, and then embed the card into the electronic device 100. Alternatively, a system in a package (system in a package) technology may be used to encapsulate a wafer of the SIM card and a baseband wafer into one chip, and then embed the chip into the electronic device 100. In the foregoing manner of embedding the eSIM card into the electronic device 100 by using the SMD surface mount technology or the SIP encapsulation technology, an entity part of hardware of the SIM card is reserved. In other words, a plurality of electrical contacts still exist on the eSIM card, and the processor of the electronic device 100 may exchange data with the eSIM card by using the electrical contacts. When the eSIM card includes a routing module, a memory card control module, a flash memory, and the like, in addition to implementing a function such as subscriber identity identification, a call, and data communication, the eSIM card may be further configured to expand the storage capacity of the electronic device 100. In other words, the multi-function card 200 is equivalent to an embedded card.

When the multi-function card 200 is embedded into the electronic device 100 as an embedded card, the multi-function card 200 may implement a function of a SIM card and a function of a memory card by using the electrical contacts through time division multiplexing. For a manner in which the multi-function card 200 is used as an embedded card to use the electrical contacts through time division multiplexing, refer to the foregoing descriptions of a specific manner in which the SOC 111 in the electronic device 100 exchanges data with the multi-function card 200. Details are not described herein again.

For a manner in which the multi-function card 200 is embedded into the electronic device 100 as an embedded card, refer to a conventional-technology implementation of embedding the eSIM card into the electronic device 100. This is not limited in embodiments of this application.

When the multi-function card 200 is embedded into the electronic device 100 as an embedded card, the electronic device 100 may not need to include a card holder configured to externally connect to the SIM card and the memory card, to further save physical space in the electronic device 100. In addition, the multi-function card 200 embedded into the electronic device 100 may be equivalent to an eSIM card, that is, may implement a function that may be implemented by the SIM card such as subscriber identity identification, and may also help a subscriber to switch an operator and the like. The multi-function card 200 embedded into the electronic device 100 may also be equivalent to a memory card, that is, may implement a function of expanding the storage capacity of the electronic device 100, to store a picture, audio, a video, and an application program into the multi-function card 200.

The multi-function card may further be equivalent to a two-in-one card that includes a nano-SIM card and a PCIe memory card.

In some embodiments, a protocol used when the multi-function card implements a function of storage expansion may be a PCIe protocol, and the multi-function card may be used as a PCIe memory card to expand the storage capacity of the electronic device. The dimension of the multi-function card may be the same as or similar to the dimension of the nano-SIM card, for example, 12.3 millimeters*8.8 millimeters*0.7 millimeter. The multi-function card may be configured to implement a function of a SIM card, that is, is equivalent to a nano-SIM card. In other words, the multi-function card may be equivalent to a two-in-one card that includes a nano-SIM card and a PCIe memory card.

Figure 12:
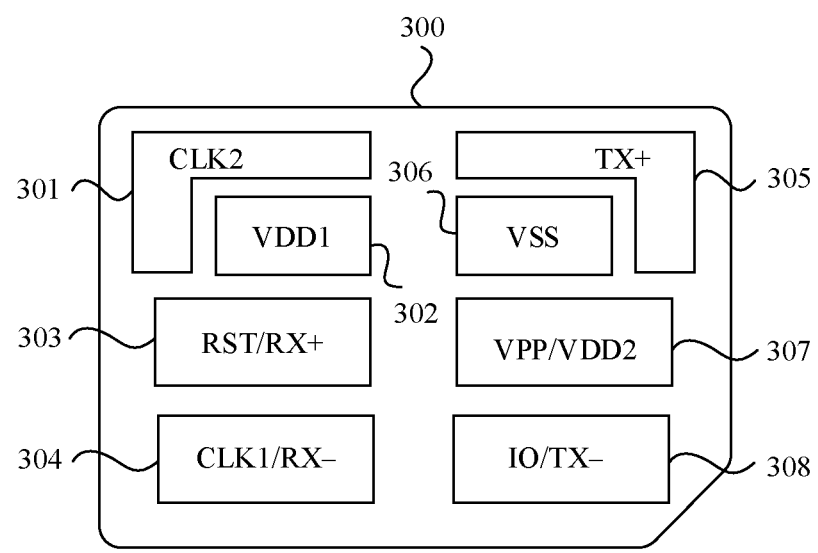
FIG. 12 is a schematic diagram of a structure of another multi-function card according to an embodiment of this application.

FIG. 12 shows an example of distribution of electrical contacts of a multi-function card 300. The multi-function card 300 may be electrically connected to another chip in an electronic device by using these electrical contacts, to transmit data. The multi-function card 300 is the foregoing two-in-one card that includes a nano-SIM card and a PCIe memory card.

As shown in FIG. 12, the multi-function card 300 may include eight electrical contacts 301 to 308. The eight electrical contacts are all electrical contacts used when the multi-function cards 300 works as the PCIe memory card. Six electrical contacts such as the electrical contacts 302 to 304 and the electrical contacts 306 to 308 are electrical contacts used when the multi-function card 300 works as the nano-SIM card. In other words, the six electrical contacts such as the electrical contacts 302 to 304 and the electrical contacts 306 to 308 may be shared by the nano-SIM card and the PCIe memory card through time division multiplexing.

It should be noted that the PCIe memory card generally has 14 electrical contacts that include three electrical contacts VDD1, VDD2, and VDD3 that are connected to a power supply, three ground terminals VSS1, VSS2, and VSS3, two electrical contacts REFCLK+ and REFCLK− that are configured to transmit a clock signal, one electrical contact CLKREF # configured to transmit a request clock signal, and one electrical contact PERST # configured to transmit a reset signal. The multi-function card 300 includes only eight electrical contacts. When the multi-function card 300 works as the PCIe memory card, one electrical contact connected to the power supply may be removed, and power is supplied, by using two electrical contacts connected to the power supply, to each module that is in the multi-function card 300 and that is configured to implement a function of the PCIe memory card. The multi-function card 300 may further remove two ground terminals and reserve only one ground terminal. The multi-function card 300 may further remove one electrical contact configured to transmit the clock signal, the electrical contact configured to transmit the request clock signal, and the electrical contact configured to transmit the reset signal. In this way, the multi-function card 300 may remove six electrical contacts from the 14 electrical contacts of the PCIe memory card, to work as the PCIe memory card by using eight electrical contacts.

The multi-function card 300 includes a module configured to implement a function of the nano-SIM card and a module configured to implement a function of the PCIe memory card. That the multi-function card 300 works as the nano-SIM card is specifically that the module that is in the multi-function card 300 and that is configured to implement the function of the nano-SIM card transmits data by using the electrical contacts 302 to 304 and the electrical contacts 306 to 308. That the multi-function card 300 works as the PCIe memory card is specifically that the module that is in the multi-function card 300 and that is configured to implement the function of the PCIe memory card transmits data by using the electrical contacts 301 to 308. In subsequent embodiments, the module that is in the multi-function card 300 and that is configured to implement the function of the nano-SIM card and a module that is in the multi-function card 300 and that is configured to implement the function of the PCIe memory card are specifically described.

For functions of the electrical contacts when the multi-function card 300 works as the nano-SIM card, refer to the foregoing descriptions of functions of the electrical contacts when the multi-function card 200 works as the nano-SIM card. Details are not described herein again.

The following describes functions of the electrical contacts when the multi-function card 300 works as the PCIe memory card.

When the multi-function card 300 works as the PCIe memory card, the electrical contacts 301 to 308 are used.

The electrical contacts 301 to 305 and 308 are respectively CLK, VDD1, RX+, RX−, TX+, and TX− in the electrical contacts of the PCIe memory card. The electrical contact 306 may be configured to be grounded, and may be equivalent to VSS1, VSS2, and VSS3 in the electrical contacts of the PCIe memory card. In other words, when the multi-function card 300 works as the PCIe memory card, one ground terminal may be used to replace three ground terminals of an independent PCIe memory card. The electrical contact 307 may be connected to the power supply, supplies power to the module that is in the multi-function card 300 and that is configured to implement the function of the PCIe memory card, and may be equivalent to VDD1 and VDD2 in the electrical contacts of the PCIe memory card. A voltage of the power supply connected to the electrical contact 307 is not limited in this embodiment of this application, for example, the electrical contact 307 may be connected to a 1.8 V power supply.

A power domain of the PCIe memory card may be 1.62 V to 3.3 V, and the electrical contact 302 may be connected to a 3.3 V power supply. In this embodiment of this application, a voltage of the power supply connected to the electrical contact 302 is not limited when the multi-function card 300 works as the PCIe memory card. An electrical contact for transmitting a clock signal referenced when the multi-function card 300 works as the nano-SIM card may be referred to as "CLK1". To be distinguished from "CLK1", an electrical contact for transmitting a clock signal referenced when the multi-function card 300 works as the PCIe memory card may be referred to as "CLK2". Specifically, a frequency of the clock signal may be 0 MHz to 25 MHz. Because the clock signals referenced by the PCIe memory card and the nano-SIM card are different, the multi-function card 300 may provide, by using an electrical contact different from "CLK1", the clock signal that needs to be referenced when the multi-function card 300 works as the PCIe memory card. The clock signal referenced when the PCIe memory card works is not limited in this embodiment of this application. For functions of the electrical contacts when the multi-function card 300 works as the PCIe memory card, refer to the descriptions of the electrical contacts of the PCIe memory card. Details are not described herein again.

It should be noted that, when the multi-function card 300 works as the UFS memory card, the electrical contact 303 and the electrical contact 304 are not merely configured to receive data, and the electrical contact 305 and the electrical contact 308 are not merely configured to send data. The multi-function card 300 may send data by using the electrical contact 303 and the electrical contact 304, and the multi-function card 300 may receive data by using the electrical contact 305 and the electrical contact 308.

The module that is in the multi-function card 300 and that is configured to implement the function of the PCIe memory card may be configured to store a picture, audio, a video, and an application program. When the multi-function card 300 is inserted, the electronic device may store data into the module that is in the multi-function card 300 and that is configured to implement the function of the PCIe memory card. The data may be transmitted, by using the electrical contact 303 and the electrical contact 304, to the module that is in the multi-function card 300 and that is configured to implement the function of the PCIe memory card. Alternatively, the electronic device may read data from the module that is in the multi-function card 300 and that is configured to implement the function of the PCIe memory card. The data may be transmitted, by using the electrical contact 305 and the electrical contact 308, to a module that is in the electronic device and that is configured to read the data.

It may be learned from the manner in which the multi-function card 300 transmits data by using the electrical contacts thereof that the eight electrical contacts of the multi-function card 300 transmit data in a basically same manner as the eight electrical contacts of the multi-function card 200. However, when the multi-function card separately works as the UFS memory card and the PCIe memory card, formats of data transmitted between the multi-function card and another chip in the electronic device by using the electrical contacts are different. For example, quantities of bytes of data transmitted each time by using the electrical contact are different, or same data represents signals having different meanings. When the multi-function card is configured to implement a function of storage expansion, for the format of the data transmitted by using the electrical contact, refer to specifications in a UFS protocol and a PCIe protocol in a conventional technology. This is not limited in this embodiment of this application.

A manner in which the electrical contacts of the multi-function card 300 are used through time division multiplexing is not limited in this embodiment of this application. Electrical contacts used when the multi-function card 300 works as the SIM card may be a combination of any six electrical contacts in the eight electrical contacts of the multi-function card 300. The electrical contacts of the SIM card and the memory card may share the electrical contacts in another combination manner.

In this embodiment of this application, a location of each electrical contact of the multi-function card 300 on the card body and a size of each electrical contact are not limited.

The dimension of the multi-function card 300 is not limited in this embodiment of this application. In addition to being the same or similar to the dimension of the nano-SIM card, the dimension of the multi-function card 300 may be another dimension.

In this embodiment of this application, the dimension of the multi-function card 300 may be the same as or similar to the dimension of the nano-SIM card. One surface of the multi-function card 300 may include eight electrical contacts. The multi-function card 300 may implement the function of the nano-SIM card and the function of the PCIe memory card by using the electrical contacts through time division multiplexing. In other words, the multi-function card 300 may be equivalent to a two-in-one card that includes a nano-SIM card and a PCIe memory card. In this way, compared with an independent nano-SIM card and an independent PCIe memory card, the multi-function card in this embodiment of this application can reduce physical space occupied by the SIM card and the memory card in the electronic device, and is conducive to lightening and thinning of the electronic device.

Based on the multi-function card 300 shown in FIG. 12, the following describes a schematic diagram of a connection relationship of the multi-function card 300 in the electronic device 100.

Figure 13:
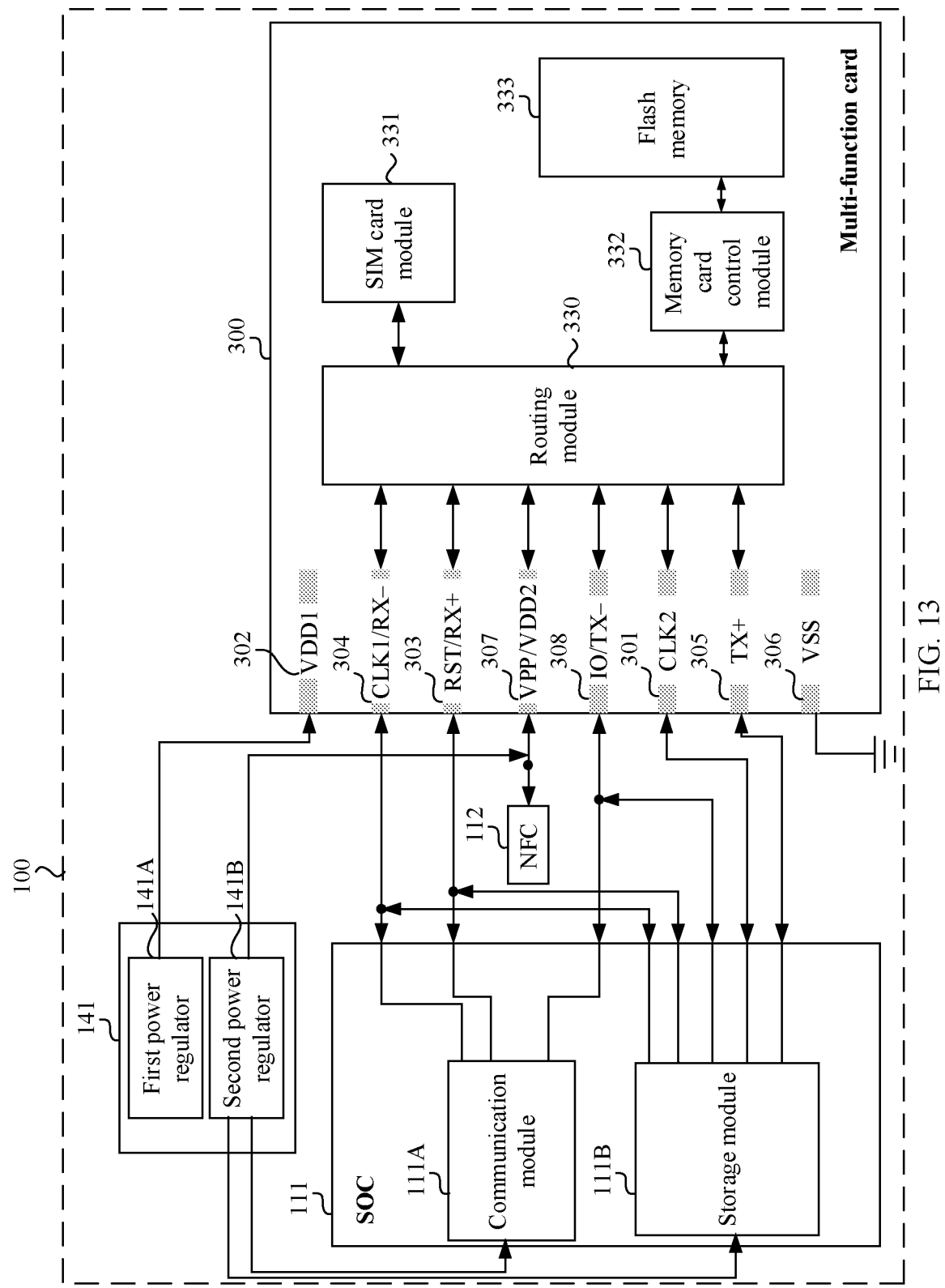
FIG. 13 is a schematic diagram of another connection relationship of a multi-function card in an electronic device according to an embodiment of this application.

FIG. 13 is an example schematic diagram of a connection relationship of a multi-function card 300 in an electronic device 100. Specifically, electrical contacts of the multi-function card 300 may be electrically connected to electrical connectors on a card holder of the electronic device 100, to transmit data between the multi-function card 300 and another chip in the electronic device 100.

As shown in FIG. 13, the multi-function card 300 may be placed on the card holder and inserted into the electronic device 100, and is used as a component in the electronic device 100. The multi-function card 300 may include eight electrical contacts 301 to 308, a routing module 330, a SIM card module 331, a memory card control module 332, and a flash memory 333. The SIM card module 331 is the foregoing module that is in the multi-function card 300 and that is configured to implement the function of the nano-SIM card. The memory card control module 332 and the flash memory 333 each are the foregoing module that is in the multi-function card 300 and that is configured to implement the function of the PCIe memory card. The electronic device 100 may include an SOC 111, an NFC chip 112, a power management module 141, and a plurality of electrical connectors (the electrical connectors are not shown in the figure).

For locations of the eight electrical contacts 301 to 308 on the multi-function card 300 and functions thereof, refer to the descriptions of the multi-function card 300 shown in FIG. 12. Details are not described herein again.

For functions of the routing module 330, the SIM card module 331, the memory card control module 332, and the flash memory 333, and functions of the power management module 141, the SOC 111, and the NFC chip 112 in the electronic device 100, refer to the foregoing descriptions of the multi-function card 200 and the electronic device 100 shown in FIG. 6. Details are not described herein again.

It should be noted that the SIM card module 331 is the foregoing module configured to implement the function of the nano-SIM card, and the memory card control module 332 and the flash memory 333 each are the foregoing module configured to implement the function of the PCIe memory card.

In this embodiment of this application, in the PCIe memory card, a data input interface and a data output interface are separated. When the multi-function card 300 works as the PCIe memory card, the multi-function card 300 may simultaneously store data from the electronic device 100 that needs to be stored, and send, to the electronic device 100, data that needs to be read by the electronic device 100.

In some embodiments, the multi-function card 300 may be embedded into the electronic device 100 as an embedded card, and is used as a non-removable component in the electronic device 100. In other words, the multi-function card 300 may be equivalent to a two-in-one card that includes an eSIM card and a PCIe memory card. In this way, the electronic device 100 may not need to include a card holder configured to externally connect to the SIM card and the memory card, to further save space in the electronic device 100.

For an implementation in which the multi-function card 300 is embedded into the electronic device 100 as an embedded card, refer to the foregoing implementation in which the multi-function card 200 is embedded into the electronic device 100 as an embedded card. Details are not described herein again.

The multi-function card may further be equivalent to a two-in-one card that includes a nano-SIM card and an NM card.

In some embodiments, a protocol used when the multi-function card implements a function of storage expansion may be an eMMC protocol, and the multi-function card may be used as an NM card to expand the storage capacity of the electronic device. The dimension of the multi-function card may be the same as or similar to the dimension of the nano-SIM card, and the multi-function card may be configured to implement a function of a SIM card, that is, is equivalent to a nano-SIM card. In other words, the multi-function card may be equivalent to a two-in-one card that includes a nano-SIM card and an NM card.

Figure 14:
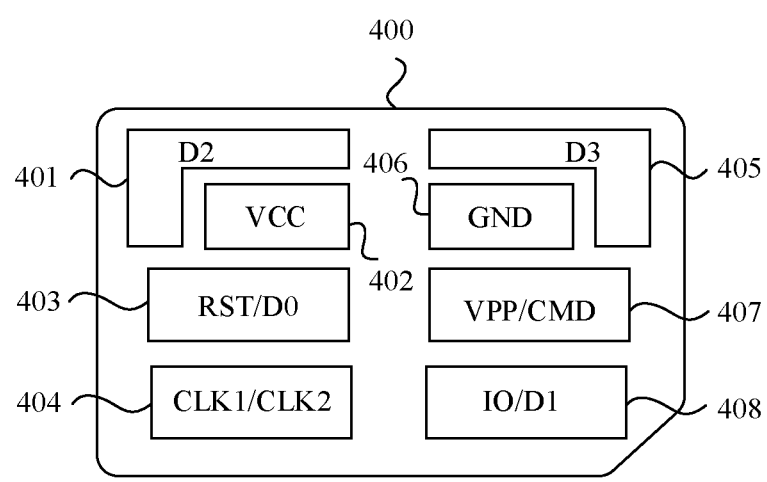
FIG. 14 is a schematic diagram of a structure of another multi-function card according to an embodiment of this application.

FIG. 14 shows an example of distribution of electrical contacts of a multi-function card 400. The multi-function card 400 may be electrically connected to another chip in an electronic device by using these electrical contacts, to transmit data. The multi-function card 400 is the foregoing two-in-one card that includes a nano-SIM card and an NM card.

As shown in FIG. 14, the multi-function card 400 may include eight electrical contacts 401 to 408. The eight electrical contacts are all electrical contacts used when the multi-function cards 400 works as the NM card. Six electrical contacts such as the electrical contacts 402 to 404 and the electrical contacts 406 to 408 are electrical contacts used when the multi-function card 400 works as the nano-SIM card. In other words, the six electrical contacts such as the electrical contacts 402 to 404 and the electrical contacts 406 to 408 may be shared by the nano-SIM card and the NM card through time division multiplexing.

The multi-function card 400 includes a module configured to implement a function of the nano-SIM card and a module configured to implement a function of the NM card. That the multi-function card 400 works as the nano-SIM card is specifically that the module that is in the multi-function card 400 and that is configured to implement the function of the nano-SIM card transmits data by using the electrical contacts 402 to 404 and the electrical contacts 406 to 408. That the multi-function card 400 works as the NM card is specifically that the module that is in the multi-function card 400 and that is configured to implement the function of the NM card transmits data by using the electrical contacts 401 to 408. In subsequent embodiments, the module that is in the multi-function card 400 and that is configured to implement the function of the nano-SIM card and a module that is in the multi-function card 400 and that is configured to implement the function of the NM card are specifically described.

For functions of the electrical contacts when the multi-function card 400 works as the nano-SIM card, refer to the foregoing descriptions of functions of the electrical contacts when the multi-function card 200 works as the nano-SIM card. Details are not described herein again.

The following describes functions of the electrical contacts when the multi-function card 400 works as the NM card.

When the multi-function card 400 works as the NM card, the electrical contacts 401 to 408 are used.

The electrical contacts 401 to 308 are D2, VCC, D0, CLK, D3, GND, CMD, and D1 in the electrical contacts of the NM card.

The electrical contact 402 may be connected to a 3.3 V power supply to supply power to the multi-function card 400. In this embodiment of this application, a voltage of the power supply connected to the electrical contact 402 is not limited when the multi-function card 400 works as the NM card.

The electrical contact 404 may be configured to transmit a clock signal referenced when the multi-function card 400 works as the nano-SIM card and a clock signal referenced when the multi-function card 400 works as the NM card. "CLK1" may indicate that the clock signal referenced when the multi-function card 400 works as the nano-SIM card is transmitted by using the electrical contact 404. For example, a frequency of the clock signal may be 5 MHz. "CLK2" may indicate that the clock signal referenced when the multi-function card 400 works as the NM card is transmitted. For example, a frequency of the clock signal may be 25 MHz. In this embodiment of this application, the clock signal referenced when the nano-SIM card works and the clock signal referenced when the NM card works are not limited. For functions of the electrical contacts when the multi-function card 400 works as the NM card, refer to the descriptions of the electrical contacts of the NM card. Details are not described herein again.

The module that is in the multi-function card 400 and that is configured to implement the function of the NM card may be configured to store a picture, audio, a video, and an application program. In addition, the electronic device may read data from the module that is in the multi-function card 400 and that is configured to implement the function of the NM card.

In the NM card, the data input interface and a data output interface are shared. When the electronic device stores data into the module that is in the multi-function card 400 and that is configured to implement the function of the NM card and reads data from the module that is in the multi-function card 400 and that is configured to implement the function of the NM card, the data may be transmitted by using "D0" (namely, the electrical contact 403), "D1" (namely, the electrical contact 408), "D2" (namely, the electrical contact 401), and "D3" (namely, the electrical contact 405). "D0", "D1", "D2", and "D3" may transmit data in a same direction (sent by the SOC 111 in the electronic device or sent by the module that is in the multi-function card 200 and that is configured to implement a function of a micro SD card) in a time period. In other words, when the multi-function card 400 works as the NM card, data cannot be read and written simultaneously.

A manner in which the electrical contacts of the multi-function card 400 are used through time division multiplexing is not limited in this embodiment of this application. Electrical contacts used when the multi-function card 400 works as the SIM card may be a combination of any six electrical contacts in the eight electrical contacts of the multi-function card 400. The electrical contacts of the SIM card and the memory card may share the electrical contacts in another combination manner.

In this embodiment of this application, a location of each electrical contact of the multi-function card 400 on the card body and a size of each electrical contact are not limited.

The dimension of the multi-function card 400 is not limited in this embodiment of this application. In addition to being the same or similar to the dimension of the nano-SIM card, the dimension of the multi-function card 400 may be another dimension.

The dimension of the multi-function card 400 may be the same as or similar to the dimension of the nano-SIM card, for example, 12.3 millimeters*8.8 millimeters*0.7 millimeter. One surface of the multi-function card 400 may include eight electrical contacts. The multi-function card 400 may implement the function of the nano-SIM card and the function of the NM card by using the electrical contacts through time division multiplexing. In other words, the multi-function card 400 may be equivalent to a two-in-one card that includes a nano-SIM card and an NM card. In this way, compared with an independent nano-SIM card and an independent NM card, the multi-function card in this embodiment of this application can reduce physical space occupied by the SIM card and the memory card in the electronic device, and is conducive to lightening and thinning of the electronic device.

Based on the multi-function card 400 shown in FIG. 14, the following describes a schematic diagram of a connection relationship of the multi-function card 400 in the electronic device 100.

Figure 15:
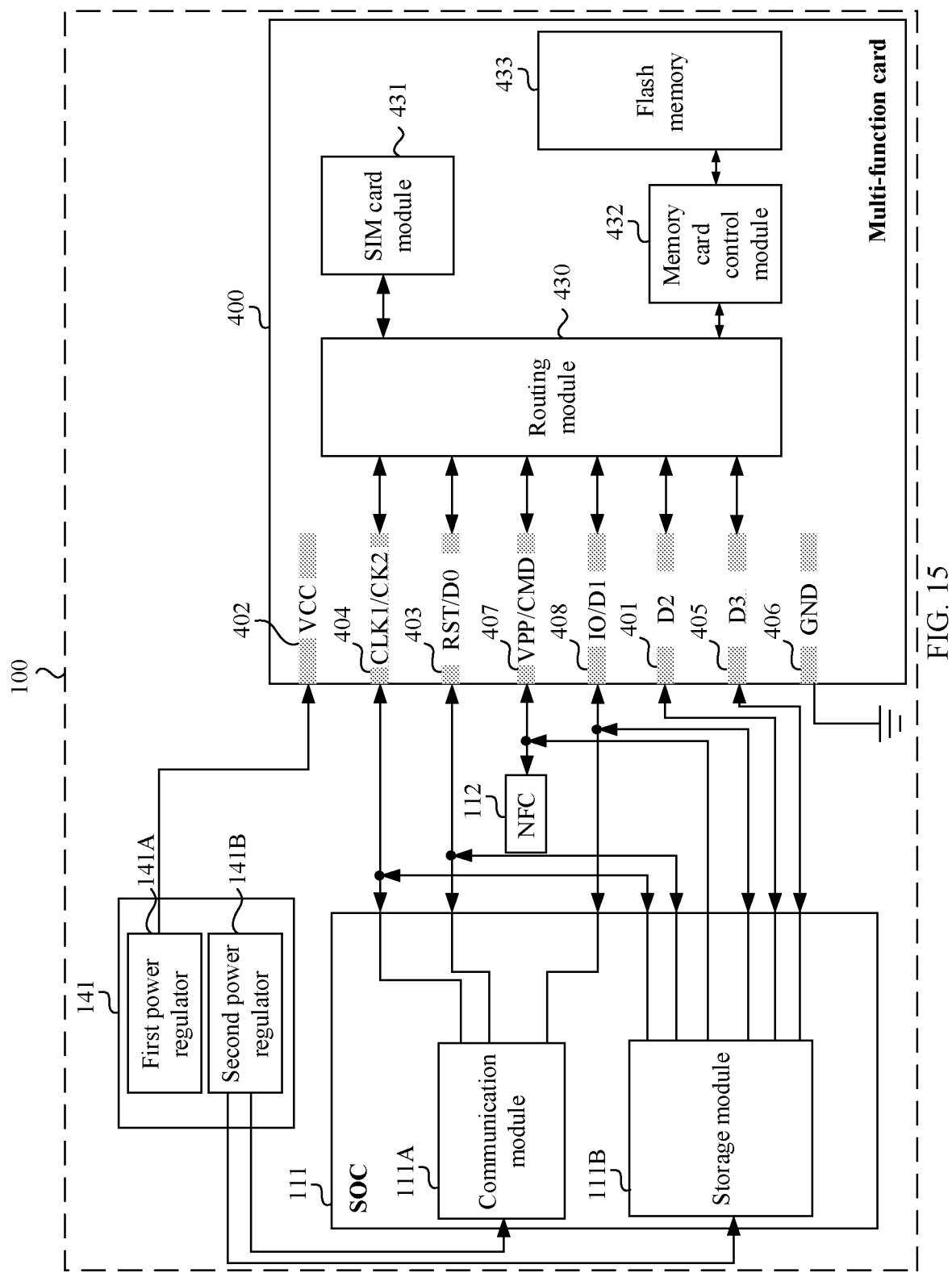
FIG. 15 is a schematic diagram of another connection relationship of a multi-function card in an electronic device according to an embodiment of this application.

FIG. 15 is an example schematic diagram of a connection relationship of a multi-function card 400 in an electronic device 100. Specifically, electrical contacts of the multi-function card 400 may be electrically connected to electrical connectors on a card holder of the electronic device 100, to transmit data between the multi-function card 400 and another chip in the electronic device 100.

As shown in FIG. 15, the multi-function card 400 may be placed on the card holder and inserted into the electronic device 100, and is used as a component in the electronic device 100. The multi-function card 400 may include eight electrical contacts 401 to 408, a routing module 430, a SIM card module 431, a memory card control module 432, and a flash memory 433. The SIM card module 431 is the foregoing module that is in the multi-function card 400 and that is configured to implement the function of the nano-SIM card. The memory card control module 432 and the flash memory 433 each are the foregoing module that is in the multi-function card 400 and that is configured to implement the function of the NM card. The electronic device 100 may include an SOC 111, an NFC chip 112, a power management module 141, and a plurality of electrical connectors (the electrical connectors are not shown in the figure).

For locations of the eight electrical contacts 401 to 408 on the multi-function card 400 and functions thereof, refer to the descriptions of the multi-function card 400 shown in FIG. 14. Details are not described herein again.

For functions of the routing module 430, the SIM card module 431, the memory card control module 432, and the flash memory 433, and functions of the power management module 141, the SOC 111, and the NFC chip 112 in the electronic device 100, refer to the foregoing descriptions of the multi-function card 200 and the electronic device 100 shown in FIG. 6. Details are not described herein again.

It should be noted that the SIM card module 431 is the foregoing module configured to implement the function of the nano-SIM card, and the memory card control module 432 and the flash memory 433 each are the foregoing module configured to implement the function of the NM card.

In this embodiment of this application, in the NM card, a data input interface and a data output interface are shared. When the multi-function card 400 works as the NM card, in a time period, the electrical contact 403, the electrical contact 408, the electrical contact 401, and the electrical contact 405 of the multi-function card 400 are configured to transmit data unidirectionally. In other words, in a time period, the multi-function card 400 may be configured to transmit data content that needs to be stored by the electronic device into the multi-function card 400 or that needs to be read by the electronic device from the multi-function card 400.

In some embodiments, the multi-function card 400 may be embedded into the electronic device 100 as an embedded card, and is used as a non-removable component in the electronic device 100. In other words, the multi-function card 400 may be equivalent to a two-in-one card that includes an eSIM card and an NM card. In this way, the electronic device 100 may not need to include a card holder configured to externally connect to the SIM card and the memory card, to further save physical space in the electronic device 100.

For an implementation in which the multi-function card 400 is embedded into the electronic device 100 as an embedded card, refer to the foregoing implementation in which the multi-function card 200 is embedded into the electronic device 100 as an embedded card. Details are not described herein again.

The multi-function card may further be equivalent to a two-in-one card that includes a nano-SIM card and a micro SD card.

In some embodiments, a protocol used when the multi-function card implements a function of storage expansion may be an SD protocol, and the multi-function card may be used as a micro SD card to expand the storage capacity of the electronic device. The dimension of the multi-function card may be the same as or similar to the dimension of the nano-SIM card, and the multi-function card may be configured to implement a function of a SIM card, that is, is equivalent to a nano-SIM card. In other words, the multi-function card may be equivalent to a two-in-one card that includes a nano-SIM card and a micro SD card.

The multi-function card may include eight electrical contacts. The eight electrical contacts are all electrical contacts used when the multi-function card works as the micro SD card. Any six electrical contacts in the eight electrical contacts may be electrical contacts used when the multi-function card works as the nano-SIM card. In other words, the nano-SIM card and the micro SD card may use the eight electrical contacts through time division multiplexing.

Quantities and functions of electrical contacts of the micro SD card and the NM card may be the same. For a function of each electrical contact of the multi-function card equivalent to a two-in-one card that includes a nano-SIM card and a micro SD card and each module in the multi-function card, refer to the descriptions of the multi-function card 400. Details are not described herein again.

The dimension of the multi-function card equivalent to a two-in-one card that includes a nano-SIM card and a micro SD card is the same as or similar to the dimension of the nano-SIM card, for example, 12.3 millimeters*8.8 millimeters*0.7 millimeter. One surface of the multi-function card may include eight electrical contacts. The multi-function card may implement the function of the nano-SIM card and the function of the micro SD card by using the electrical contacts through time division multiplexing. In this way, compared with an independent nano-SIM card and an independent micro SD card, the multi-function card in this embodiment of this application can reduce physical space occupied by the SIM card and the memory card in the electronic device, and is conducive to lightening and thinning of the electronic device.

Figure 16:
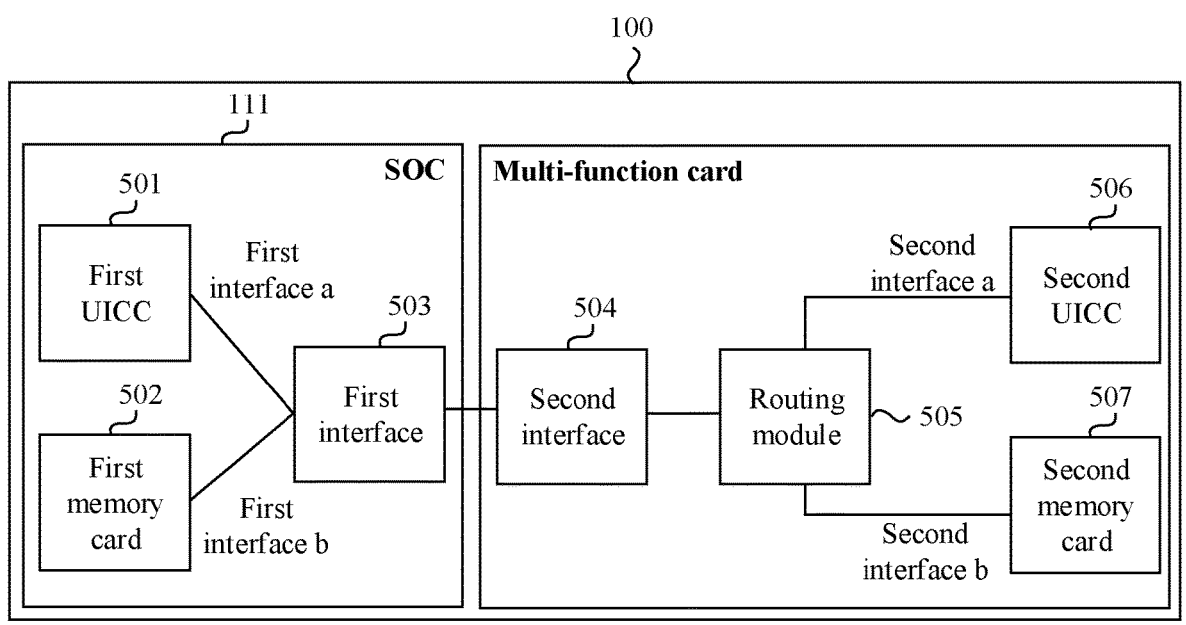
FIG. 16 is a schematic diagram of another connection relationship of a multi-function card in an electronic device according to an embodiment of this application.

FIG. 16 is an example schematic diagram of another connection relationship of a multi-function card in an electronic device 100.

The multi-function card may be the multi-function card 200, namely, a two-in-one card that includes a nano-SIM card and a UFS memory card. The multi-function card may alternatively be the multi-function card 300, namely, a two-in-one card that includes a nano-SIM card and a PCIe memory card. The multi-function card may alternatively be the multi-function card 400, namely, a two-in-one card that includes a nano-SIM card and an NM card. The multi-function card may alternatively be a two-in-one card that includes a nano-SIM card and an NM card.

As shown in FIG. 16, the multi-function card may be placed on a card holder and inserted into the electronic device 100. The electronic device 100 may include an SOC 111. The SOC 111 may establish a connection to the multi-function card and exchange data with the multi-function card, to perform subscriber identity identification and store a picture, audio, a video, and an application program.

The SOC 111 may include a first universal integrated circuit card (universal integrated circuit card, UICC) 501, a first memory card 502, and a first interface 503. The multi-function card may include a second interface 504, a routing module 505, a second UICC 506, and a second memory card 507.

(1) First UICC 501 and Second UICC 506

A UICC is a mobile smart card, and may be configured to store data such as mobile network subscription data (such as an IMSI), an authentication key, an SMS message, a telephone number, and a call record. In other words, the UICC may be configured to implement a function such as subscriber identity identification, a call, and data communication.

In this embodiment of this application, the first UICC 501 may be a module that is in the electronic device 100, that is configured to obtain, from the multi-function card, subscriber identity information corresponding to the multi-function card, and that is configured to implement a mobile communication function of the electronic device 100. In other words, the first UICC may be the communication module 111A shown in FIG. 6, FIG. 13, or FIG. 15.

The second UICC 506 may be a module that is in the multi-function card and that is configured to send, to the first UICC 501, the subscriber identity information corresponding to the multi-function card, and may store data such as mobile network subscription data (such as an IMSI), an authentication key, an SMS message, a telephone number, and a call record. In other words, the second UICC may be the SIM card module 231 shown in FIG. 6, the SIM card module 331 shown in FIG. 13, or the SIM card module 431 shown in FIG. 15.

When the first UICC 501 and the second UICC 506 communicate with each other, the electronic device 100 may implement the function of subscriber identity identification. When the subscriber identity identification succeeds, the electronic device 100 may access a network.

(2) First Memory Card 502 and Second Memory Card 507

The first memory card 502 may be a module that is in the electronic device and that is configured to manage an external memory card. Specifically, the first memory card 502 may send data to the multi-function card for storage, or read data stored in the multi-function card. The data may be a picture, audio, a video, and an application program. In other words, the first memory card may be the storage module 111B shown in FIG. 6, FIG. 13, or FIG. 15.

The second memory card 507 may be a module that is in the multi-function card and that is configured to implement a storage function. Specifically, the second memory card 507 may include a control unit configured to control data storage and reading and a storage medium (such as a flash memory), and may be configured to store a picture, audio, a video, and an application program. In other words, the second memory card may be equivalent to the memory card control module 232 and the flash memory 233 shown in FIG. 6, the memory card control module 332 and the flash memory 333 shown in FIG. 13, or the memory card control module 432 and the flash memory 433 shown in FIG. 15.

When the first memory card 502 and the second memory card 507 communicate with each other, the electronic device 100 may store data into the second memory card 507 or read data stored in the second memory card 506.

(3) First Interface 503 and Second Interface 504

The first interface 503 may be connected to the first UICC 501 and the first memory card 502. Specifically, the first UICC 501 may be connected to the first interface 503 by using a first interface a. The first memory card 502 may be connected to the first interface 503 by using a first interface b. The first interface 503 may be configured to: forward data of the first UICC 501 and the first memory card 502 to the multi-function card, and forward data from the multi-function card to the first UICC 501 or the first memory card 502. In other words, the first interface 503 may be an electrical connector.

The second interface 504 may be connected to the routing module 505, and may be configured to: forward data of the multi-function card to the electronic device 100, and forward data from the electronic device 100 to the second UICC 506 or the second memory card 507 by using the routing module. In other words, the second interface may be an electrical contact of the multi-function card.

The SOC 111 in the electronic device 100 may specifically exchange data with the multi-function card by connecting the first interface 503 to the second interface 504. In other words, data is exchanged by electrically connecting the electrical connector on the card holder of the electronic device 100 to the electrical contact of the multi-function card.

It should be noted that, in a time period, the first interface 503 and the second interface 504 may be configured to transmit data in communication between the first UICC 501 and the second UICC 506, or configured to transmit data in communication between the first memory card 502 and the second memory card 507. The SOC 111 may further include a microprocessor. The microprocessor may be connected to the first interface 503, and may be further connected to or disconnected from the first UICC 501 and the first memory card 502.

The SOC 111 may control, by using the microprocessor, the first interface a and the first interface b to be connected and disconnected. That the microprocessor controls the first interface a to be connected or disconnected may represent that the first UICC 501 is connected to or disconnected from the first interface 503. That the microprocessor controls the first interface b to be connected or disconnected may represent that the second UICC 502 is connected to or disconnected from the first interface 503.

For example, when the first UICC 501 requests to send data, the SOC 111 may enable, by using the microprocessor, the first interface a to be connected and the second interface b to be disconnected. In this way, the first interface 503 and the second interface 504 may be used for communication between the first UICC 501 and the second UICC 506. When communication between the first UICC 501 and the second UICC 506 is completed, for example, when the first UICC 501 receives, from the second UICC 506, information indicating that data sending is completed, the SOC 111 may enable, by using the microprocessor, the first interface to be disconnected. In this way, in a process in which the first UICC 501 and the second UICC 506 communicate with each other, or in a process in which the first memory card 502 and the second storage module 507 communicate with each other, the first interface 503 may transmit data from the multi-function card to a correct module.

In this embodiment of this application, a module that is in the SOC 111 and that is configured to control the first interface a and the first interface b to be connected and disconnected is not limited.

(4) Routing Module 505

The routing module 505 may be connected to the second interface 504, connected to the second UICC 506 by using a second interface a, and connected to the second memory card 507 by using a second interface b. The routing module 505 may forward data from the second UICC 506 and the second memory card 507 to the SOC 111 by using the second interface 504, and forward, to the second UICC 506 or the second memory card 507, data received from the second interface 504. The data received by the routing module 505 from the second interface 504 includes a data identifier. In other words, when sending data to the multi-function card, the first UICC 501 and the first memory card 502 may add a data identifier into the data. The data identifier may be used to indicate whether a receiver of the signal is the second UICC 506 or the second memory card 507. The routing module 505 may forward the data to the second UICC 506 or the second memory card 507 based on the data identifier. The routing module 505 may be implemented by using a logic circuit, a software switch, or hardware switch software.

In the schematic diagram of the connection relationship of the multi-function card in the electronic device 100 shown in FIG. 16, a specific manner in which the SOC 111 in the electronic device 100 exchanges data with the multi-function card to implement a function such as subscriber identity identification and storage expansion may be as follows:

(1) Subscriber Identity Identification for Network Access

The first UICC 501 sends, to the second interface 504 by using the first interface 503, data (for example, mobile network subscription data) used to indicate to obtain subscriber identity information corresponding to the multi-function card. The second interface 504 may forward the data to the second UICC 506 by using the routing module 505. The second UICC 506 may perform subscriber identity identification, and send, to the second interface 504 by using the routing module 505, the data (for example, mobile network subscription data) indicating the subscriber identity information corresponding to the multi-function card. The second interface 504 may send the data to the first UICC 501 by using the first interface 503. In this way, the electronic device 100 may complete subscriber identity identification, to access a network by using a network device such as a base station.

(2) Storage Expansion

The first memory card 502 sends, to the second interface 504 by using the first interface 503, an instruction used to instruct to store data and data that needs to be stored. The second interface 504 may forward the data to the second memory card 507 by using the routing module 505. The second memory card 507 may store the data into a storage medium (such as a flash memory) of the second memory card 507. Alternatively, the first memory card 502 sends, to the second interface 504 by using the first interface 503, an instruction used to instruct to read data. The second interface 504 may forward the data to the second memory card 507 by using the routing module 505. The second memory card 506 may send, to the second interface 504 by using the routing module 505 and based on the instruction for instructing to read data, data that the electronic device 100 needs to read. The second interface 504 may forward the data to the first memory card 502 by using the first interface 503. In this way, the multi-function card implements a function of expanding a storage capacity of the electronic device 100. The electronic device 100 may store data into the multi-function card or read data stored in the multi-function card. The data may include a picture, audio, a video, and an application program.

In a manner in which the SOC 111 in the electronic device 100 exchanges data with the multi-function card, the multi-function card uses the second interface through time division multiplexing, so that the multi-function card can be configured to perform subscriber identity identification, to access the network and store data such as a picture, audio, and a video.

In some embodiments, the first UICC 501 and the first memory card 502 may be connected to the first interface 503 by using the routing module. In addition, data sent by the second UICC 506 to the electronic device 100 includes a data identifier, and the data identifier may indicate that a receiver of the data is the first UICC 501. Data sent by the second memory card 507 to the electronic device 100 also includes a data identifier, and the data identifier may indicate that a receiver of the data is the first memory card 502. In this way, when the first interface 503 receives data from the multi-function card, the first interface 503 may send the data to the routing module 505, and the routing module 505 sends the data to a correct module based on a data identifier included in the data.

In some embodiments, the multi-function card may be embedded into the electronic device 100 as an embedded card, and is used as a non-removable component in the electronic device 100. In other words, the multi-function card may be equivalent to a two-in-one card that includes an eSIM card and a memory card. For a method for embedding the multi-function card into the electronic device 100 to exchange data with the SOC 111 in the electronic device 100, refer to the foregoing method for exchanging data between the multi-function card and the SOC 111 in the electronic device 100. Details are not described herein again.

It may be learned from the foregoing structure of the multi-function card and the method for exchanging data between the multi-function card and the SOC 111 in the electronic device 100 that, the electronic device may implement, by mounting a multi-function card, a function that is of subscriber identity identification and storage expansion and that currently can be only implemented by using a SIM card and a memory card. This may reduce physical space occupied by the SIM card and the memory card in the electronic device, and is conducive to lightening and thinning of the electronic device.

In addition, for some electronic devices that require both networked communication and storage, for example, Internet of Things devices (a video surveillance device, an unmanned aerial vehicle, a water meter, a meter, and the like), the electronic devices may perform networked communication and storage by using a multi-function card instead of disposing an internal memory.

In addition, a dimension of the multi-function card in this embodiment of this application may be the same as or similar to a dimension of a nano-SIM card, and eight electrical contacts are disposed on one surface of a card body. The multi-function card may implement a function of the SIM card and a function of the memory card by using the eight electrical contacts through time division multiplexing. Compared with a multi-function card that is in a conventional technology, whose dimension is the same or similar to a dimension of a micro SD card, and on which 14 electrical contacts are disposed, in this embodiment of this application, the multi-function card is smaller and electrical contacts are fewer, so that physical space in the electronic device can be more effectively saved, and a design difficulty of the electrical connector electrically connected to the electrical contact in the electronic device can be reduced.

In this embodiment of this application, the multi-function card includes a UICC, a memory card, a routing module, and an interface. The routing module is separately connected to the UICC, the memory card, and the interface. The UICC may be the second UICC in the foregoing embodiment, and may be configured to implement subscriber identity identification. The memory card may be the second memory card in the foregoing embodiment, and may be configured to store data such as a picture, audio, a video, and an application program. The interface may be the second interface in the foregoing embodiment, and may be used by the UICC and the memory card through time division multiplexing, to implement subscriber identity identification and expand storage space of the electronic device.

In this embodiment of this application, the UICC in the multi-function card may receive second data from a processor in the electronic device in a first time period, and send first data to the processor. The processor may be the SOC in the foregoing embodiment. The second data may be an instruction used to obtain mobile network subscription data in the UICC, and authentication information from the network device. The second data may be mobile network subscription data and subscriber identity information of the UICC.

In this embodiment of this application, the memory card in the multi-function card may receive third data from the processor in a second time period, and store the third data. The memory card in the multi-function card may further send fourth data to the processor in a third time period. The fourth data is data stored in the memory card.

In some embodiments, the second time period and the third time period may be a same time period.

The memory card in the multi-function card may use a UFS protocol or a PCIe protocol. In the UFS protocol and the PCIe protocol, a data input interface and a data output interface may be separated. In this way, the memory card in the multi-function card may work in a full-duplex manner, that is, read and write data simultaneously.

In some other embodiments, the second time period and the third time period may be different time periods.

The memory card in the multi-function card may use an SD protocol or an eMMC protocol. In the SD protocol and the eMMC protocol, a data input interface and a data output interface are shared. In this way, the memory card in the multi-function card may work in a half-duplex manner, that is, the memory card in the multi-function card may store data in the second time period, and read data and send the data to the processor in the third time period.

In this embodiment of this application, the multi-function card may work as a SIM card. The multi-function electrical contact of the multi-function card may be used by the UICC in the multi-function card to exchange data with the processor. The first electrical contact, the second electrical contact, the third electrical contact, the fourth electrical contact, the fifth electrical contact, and the sixth electrical contact may be respectively the electrical contact "VCC", the electrical contact "GND", the electrical contact "RST", the electrical contact "VPP", the electrical contact "CLK1", and the electrical contact "IO" in the foregoing embodiment.

In this embodiment of this application, the multi-function card may work as a UFS memory card. The plurality of electrical contacts of the multi-function card may be used by the memory card in the multi-function card to exchange data with the processor. The first electrical contact, the second electrical contact, the third electrical contact, the fourth electrical contact, the fifth electrical contact, the sixth electrical contact, the seventh electrical contact, and the eighth electrical contact may be respectively the electrical contact "VCC", the electrical contact "GND", the electrical contact "RX+", the electrical contact "VCCQ", the electrical contact "RX−", the electrical contact "TX−", the electrical contact "CLK2", and the electrical contact "TX+" in the foregoing embodiment.

In this embodiment of this application, the multi-function card may work as a PCIe memory card. The plurality of electrical contacts of the multi-function card may be used by the memory card in the multi-function card to exchange data with the processor. The first electrical contact, the second electrical contact, the third electrical contact, the fourth electrical contact, the fifth electrical contact, the sixth electrical contact, the seventh electrical contact, and the eighth electrical contact may be respectively the electrical contact "VDD1", the electrical contact "VSS", the electrical contact "RX+", the electrical contact "VDD2", the electrical contact "RX−", the electrical contact "TX−", the electrical contact "CLK2", and the electrical contact "TX+" in the foregoing embodiment.

In this embodiment of this application, the multi-function card may work as an NM card or a micro SD card. The plurality of electrical contacts of the multi-function card may be used by the memory card in the multi-function card to exchange data with the processor. The first electrical contact, the second electrical contact, the third electrical contact, the fourth electrical contact, the fifth electrical contact, the sixth electrical contact, the seventh electrical contact, and the eighth electrical contact may be respectively the electrical contact "VCC", the electrical contact "GND", the electrical contact "D0", the electrical contact "CMD", the electrical contact "CLK2", the electrical contact "D1", the electrical contact "D2", and the electrical contact "D3" in the foregoing embodiment.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to embodiments of this application are generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the procedures of the methods in the foregoing embodiments may be implemented by a computer program instructing related hardware. The program may be stored in a computer-readable storage medium. When the program is executed, the procedures of the methods in the foregoing embodiments may be performed. The storage medium includes any medium that can store program code, for example, a ROM, a random access memory RAM, a magnetic disk, or an optical disc.

What is claimed is:

1. A multi-function card, wherein the multi-function card comprises a universal integrated circuit card (UICC), a memory card, a routing module, and an interface, and the routing module is separately connected to the UICC, the memory card, and the interface, wherein
the interface comprises a plurality of electrical contacts, and the UICC and the memory card are configured to use the plurality of electrical contacts with time division multiplexing;
the UICC is configured to: send first data using the plurality of electrical contacts in a first time period, and receive second data;
the memory card is configured to: receive third data using the plurality of electrical contacts in a second time period, and store the third data;
the memory card is further configured to send fourth data using the plurality of electrical contacts in a third time period, wherein the fourth data is data stored in the memory card;
the second data carries a first identifier, and the third data carries a second identifier;
the routing module is configured to send the second data to the UICC based on the first identifier; and
the routing module is further configured to send the third data to the memory card based on the second identifier.

2. The multi-function card according to claim 1, wherein the plurality of electrical contacts comprise a first electrical contact, a second electrical contact, a third electrical contact, a fourth electrical contact, a fifth electrical contact, and a sixth electrical contact; and
when the UICC uses the plurality of electrical contacts to exchange data with the processor:
the first electrical contact is configured to connect to a power supply, and supply power to the multi-function card;
the second electrical contact is configured to transmit a ground signal;
the third electrical contact is configured to transmit a reset signal;
the fourth electrical contact is configured to transmit a voltage programming power (VPP) signal;
the fifth electrical contact is configured to transmit a first clock signal; and
the sixth electrical contact is configured to transmit the first data, and is further configured to transmit the second data.

3. The multi-function card according to claim 2, wherein the plurality of electrical contacts further comprise a seventh electrical contact and an eighth electrical contact; and
when the memory card uses the plurality of electrical contacts to exchange data with the processor:
the first electrical contact is configured to: connect to the power supply, and supply power to the multi-function card;
the second electrical contact is configured to transmit the ground signal;
the third electrical contact is configured to transmit the third data, and is further configured to transmit the fourth data;
the fourth electrical contact is configured to: connect to the power supply, and supply power to the multi-function card;
the fifth electrical contact is configured to transmit the third data, and is further configured to transmit the fourth data;
the sixth electrical contact is configured to transmit the third data, and is further configured to transmit the fourth data;
the seventh electrical contact is configured to transmit a second clock signal; and
the eighth electrical contact is configured to transmit the third data, and is further configured to transmit the fourth data.

4. The multi-function card according to claim 2, wherein the plurality of electrical contacts further comprise a seventh electrical contact and an eighth electrical contact; and
when the memory card uses the plurality of electrical contacts to exchange data with the processor:
the first electrical contact is configured to: connect to the power supply, and supply power to the multi-function card;
the second electrical contact is configured to transmit the ground signal;
the third electrical contact is configured to transmit the third data, and is further configured to transmit the fourth data;
the fourth electrical contact is configured to transmit a control signal;
the fifth electrical contact is configured to transmit a third clock signal;
the sixth electrical contact is configured to transmit the third data, and is further configured to transmit the fourth data;
the seventh electrical contact is configured to transmit the third data, and is further configured to transmit the fourth data; and
the eighth electrical contact is configured to transmit the third data, and is further configured to transmit the fourth data.

5. The multi-function card according to claim 2, wherein the fourth electrical contact is further configured to output an authentication result to, wherein the UICC is configured to determine the authentication result.

6. The multi-function card according to claim 1, wherein
a dimension of the multi-function card is the same as a dimension of a nano-SIM card; or
a dimension of the multi-function card is the same as a dimension of a micro-SIM card; or
a dimension of the multi-function card is the same as a dimension of a mini-SIM card.

7. A data transmission method, wherein the method is applied to an electronic device, the electronic device comprises a multi-function card and a processor, the multi-function card comprises a universal integrated circuit card (UICC), a memory card, a routing module, and an interface, the routing module is separately connected to the UICC, the memory card, and the interface, and the method comprises:
receiving, by the electronic device, a first subscriber operation;
in response to the first operation, sending, by the processor to the UICC, a first command requesting subscriber identity information, wherein the subscriber identity information is used to access a mobile communication network;
in response to the first command, sending, by the UICC, the subscriber identity information to the processor;
receiving, by the electronic device, a second operation; and
in response to the second operation, storing, by the processor, data into the memory card, or reading, by the processor, data from the memory card.

8. The method according to claim 7, wherein the method further comprises:
receiving, by the electronic device, a third operation; and
in response to the third operation, storing, by the processor, contact data into the UICC, or reading, by the processor, contact data from the UICC, wherein the contact data comprises one or more of the following: a telephone number, an SMS message, and a call record.

9. The method according to claim 7, wherein the method further comprises:
switching, by the electronic device, a cellular cell;
sending, by the processor, the first command to the UICC; and
in response to the first command, sending, by the UICC, the subscriber identity information to the processor.

10. The method according to claim 7, wherein the first operation comprises one or more of the following: an operation of powering on the electronic device, an operation of inserting the multi-function card into the electronic device, and an operation of enabling a mobile data function of the electronic device.

11. The method according to claim 7, wherein before the receiving, by the electronic device, a second operation, the method further comprises:
displaying, by the electronic device, a first interface, wherein the first interface comprises a first control, the first control is used by the processor to store data into the memory card or read data from the memory card, and the second operation is an operation performed on the first control.

12. The method according to claim 7, wherein the interface comprises a plurality of electrical contacts, and the plurality of electrical contacts are used by the UICC and the memory card through time division multiplexing.

13. The method according to claim 12, wherein the plurality of electrical contacts comprise a first electrical contact, a second electrical contact, a third electrical contact, a fourth electrical contact, a fifth electrical contact, and a sixth electrical contact; and
the method further comprises using the plurality of electrical contacts by the UICC to exchange data with the processor, wherein:
the first electrical contact connects to a power supply, and supplies power to the multi-function card;
the second electrical contact transmits a ground signal;
the third electrical contact transmits a reset signal;
the fourth electrical contact transmits a voltage programming power (VPP) signal;

the fifth electrical contact transmits a first clock signal; and the sixth electrical contact transmits the first data and the second data.

14. The method according to claim 13, wherein the plurality of electrical contacts further comprise a seventh electrical contact and an eighth electrical contact; and the method further comprising using the plurality of electrical contacts by the memory card to exchange data with the processor, wherein:

the first electrical contact connects to the power supply, and supplies power to the multi-function card;

the second electrical contact transmits the ground signal;

the third electrical contact transmits the third data, and is further configured to transmit the fourth data;

the fourth electrical contact connects to the power supply, and supplies power to the multi-function card;

the fifth electrical contact transmits the third data and the fourth data;

the sixth electrical contact transmits the third data and the fourth data;

the seventh electrical contact transmits a second clock signal; and the eighth electrical contact transmits the third data and the fourth data.

15. The method according to claim 13, wherein the plurality of electrical contacts further comprise a seventh electrical contact and an eighth electrical contact; and the method further comprises using the plurality of electrical contacts by the memory card to exchange data with the processor, the first electrical contact connects to the power supply, and supplies power to the multi-function card;

the second electrical contact transmits the ground signal;

the third electrical contact transmits the third data and the fourth data;

the fourth electrical contact transmits a control signal;

the fifth electrical contact transmits a third clock signal;

the sixth electrical contact transmits the third data and the fourth data;

the seventh electrical contact transmits the third data and the fourth data; and the eighth electrical contact transmits the third data and the fourth data.

16. The method according to claim 13, wherein the fourth electrical contact connects to a near field communication NFC chip, to output an authentication result to the NFC chip, wherein the authentication result is determined by the UICC, and the authentication result is used for a payment transaction.

17. The method according to claim 13, wherein a dimension of the multi-function card is the same as a dimension of a nano-SIM card; or a dimension of the multi-function card is the same as a dimension of a micro-SIM card; or a dimension of the multi-function card is the same as a dimension of a mini-SIM card.

18. The method according to claim 7, wherein the sending, by the UICC, the subscriber identity information to the processor further comprises:

sending, by the UICC, the subscriber identity information to the processor through the routing module; and the storing, by the processor, data into the memory card, or reading, by the processor, data from the memory card further comprises:

storing, by the processor, data into the memory card through the routing module, or reading, by the processor, data from the memory card through the routing module.

* * * * *